(12) United States Patent
Miura

(10) Patent No.: US 7,043,352 B2
(45) Date of Patent: May 9, 2006

(54) INTERNAL COMBUSTION ENGINE CONTROL DEVICE

(75) Inventor: Manabu Miura, Zushi (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/058,209

(22) Filed: Feb. 16, 2005

(65) Prior Publication Data

US 2005/0188948 A1    Sep. 1, 2005

(30) Foreign Application Priority Data

Feb. 27, 2004    (JP)    ............................. 2004-054516

(51) Int. Cl.
*B60T 7/12*    (2006.01)

(52) U.S. Cl. ...................... 701/104; 123/434

(58) Field of Classification Search ................ 701/101, 701/103, 104; 123/434
See application file for complete search history.

(56) References Cited

U.S. PATENT DOCUMENTS 5,579,737 A * 12/1996 Tomisawa .................... 123/435
5,645,035 A *  7/1997 Tomisawa .................... 123/435

2004/0206070 A1 * 10/2004 Shirakawa .................... 60/285
2005/0188948 A1 *  9/2005 Miura ......................... 123/299

FOREIGN PATENT DOCUMENTS

JP          2600492 B2    1/1997
JP       2000-320386 A   11/2000

* cited by examiner

*Primary Examiner*—John T. Kwon
(74) *Attorney, Agent, or Firm*—Shinjyu Global IP Counselors

(57) ABSTRACT

An internal combustion engine control device is configured to take a fuel property into account when compensating for torque decline that occurs when a prescribed combustion control mode is executed. The internal combustion engine control device is configured to calculate a first modification coefficient designed to modify a first torque correction coefficient corresponding to a air-fuel ratio based on the specific gravity of the fuel, a second modification coefficient designed to modify a second torque correction coefficient corresponding to a working gas quantity based on the specific gravity of the fuel, and a third modification coefficient designed to modify a third torque correction coefficient corresponding to a fuel injection timing based on an aromatic component content ratio of the fuel. The internal combustion engine control device is then configured to multiply the first, second and third modification coefficients together to calculate a modification coefficient for modifying a torque correction value.

16 Claims, 39 Drawing Sheets

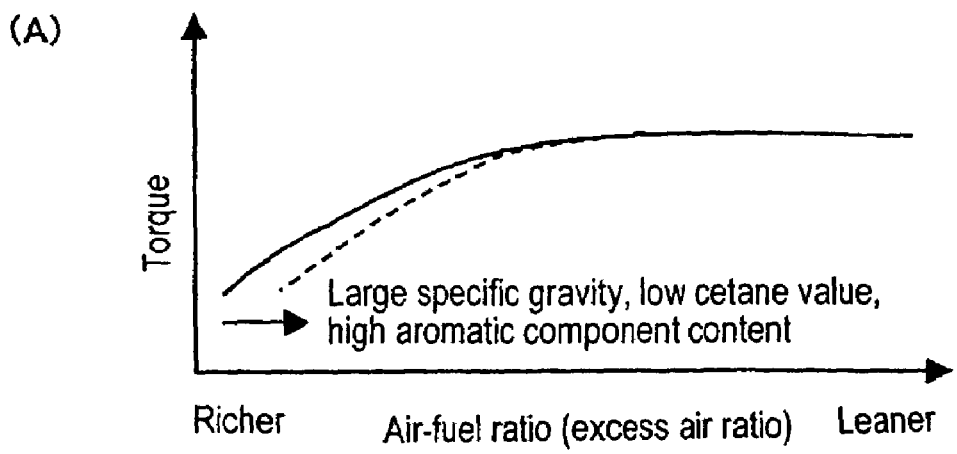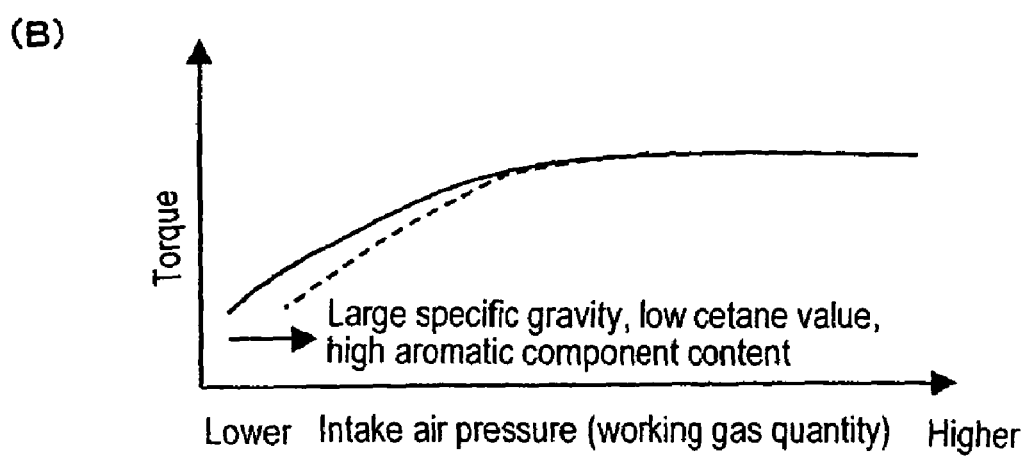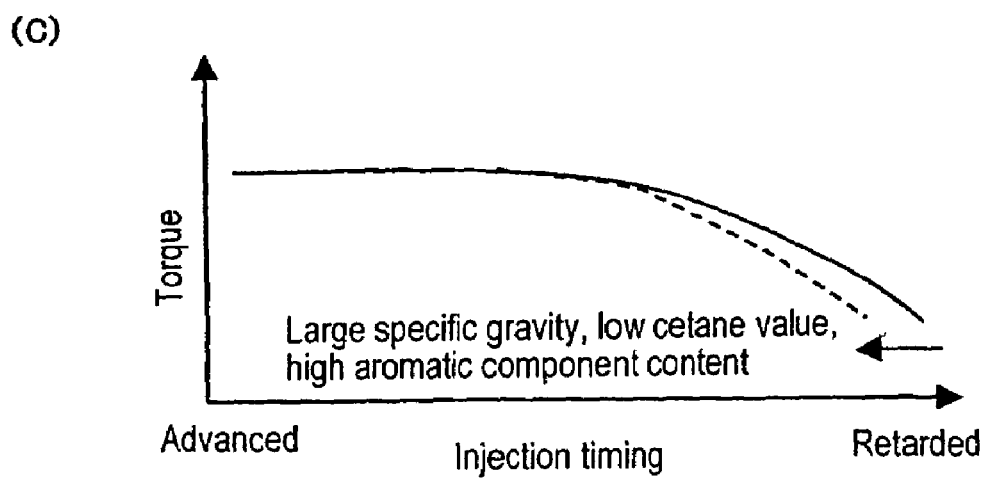
Fig. 34

INTERNAL COMBUSTION ENGINE CONTROL DEVICE

CROSS-REFERENCE TO RELATED APPLICATIONS

This application claims priority to Japanese Patent Application No. 2004-054516. The entire disclosure of Japanese Patent Application No. 2004-054516 is hereby incorporated herein by reference.

BACKGROUND OF THE INVENTION

1. Field of the Invention

The present invention relates to an internal combustion engine control device. More specifically, the present invention relates to an internal combustion engine control device that provides a stable operating performance of an engine even when a fuel property changes.

2. Background Information

Japanese Laid-Open Patent Publication No. 2000-320386 discloses an internal combustion engine control device adapted to a diesel engine. In the internal combustion engine control device disclosed in this reference, when the engine is being controlled in a prescribed combustion control mode to increase a temperature of a catalytic converter, a basic fuel injection quantity, which is matched to a required torque of the engine, is injected into cylinders with fuel injection valves in three separate injections near top dead center during a compression stroke. This reference also discloses that the fuel injection quantity is increased to compensate for a decline in torque resulting from operating the engine according to the prescribed combustion control mode.

In view of the above, it will be apparent to those skilled in the art from this disclosure that there exists a need for an improved internal combustion engine control device. This invention addresses this need in the art as well as other needs, which will become apparent to those skilled in the art from this disclosure.

SUMMARY OF THE INVENTION

The amount of torque decline resulting from a prescribed combustion control (i.e., a control scheme whereby the temperature of the exhaust gas is increased by dividing the fuel injection quantity into separate injections) executed when a condition corresponding to a state of the catalytic converter is satisfied differs depending on a fuel property. Thus, the internal combustion engine control device described in the above mentioned reference cannot provide a satisfactory torque compensation and cannot sufficiently ensure stable operating performance of the engine when the fuel property has changed.

The present invention was conceived in view of this drawback in the prior art. The one object of the present invention is to perform a satisfactory torque compensation and ensure stable operating performance even when the amount of torque decline resulting from a prescribed combustion control has changed due to a change in the fuel property.

In order to achieve the above mentioned object and other objects of the present invention, an internal combustion engine control device is provided that basically comprises an intake air quantity control section, a fuel injection quantity control section, a combustion mode control section, an intake air quantity correcting section, and a torque correction value modifying section. The intake air quantity control section is configured to control an intake air quantity drawn into an engine based on a target intake air quantity. The fuel injection quantity control section is configured to control a fuel injection quantity of the engine based on a target fuel injection quantity calculated based on an actual air quantity and a target air-fuel ratio. The combustion mode control section is configured to selectively control a combustion mode of the engine so that the engine operates in at least a prescribed combustion control mode. The intake air quantity correcting section is configured to correct the target intake air quantity to a larger value by using a torque correction value in order to compensate for a torque decline resulting from operating the engine according to the prescribed combustion control mode. The torque correction value modifying section is configured to modify the torque correction value in accordance with a change in a fuel property with respect to a reference fuel property.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 34 is a diagram showing the characteristics of an amount of torque decline depending on the fuel property with respect to the air-fuel ratio, the intake air pressure, and the fuel injection timing in accordance with the preferred embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

Figure 1:
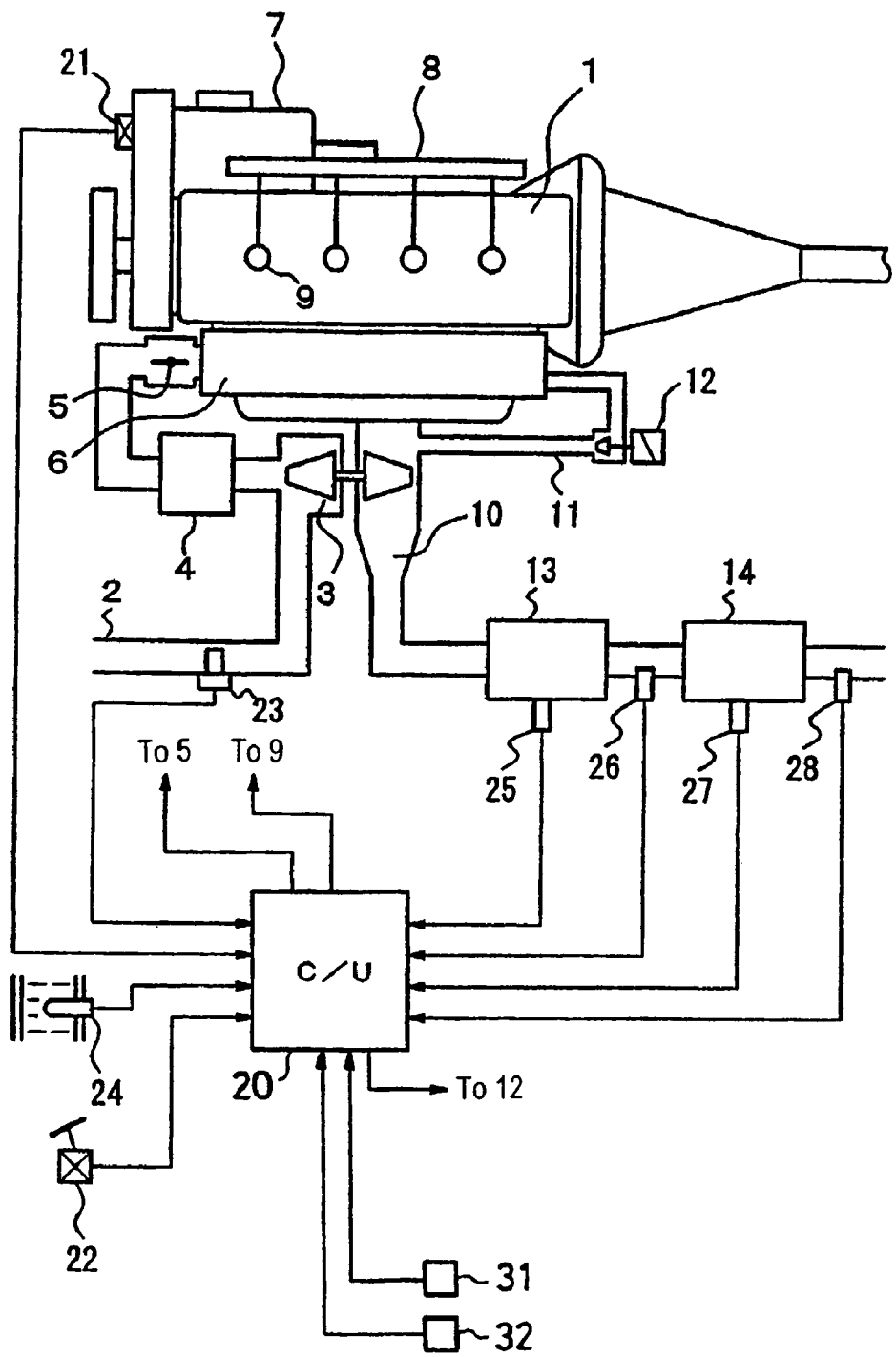
FIG. 1 is an overall system diagram of an internal combustion engine provided with an internal combustion engine control device in accordance with a preferred embodiment of the present invention.

Referring initially to FIG. 1, an internal combustion engine control device is illustrated in accordance with a preferred embodiment of the present invention. In this embodiment, the internal combustion engine control device is adapted to be used in a diesel engine 1 as seen in FIG. 1. The diesel engine 1 is provided with an intake air compressor of a variable nozzle turbocharger 3 installed in an intake passage 2 of the diesel engine 1. The intake air is supercharged by the intake air compressor, cooled by an intercooler 4, passes through an intake throttle valve 5, and passes through a collector 6 before the intake air enters the combustion chambers of the cylinders of the diesel engine 1. The fuel is delivered to the combustion chambers with a common rail fuel injection system. In other words, high-pressure fuel is pumped to a common rail 8 by a high-pressure fuel pump 7 and injected directly into the combustion chamber of each cylinder by a fuel injection valve 9. The air and fuel that enter the combustion chamber are combusted by compression ignition and the resulting exhaust gas is discharged to an exhaust passage 10.

In the diesel engine 1, a portion of the exhaust gas discharged to the exhaust passage 10 is preferably recirculated to the intake side of the diesel engine 1 as EGR gas through an EGR passage 11 and an EGR valve 12 as seen in FIG. 1. The remainder of the exhaust gas passes through the exhaust gas turbine of the variable nozzle turbocharger 3 and drives the variable nozzle turbocharger 3.

Moreover, a NOx trapping catalytic converter 13 is preferably installed in the exhaust passage 10 at a position downstream of the exhaust gas turbine of the variable nozzle turbocharger 3. The NOx trapping catalytic converter 13 is configured and arranged to trap NOx contained in the exhaust gas when the air-fuel ratio of the exhaust gas is lean and release/clean the trapped NOx when the air-fuel ratio of the exhaust gas is rich. The NOx trapping catalytic converter 13 also carries an oxidizing catalyst (precious metal) which provides the NOx trapping catalytic converter 13 with the ability to oxidize such exhaust gas components as hydrocarbons (HC) and carbon monoxide (CO).

Furthermore, as seen in FIG. 1, a diesel particulate filter or DPF 14 is arranged downstream of the NOx trapping catalytic converter 13. The DPF 14 is configured and arranged to capture particulate matter (PM) contained in the exhaust gas. Similarly to the NOx trapping catalytic converter, the DPF 14 carries an oxidizing catalyst (precious metal) which provides the DPF 14 with the ability to oxidize such exhaust gas components as hydrocarbons (HC) and carbon monoxide (CO). Of course, it will be apparent to those skilled in the art from this disclosure that the NOx trapping catalytic converter 13 can be arranged downstream of the DPF 14 (i.e., opposite order from the arrangement shown in FIG. 1) or to configure the DPF 14 to carry a NOx trapping catalyst so that the DPF and the NOx trapping catalyst are provided as an integral unit.

As seen in FIG. 1, the diesel engine 1 is provided with a control unit 20 configured to control the operation of the diesel engine 1. The control unit 20 preferably includes a microcomputer with various control programs that control the various operations of the diesel engine 1 as discussed below. The control unit 20 can also include other conventional components such as an input interface circuit, an output interface circuit, and storage devices such as a ROM (Read Only Memory) device and a RAM (Random Access Memory) device. The microcomputer of the control unit 20 is programmed to control the various components of the diesel engine 1. The memory circuit stores processing results and control programs such as ones for fuel injection operation that are run by the processor circuit. The control unit 20 is operatively coupled to the various sensors and the various components of the diesel engine 1 in a conventional manner. The internal RAM of the control unit 20 stores statuses of operational flags and various control data. The internal ROM of the control unit 20 stores various maps and tables used for various operations. The control unit 20 is capable of selectively controlling any of the components of the control system in accordance with the control program. It will be apparent to those skilled in the art from this disclosure that the precise structure and algorithms for the control unit 20 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Moreover, the control unit 20 is configured to receive input signals from various sensors such as a rotational speed sensor 21, an accelerator position sensor 22, an air flow meter 23, a coolant temperature sensor 24, an intake air pressure sensor 31, a fuel temperature sensor 32. The rotational speed sensor 21 is configured and arranged to detect a rotational speed Ne of the diesel engine 1, and produce an output signal indicative of the rotational speed Ne that is sent to the control unit 20. The accelerator position sensor 22 is configured and arranged to detect an accelerator position APO, and produce an output signal indicative of the accelerator position APO that is sent to the control unit 20. The air flow meter 23 is configured and arranged to detect an intake air quantity Qac, and produce an output signal indicative of the intake air quantity Qac that is sent to the control unit 20. The coolant temperature sensor 24 is configured and arranged to detect an engine coolant temperature Tw, and produce an output signal indicative of the engine coolant temperature Tw that is sent to the control unit 20. The intake air pressure sensor 31 is configured and arranged to detect an intake air pressure Pcol of the intake air downstream of the intake air throttle valve 5, and produce an output signal indicative of the intake air pressure Pcol that is sent to the control unit 20. The fuel temperature sensor 32 is configured and arranged to detect a fuel temperature FT, and produce an output signal indicative of the fuel temperature FT that is sent to the control unit 20.

Moreover, as seen in FIG. 1, the diesel engine 1 is also provided with a catalyst temperature sensor 25, an exhaust gas pressure sensor 26, a DPF temperature sensor 27 and an air-fuel ratio sensor 28 that feed signals to the control unit 20. More specifically, the catalyst temperature sensor 25 is configured and arranged to detect a temperature (catalyst temperature) of the NOx trapping catalytic converter 13, and produce an output signal indicative of the temperature of the NOx trapping catalytic converter 13 that is sent to the control unit 20. The exhaust gas pressure sensor 26 is configured and arranged to detect an exhaust gas pressure in the exhaust passage 10 at the inlet to the DPF 14, and produce an output signal indicative of the exhaust gas pressure that is sent to the control unit 20. The DPF temperature sensor 27 is configured and arranged to detect a temperature (DPF temperature) of the DPF 14, and produce an output signal indicative of the temperature of the DPF 14 that is sent to the control unit 20. The air-fuel ratio sensor 28 is configured and arranged to detect an air-fuel ratio of the exhaust gas in the exhaust passage 10 at the outlet of the DPF 14, and produce an output signal indicative of the air-fuel ratio of the exhaust gas that is sent to the control unit 20. The exhaust gas air-fuel ratio is hereinafter referred as exhaust gas X and expressed numerically as an excess air ratio. Of course, it will be apparent to those skilled in the art from this disclosure that the temperatures of the NOx trapping catalytic converter 13 and the DPF 14 can also be obtained indirectly by providing exhaust gas temperature sensors (located, for example, downstream of the NOx trapping catalytic converter 13 and the DPF 14) and by calculating the temperatures of the NOx trapping catalytic converter 13 and the DPF 14 based on the detected exhaust gas temperatures.

Based on the aforementioned input signals from the various sensors, the control unit 20 issues fuel injection command signals, intake air throttle valve opening degree command signals and EGR valve opening degree command signals to control operations of the diesel engine 1. More specifically, the fuel injection command signals are sent to the fuel injection valves 9 to control the fuel injection quantity and the fuel injection timing of the fuel injected from the fuel injection valves 9. The intake air throttle valve opening degree command signals are sent to the intake air throttle valve 5 to control the opening degree of the intake air throttle valve 5. The EGR valve opening degree command signals are sent to the EGR valve 12 to control the opening degree of the EGR valve 12.

In this embodiment, the control unit 20 is configured to execute an exhaust gas cleaning control including regenerating the DPF 14 by burning particulate matter that has accumulated in the DPF 14, releasing/cleaning the NOx trapped in the NOx trapping catalytic converter 13, and removing the sulfur accumulated in the NOx trapping catalytic converter 13.

Referring now to FIGS. 2 to 12, the exhaust gas cleaning control executed by the control unit 20 will be described in detail. FIGS. 2 to 12 are flowcharts showing a control process for the exhaust gas cleaning control executed by the control unit 20.

First, a main routine of the exhaust gas cleaning control shown in FIG. 2 will be described.

In step S1, the control unit 20 is configured to read in the signals from the various sensors and detect the engine rotational speed Ne, the accelerator position APO, the intake air quantity Qac, the catalyst temperature, the exhaust gas pressure at the inlet to the DPF 14, the DPF temperature, and the exhaust gas λ at the outlet of the DPF 14.

In step S2, the control unit 20 is configured to determine if the NOx trapping catalytic converter 13 is warm or cold. More specifically, if the catalyst temperature is equal to or below an active temperature T5, the control unit 20 is configured to determine that the NOx trapping catalytic converter 13 is cold and shift to the warm-up promotion mode control shown in FIG. 12 (discussed later). If the catalyst temperature is greater than the active temperature T5, i.e., the catalytic converter 13 is warm (warm-up complete), the control unit 20 is configured to proceed to step S3.

In step S3, the control unit 20 is configured to calculate an amount of NOx accumulated in the NOx trapping catalytic converter. The amount of accumulated NOx can be estimated, for example, based on a distance for which a vehicle equipped with the diesel engine 1 has traveled, or based on an integration value of the engine rotational speeds as described on page 6 of Japanese Patent Publication No. 2600492. When the integration value of the engine rotational speeds is used, the integration value is reset at the point in time when the NOx releasing and cleaning is completed (this includes cases in which the releasing and cleaning of NOx is conducted simultaneously with desulfurization).

In step S4, the control unit 20 is configured to calculate an amount of sulfur accumulated in the NOx trapping catalytic converter 13. Similarly to the calculation of the amount of accumulated NOx, the amount of accumulated sulfur can be estimated based on the traveling distance of the vehicle or the integration value of the engine rotational speeds. When an integration value is used, the integration value is reset at the point in time when the desulfurization is complete.

In step S5, the control unit 20 is configured to calculate an amount of particulate matter accumulated in the DPF 14. As the amount of accumulated particulate matter in the DPF 14 increases, the exhaust gas pressure at the inlet of the DPF 14 increases. Thus, the amount of accumulated particulate matter in the DPF 14 is estimated by using the exhaust gas pressure sensor 26 to detect the exhaust gas pressure at the inlet of the DPF 14 and by comparing the detected exhaust gas pressure to a reference exhaust gas pressure based on a current operating state of the diesel engine 1 (e.g., engine rotational speed and load). Alternatively, the amount of the particulate matter accumulated in the DPF can also be estimated by using a combination of the exhaust gas pressure, the traveling distance of the vehicle, and the integration value of the engine rotational speeds since the previous regeneration of the DPF 14.

In step S6, the control unit 20 is configured to determine if a regeneration flag reg is on (i.e., reg=1). The regeneration flag reg indicates that a DPF regeneration mode in which the regeneration of the DPF 14 is performed is in progress. If the value of the regeneration flag reg is 1, the control unit 20 is configured to proceed to the DPF regeneration mode control shown in FIG. 3 (discussed later).

In step S7, the control unit 20 is configured to determine if a desulfurization flag desul is on (i.e., desul=1). The desulfurization flag desul indicates that a mode for desulfurizing the NOx trapping catalytic converter 13 is in progress. If the value of the desulfurization flag desul is 1, the control unit 20 is configured to proceed to the desulfurization mode control shown in FIG. 4 (discussed later).

In step S8, the control unit 20 is configured to determine if a rich spike flag sp is on (i.e., sp=1). The rich spike flag sp indicates that a rich spike mode for releasing and cleaning the NOx trapped in the NOx trapping catalytic converter 13 is in progress. If the value of the rich spike flag sp is 1, the control unit 20 is configured to proceed to the rich spike mode control shown in FIG. 5 (discussed later).

In step S9, the control unit 20 is configured to determine if a heat damage prevention flag rec is on (i.e., rec=1). The heat damage prevention flag rec indicates that a heat damage prevention mode is in progress after regeneration of the DPF 14 and desulfurization of the NOx trapping catalytic converter 13. If the heat damage prevention flag rec has a value of 1, the control unit 20 is configured to proceed to the heat damage prevention mode control shown in FIG. 6 (discussed later).

In step S10, the control unit 20 is configured to determine if a DPF regeneration request flag rq-DPF is on (i.e., rq-DPF=1). The DPF regeneration request flag rq-DPF indicates that a request for DPF regeneration has been issued. If the value of the DPF regeneration request flag rq-DPF is 1, the control unit 20 is configured to proceed to the control sequence shown in FIG. 7 where the control unit 20 is configured to determine the order of priority for regeneration for a case in which a request for regeneration of the DPF 14 has been issued.

In step S11, the control unit 20 is configured to determine if a desulfurization request flag rq-DESUL is on (i.e., rq-DESUL). The desulfurization request flag rq-DESUL indicates that a request for desulfurization has been issued. If the value of the desulfurization request flag rq-DESUL is 1, the control unit 20 is configured to proceed to the control sequence shown in FIG. 8 where the control unit 20 is configured to determine the order of priority for regeneration for a case in which a request for desulfurization has been issued.

In step S12, the control unit 20 is configured to determine if the amount of particulate matter accumulated in the DPF 14 calculated in step S5 has reached a prescribed amount PM1. The prescribed amount PM1 is set to be a threshold value that indicates a timing of the regeneration of the DPF 14. If the amount of accumulated particulate matter is larger than the prescribed amount PM1 (indicating it is time to regenerate the DPF 14), the control unit 20 is configured to proceed to the control sequence shown in FIG. 9. In the control sequence shown in FIG. 9, the control unit 20 is configured to set the value of the DPF regeneration request flag rq-DPF to 1 in step S701 to issue a request for DPF regeneration and return to the main routine shown in FIG. 2.

In step S13, the control unit 20 is configured to determine if the amount of sulfur accumulated in the NOx trapping catalytic converter 13 calculated in step S4 has reached a prescribed amount S1. The prescribed amount S1 is set to a threshold value that indicates a timing for the desulfurization of the NOx trapping catalytic converter 13. If the amount of accumulated sulfur is larger than the prescribed amount S1 (indicating it is time to desulfurize the NOx trapping catalytic converter 13), the control unit 20 is configured to proceed to the control sequence shown in FIG. 10. In the control sequence shown in FIG. 10, the control unit 20 is configured to set the value of the desulfurization request flag rq-DESUL to 1 in step S801 in order to issue a request for desulfurization of the NOx trapping catalytic converter 13 and return to the main routine shown in FIG. 2.

In step S14, the control unit 20 is configured to determine if the amount of NOx accumulated in the NOx trapping catalytic converter 13 calculated in step S3 has reached a prescribed amount NOx1. The prescribed amount NOx1 is set to a threshold value that indicates a timing for the releasing and cleaning of the NOx accumulated in the NOx trapping catalytic converter 13. If the amount of accumulated NOx is larger than the prescribed amount NOx1 (indicating it is time to release and clean the NOx), the control unit 20 is configured to proceed to the control sequence shown in FIG. 11. In the control sequence shown in FIG. 11, the control unit 20 is configured to set the value of a rich spike request flag rq-sp to 1 in step S901 in order to issue a request for release and cleaning of the NOx (i.e., a request for rich spike operation) and return to the main routine shown in FIG. 2.

Figure 3:
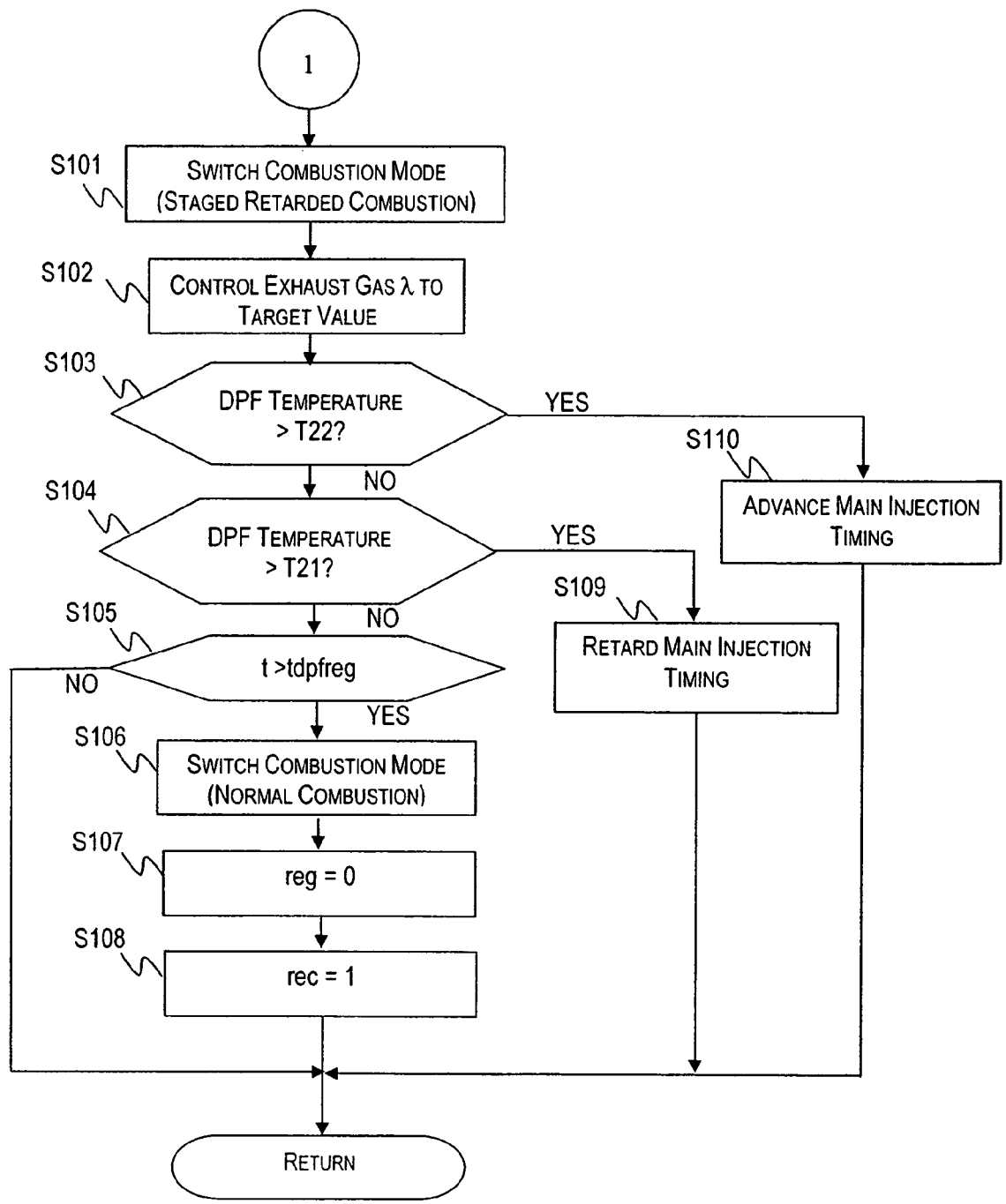
FIG. 3 is a second flowchart describing the exhaust gas cleaning control executed by the internal combustion engine control device in accordance with the preferred embodiment of the present invention.

Referring now to FIG. 3, the DPF regeneration mode control executed in the control unit 20 will be explained. The control sequence shown in FIG. 3 starts when the regeneration flag reg is set to 1 in the control sequence shown in FIG. 7. As explained in more detail below referring to FIG. 7, the regeneration flag reg is set to 1 when the amount of accumulated particulate matter in the DPF 14 reaches the prescribed amount PM1 and the flag rq-DPF is set to 1.

In step S101, the control unit 20 is configured to switch a combustion mode of the diesel engine 1 from a normal lean combustion mode to a staged retarded combustion mode in accordance with the preferred embodiment of the present invention in order to regenerate the DPF 14.

The staged retarded combustion mode in accordance with the preferred embodiment of the present invention will now be described. In addition to being used for DPF regeneration, the staged retarded combustion mode is used for desulfurization, NOx release and cleaning (rich spike), and promoting warming up.

When the DPF 14 is regenerated, it is necessary to control the exhaust gas $\lambda$ to a value between 1 and 1.4 and raise the temperature of the DPF 14 to approximately 600° C. or higher. In the case of desulfurization of the NOx trapping catalytic converter 13, it is necessary to control the air-fuel ratio $\lambda$ to a value equal to or less than 1 ($\lambda \leq 1$) and to achieve an exhaust gas temperature of 600° C. or higher (exhaust gas temperature $\geq$ 600° C.).

When the diesel engine 1 is operating under lean conditions in a regular operating region, the fuel is normally injected with a pilot injection and a main injection. The pilot injection is executed at a timing between 40 and 10 degrees before top dead center (BTDC) and with an injection quantity between 1 and 3 mm$^3$/st. The main injection is executed at a timing between 10 and −5 degrees BTDC. An interval between the pilot injection and the main injection is set to approximately 10 to 30 degrees crank angle (CA).

In order to shift from normal operation to operating with a low air-fuel ratio λ and a high exhaust gas temperature for regeneration of the DPF 14 or desulfurization of the NOx trapping catalytic converter 13, it is necessary to throttle the intake air quantity drawn into the diesel engine 1. However, since the temperature inside the cylinder declines at the end of the compression stroke when the intake air quantity is throttled, the combustion becomes unstable. In such case, it is necessary to advance the injection timing of the main injection if the pilot injection is executed in the same manner as during normal lean operation. The injection and combustion pattern in this situation is illustrated as a first comparison control example in FIG. 13. Consequently, there is a limit to how much the injection timing can be retarded in order to increase the exhaust gas temperature because retarding the injection timing will cause the combustion to become unstable. In short, with a regular operation executing the pilot injection and the main injection, it is difficult to achieve a low air-fuel ratio λ and a high exhaust gas temperature.

In Japanese Laid-Open Patent Publication No. 2000-320386 mentioned above, a limit to retardation of the injection timing is expanded (i.e., enable the injection timing to be retarded to a greater degree) by dividing the main injection into separate injections (first and second injections) to achieve a low air-fuel ratio λ and a high exhaust gas temperature. The injection and combustion pattern in this situation is illustrated as a second comparison control example in FIG. 14.

Figure 14:
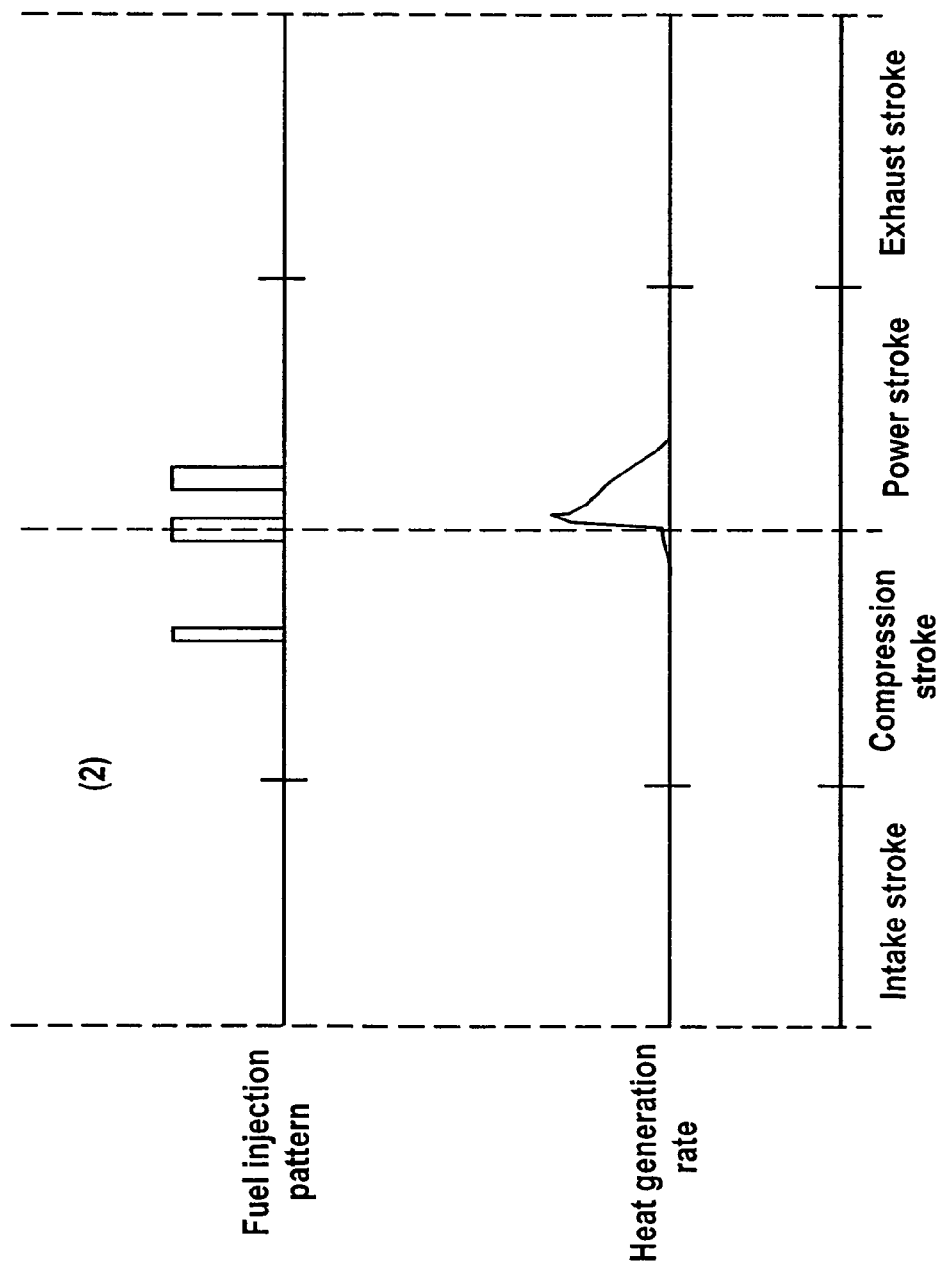
FIG. 14 is a diagram showing the injection and combustion pattern in accordance with a second comparison control example.

However, since a subsequent fuel injection among the separate injections for the main injection (the second injection) is executed while the combustion of a previously injected fuel (the first injection) is still active, the combustions resulted from the first and second injections take place in a continuous manner as shown in FIG. 14. In other words, since the fuel of the subsequent portion of the main fuel injection (the second injection) is injected into the flame produced by the fuel of the previous portion of the main fuel injection (the first injection), combustions commences as soon as the fuel is injected in the second injection. In such case, the ratio of diffuse combustion increases, causing localized portions where the equivalence ratio is extremely rich to exist and the production of smoke to be greatly increased.

Figure 15:
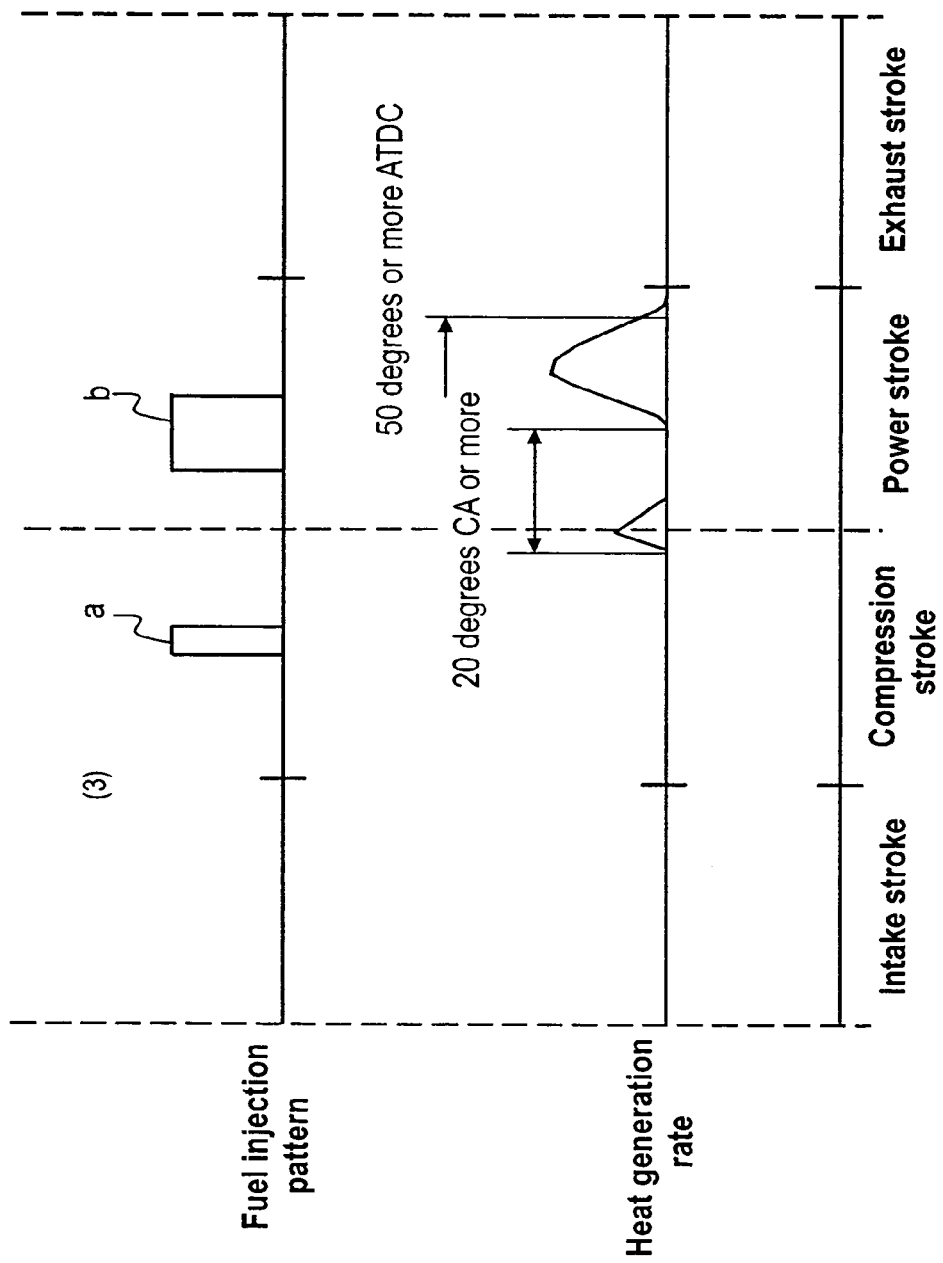
FIG. 15 is a diagram showing the injection and combustion pattern in the control executed in the internal combustion engine control device in accordance with the preferred embodiment of the present invention.

On the other hand, with the internal combustion engine control device in accordance with this preferred embodiment of the present invention, the control unit 20 is configured to execute the staged retarded combustion such that a main combustion is conducted to generate a main torque and a preliminary combustion is conducted in advance of the main combustion as shown in FIG. 15. As seen in FIG. 15, the control unit 20 is configured to perform the fuel injections (i.e., separate injections (a) and (b) in FIG. 15) such that the preliminary combustion occurs near top dead center (TDC) of the compression stroke and the main combustion starts after the preliminary combustion is complete.

More specifically, the fuel (a) is injected during the compression stroke to conduct a preliminary combustion to increase the temperature inside the cylinder near TDC (compression stroke end temperature). The fuel injection quantity required to generate heat with the preliminary combustion differs depending on the operating conditions, but it should be a quantity sufficient to confirm the generation of heat during the preliminary combustion and to raise the temperature inside the cylinder to a temperature above a temperature where spontaneous ignition becomes possible by the time the fuel (b) is injected for the main combustion. The stability of the preliminary combustion can be improved by varying the quantity and injection timing of the fuel (a) injected for the preliminary combustion in accordance with the compression stroke end temperature predicted based on the operating conditions of the diesel engine 1.

After the preliminary combustion ends, the fuel (b) for the main combustion is injected at or after TDC in order to start the main combustion. More specifically, since the injection timing retardation limit for the main combustion has been expanded by increasing the temperature inside the cylinder with the preliminary combustion, the ability to control the diesel engine 1 to achieve a target temperature is improved. Moreover, since the fuel (b) for the main combustion is injected after the preliminary combustion is completed, an ignition delay period is secured for the main combustion and the ratio of premixed combustion is increased during the main combustion, thereby suppressing the discharge of smoke.

The control unit 20 is configured to vary the interval between the start timing of the preliminary combustion and the start timing of the main combustion depending on the engine rotational speed, but the interval must be at least 20 degrees CA in order for the preliminary combustion (heat generation resulting from the preliminary combustion) to finish completely before the main combustion is executed. By setting the interval between the preliminarily injection and the main injection in this manner, degradation of the main combustion can be suppressed and the generation of smoke can be prevented from worsening. Also, since the main combustion starts during the expansion stroke, the combustion speed is very slow and the main combustion ends at around 50 degrees ATDC or later. By making the main combustion end as late as possible, the main combustion is allowed to proceed in a leisurely manner and worsening of the combustion noise is suppressed.

Figure 13:
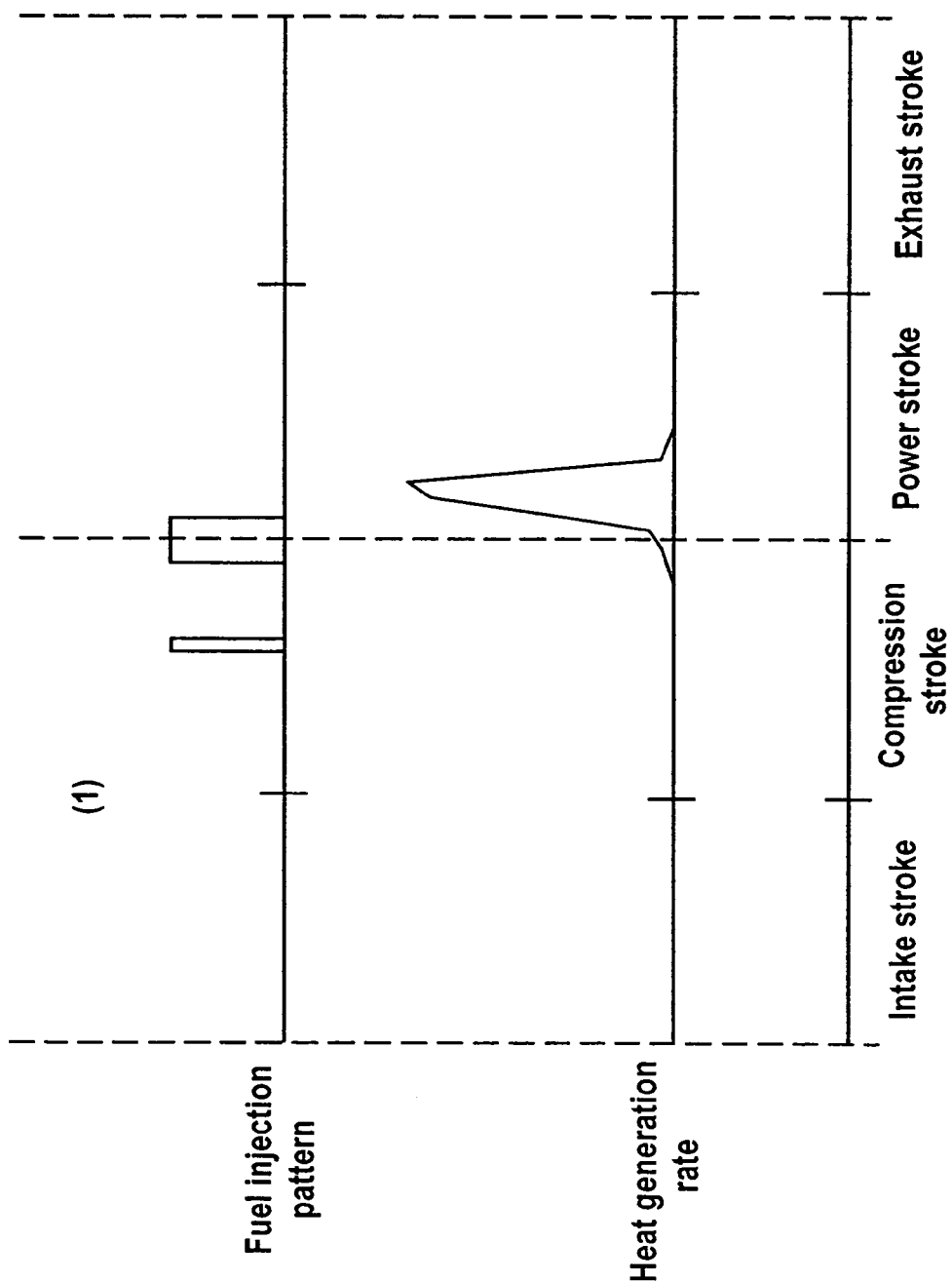
FIG. 13 is a diagram showing the injection and combustion pattern in accordance with a first comparison control example.
Figure 16:
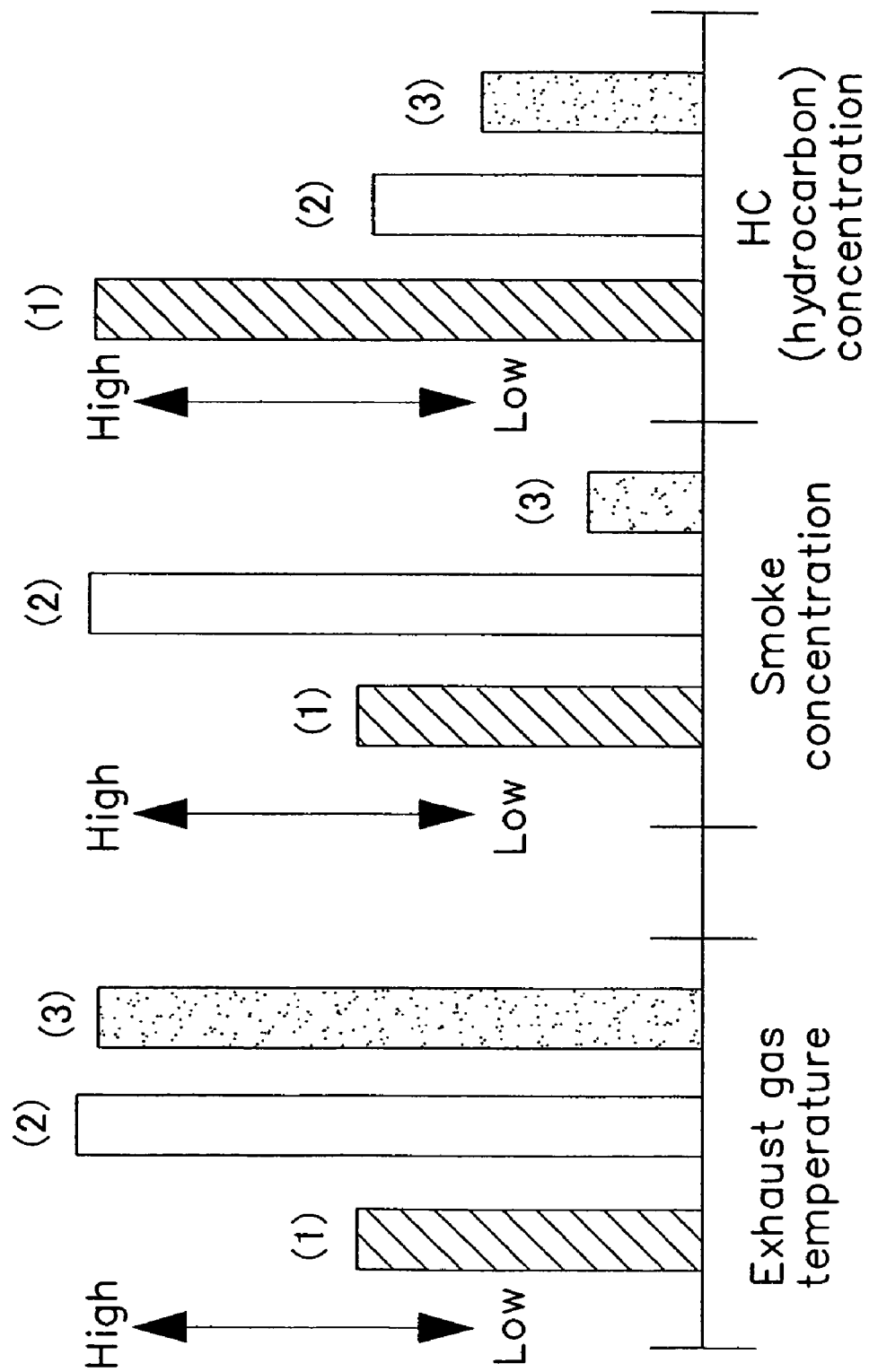
FIG. 16 is a bar chart illustrating a comparison between exhaust gas conditions resulting from the combustion patterns in accordance with the first comparison control example, the second comparison control example, and the control executed in the internal combustion engine control device in accordance with the present invention.

FIG. 16 is a bar chart illustrating a comparison between exhaust gas conditions resulting from the combustion patterns in accordance with the first comparison control example as shown in FIG. 13 (indicated with number (1)), the second comparison control example as shown in FIG. 14 (indicated with number (2)), and the control executed in the control unit 20 in the preferred embodiment of the present invention (indicated with number (3)). As seen in FIG. 16, the staged retarded combustion executed by the control unit 20 is indicated with number (3) achieves both a higher exhaust gas temperature and lower smoke emissions comparing to the first and second comparison control examples indicated with numbers (1) and (2) even when the diesel engine 1 is operated under rich conditions. Also, as seen in FIG. 16, the embodiment of the present invention exhibits a very low hydrocarbon value.

Since the injection timing retardation limit of the main combustion is expanded by conducting the preliminary combustion in the staged retarded combustion of the present invention, combustion at low air-fuel ratio λ condition can be conducted in a stable manner and a high exhaust gas temperature can be achieved even if the injection timing for the main combustion is retarded.

Figure 17:
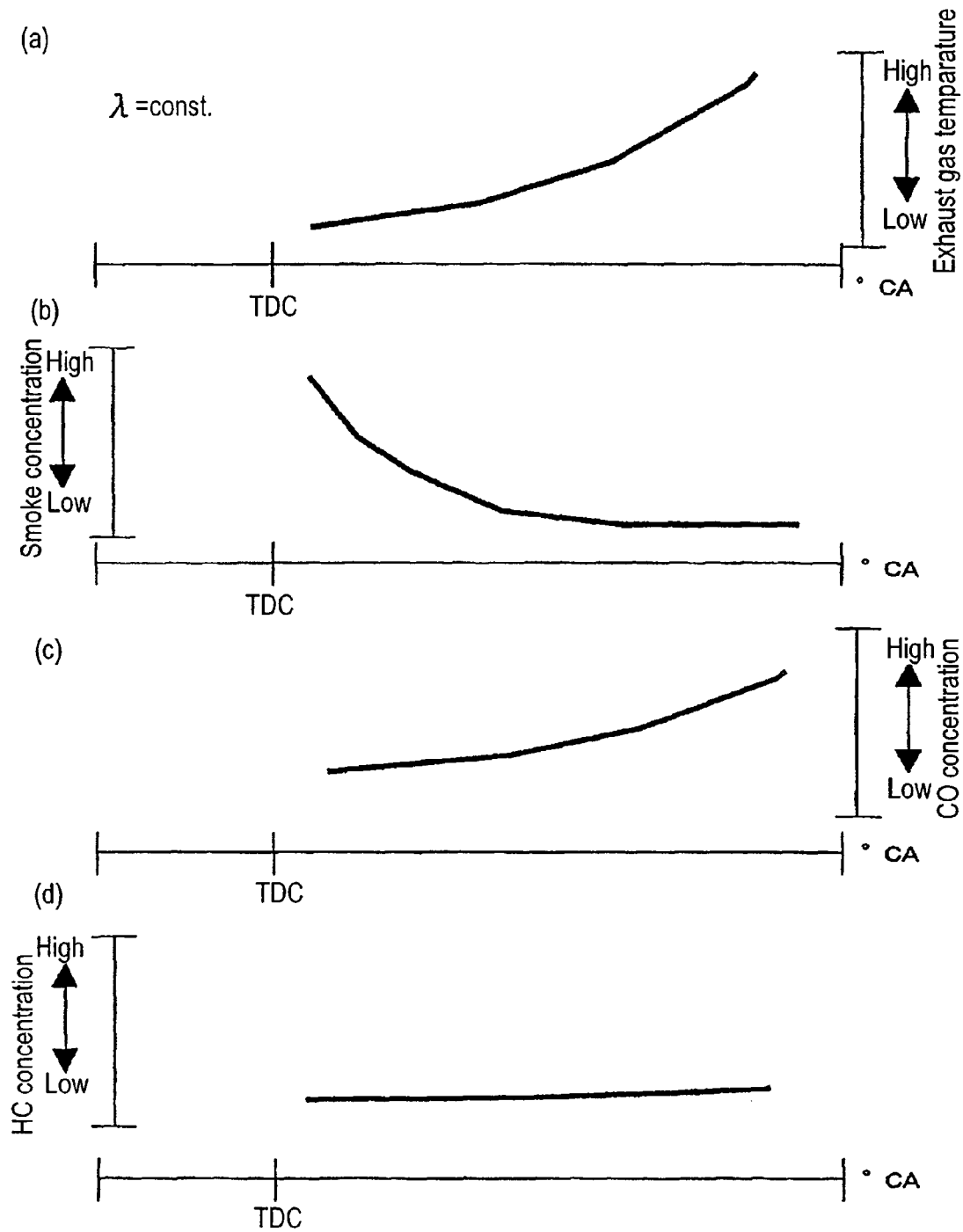
FIG. 17 is a diagram showing the characteristics of exhaust gas in relation to a main combustion timing of staged retarded combustion in accordance with the preferred embodiment of the present invention.

Moreover, when the timing of the main combustion is retarded, the ratio of premixed combustion during the main combustion increases. Consequently, as shown in FIG. 17, even if the air-fuel ratio λ is low, smoke emissions are reduced in accordance with the degree of retardation. Meanwhile, since a higher exhaust gas temperature can be achieved when the timing of the main combustion is retarded, the exhaust gas temperature can be controlled by varying the timing at which the fuel for the main combustion is injected.

Figure 18:
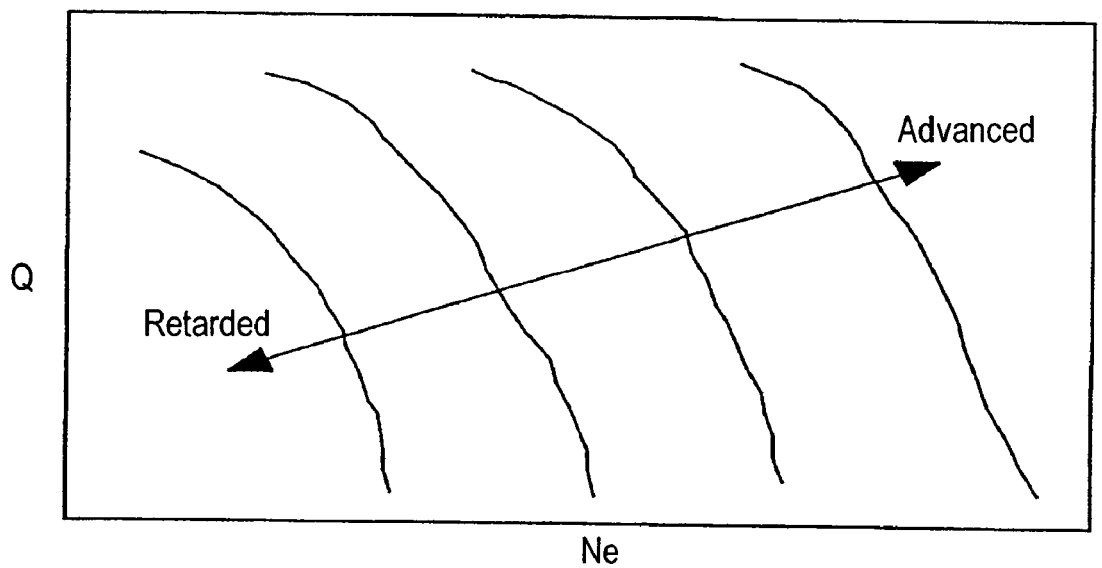
FIG. 18 is a diagram showing the characteristics of a target injection timing for a preliminary combustion of the staged retarded combustion in accordance with the preferred embodiment of the present invention.

FIG. 18 is a diagram showing the characteristics of a target injection timing for the preliminary combustion of the staged retarded combustion with respect to the engine condition (using an engine rotational speed Ne and a load Q as parameters).

Figure 19:
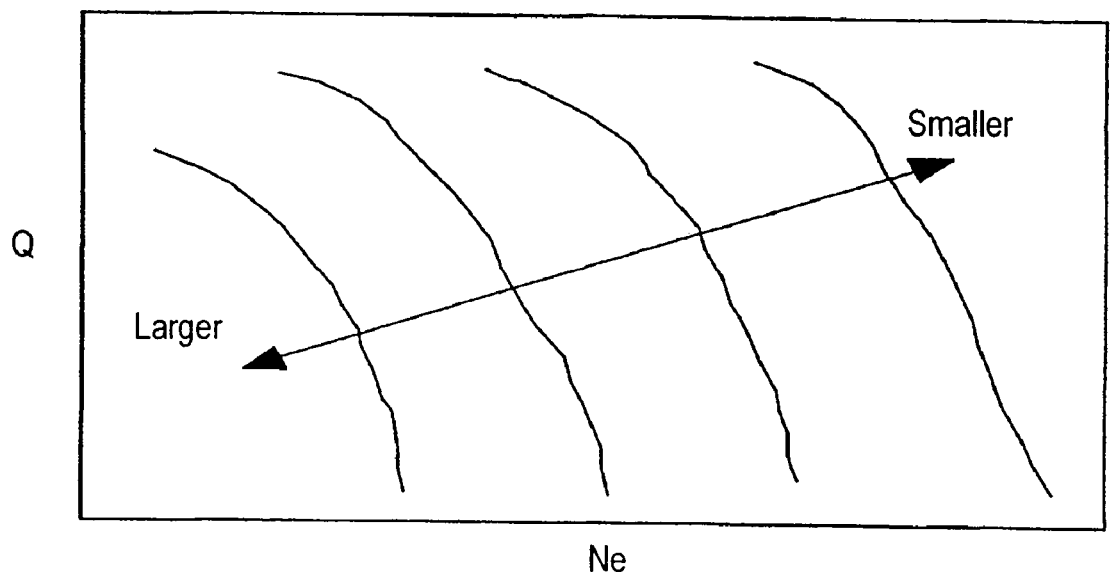
FIG. 19 is a diagram showing the characteristics of a target fuel injection quantity for the preliminary combustion of the staged retarded combustion in accordance with the preferred embodiment of the present invention.

FIG. 19 is a diagram showing the characteristics of a target fuel injection quantity for the preliminary combustion of the staged retarded combustion with respect to the engine condition (using the engine rotational speed Ne and the load Q as parameters).

Figure 20:
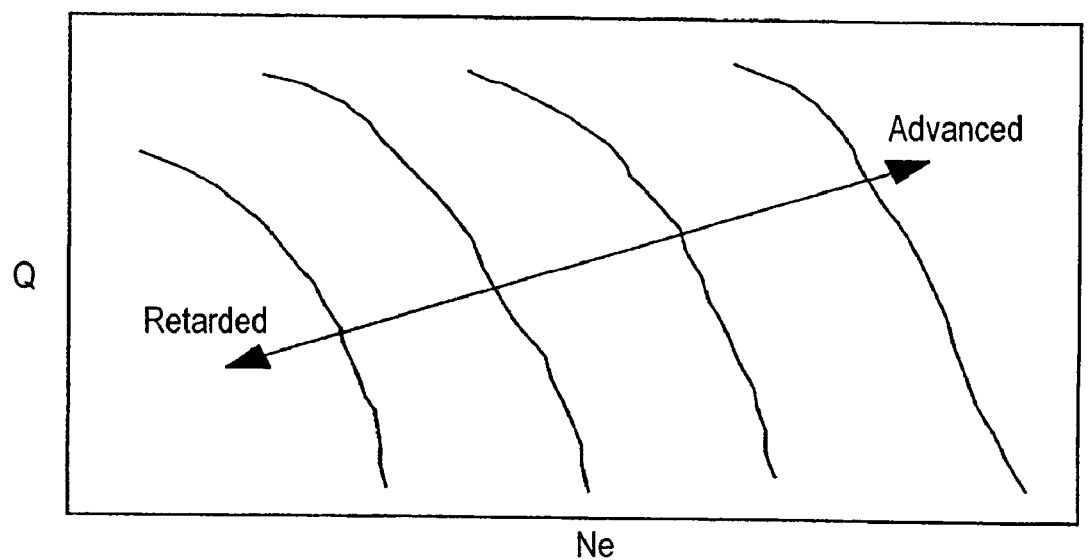
FIG. 20 is a diagram showing the characteristics of a target injection timing for the main combustion of the staged retarded combustion in accordance with the preferred embodiment of the present invention.

FIG. 20 is a diagram showing the characteristics of a target injection timing for the main combustion (main injection timing) of the staged retarded combustion with respect to the engine condition (using the engine rotational speed Ne and the load Q as parameters) to obtain a particular target exhaust gas temperature. The method of determining the target fuel injection quantity for the main combustion involves torque correction as described in more detail below.

Figure 21:
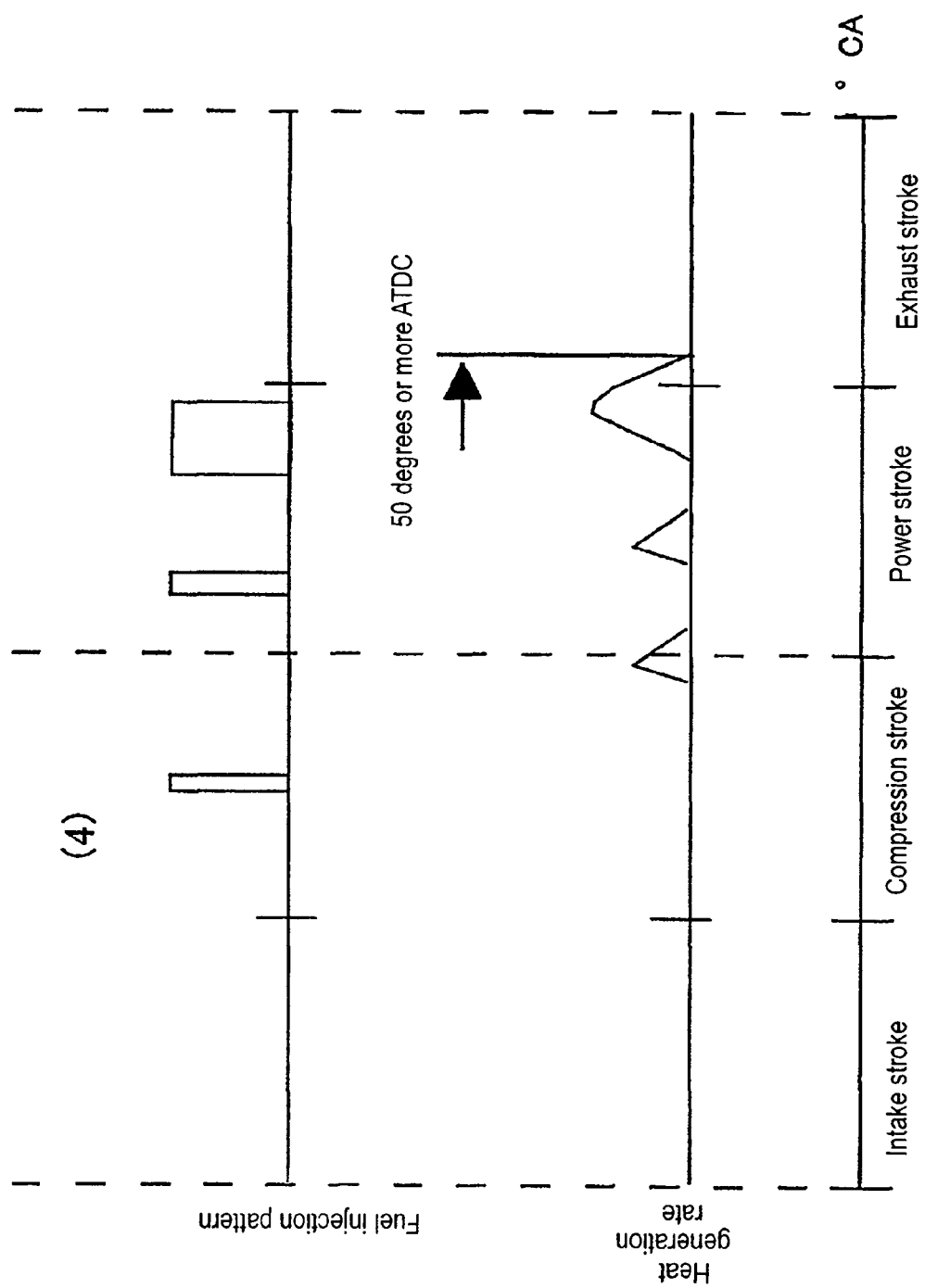
FIG. 21 is a diagram showing the injection and combustion pattern in a control executed in the internal combustion engine control device in accordance with an alternative embodiment of the present invention.

When the load Q is low and the timing of the main combustion is greatly retarded in order to achieve the target exhaust gas temperature, it may not be possible to maintain the inside of the cylinder at a high temperature until the fuel for the main combustion is injected if a only a single preliminary combustion is conducted as seen in FIG. 15. In such a case, the control unit 20 can be configured and arranged to execute a plurality of preliminary combustions as shown in FIG. 21. By controlling the timings of the preliminary combustions such that the heat generation resulting from each of the preliminary combustions does not overlap with the others, low smoke emission and a high exhaust gas temperature can be achieved simultaneously even if the diesel engine 1 is operating under low load conditions.

Figure 22:
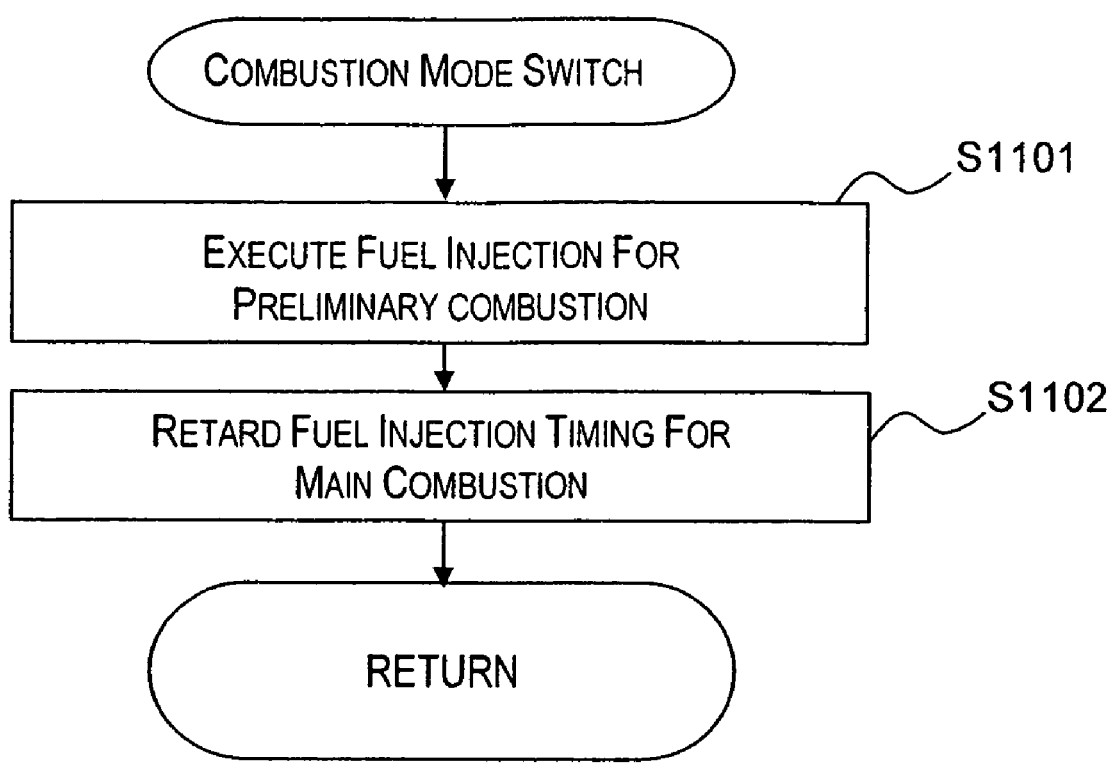
FIG. 22 is a flowchart showing a control process for switching a combustion control mode to a staged retarded combustion mode.

Thus, when a low exhaust gas $\lambda$ and a high exhaust gas temperature are required in order to perform the regeneration of the DPF 14, the desulfurization of the NOx trapping catalytic converter 13, or the like, the control unit 20 is configured to switch the combustion mode of the diesel engine 1 from the normal lean combustion mode to the staged retarded combustion control mode in accordance with the present invention. More specifically, as shown in the flowchart of FIG. 22, the fuel is injected at the fuel injection timing for the preliminary combustion (determined as in FIG. 18) and with the fuel injection quantity for the preliminary combustion (determined as in FIG. 19) in step S1101 of FIG. 22. Then, in step S1102, the fuel for the main combustion is injected at a retarded injection timing (determined as in FIG. 20).

Referring back to the flowchart of FIG. 3, after switching the combustion mode of the diesel engine 1 from the normal lean combustion mode to the staged retarded combustion mode in accordance with the present invention in order to regenerate the DPF 14, the control unit 20 is configured to proceed to step S102.

Figure 23:
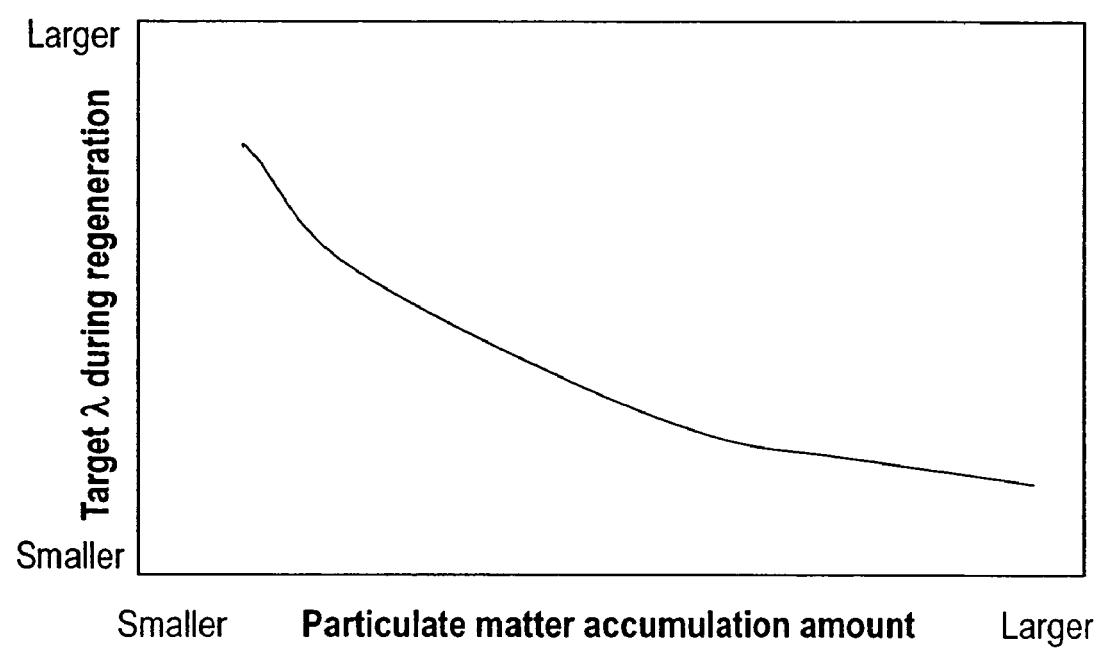
FIG. 23 is a diagram showing the correlation between a target air-fuel ratio λ during regeneration of a particulate filter versus an amount of accumulated particulate matter in DPF in accordance with the preferred embodiment of the present invention.

In step S102, the control unit 20 is configured to control the exhaust gas $\lambda$ to a target value. During the regeneration of the DPF 14, the target value of the exhaust gas $\lambda$ is arranged to vary depending on the amount of accumulated particulate matter in the DPF 14. The control unit 20 is configured to control the exhaust gas $\lambda$ by detecting the exhaust gas pressure at the inlet to the DPF 14, comparing the detected exhaust gas pressure to a reference exhaust gas pressure corresponding to the current operating condition (determined by the engine rotational speed and the load), estimating the amount of accumulated particulate matter, and setting a target $\lambda$ based on the estimated amount of accumulated particulate matter using the map shown in FIG. 23.

Since the retarded timing of the combustion causes the torque to decline, the control for obtaining the target $\lambda$ includes steps for correcting the torque for compensating the torque decline when the diesel engine 1 is operated in the staged retarded combustion mode. The control sequence for obtaining the target $\lambda$ is discussed in more detail later.

In step S103 of FIG. 3, the control unit 20 is configured to determine if the temperature of the DPF 14 has exceeded a target upper limit value T22 during the regeneration of the DPF 14. If the temperature of the DPF 14 is greater than the target upper limit value T22, the control unit 20 is configured to determine a regeneration upper limit value has been exceeded. Then, the control unit 20 is configured to proceed to step S110, where the control unit 20 is configured to advance the fuel injection timing of the main combustion to reduce the exhaust gas temperature.

In step S104, the control unit 20 is configured to determine if the temperature of the DPF 14 has fallen below a target lower limit value T21 during the regeneration of the DPF 14. If the temperature of the DPF 14 is less than the target lower limit value T21, the control unit 20 is configured to determine that a regeneration lower limit value has been passed. Then, the control unit 20 is configured to proceed to step S109, where the control unit 20 is configured to retard the fuel injection timing of the main combustion to increase the exhaust gas temperature.

In step S105, the control unit 20 is configured to determine if a prescribed amount of time tdpfreg has elapsed since the regeneration of the DPF 14 started. If the prescribed amount of time tdpfreg has elapsed, the control unit 20 is configured to determine that the particulate matter accumulated in the DPF 14 has been reliably burned and eliminated from the DPF 14 and proceed to step S106.

In step S106, since the regeneration of the DPF 14 has been completed, the control unit 20 is configured to switch from the staged retarded combustion mode in accordance with the present invention to the normal combustion mode in order to terminate the heating of the DPF 14 for regeneration.

In step S107, the control unit 20 is configured to set the regeneration flag reg to 0 because the regeneration of the DPF 14 has been completed.

In step S108, the control unit 20 is configured to set the heat damage prevention flag rec to 1 to enter in a heat damage prevention mode because, although the regeneration of the DPF 14 is complete, there is a possibility that particulate matter remaining in the DPF 14 could rapidly burn up and cause heating damage to the DPF 14 if the exhaust gas $\lambda$ is suddenly increased.

Figure 4:
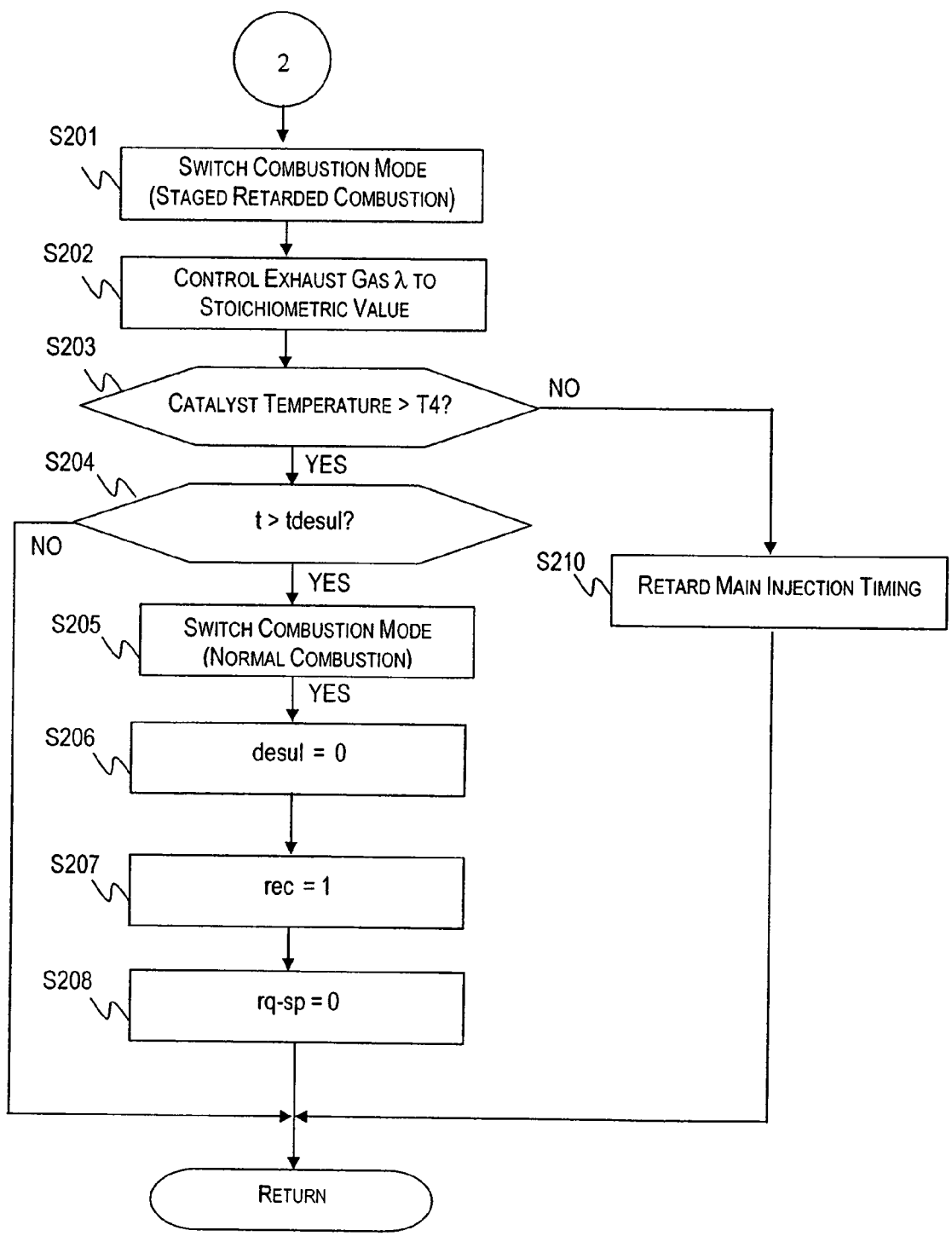
FIG. 4 is a third flowchart describing the exhaust gas cleaning control executed by the internal combustion engine control device in accordance with the preferred embodiment of the present invention.

Referring now to FIG. 4, the desulfurization mode control will be described. The control sequence shown in FIG. 4 starts when the desulfurization flag desul is set to 1. The desulfurization flag desul is set to one when the amount of sulfur accumulated in the NOx trapping catalytic converter 13 reaches a prescribed value S1, causing the desulfurization request flag rq-desul to be set to 1 in the control sequence shown in FIG. 8 (discussed later).

In step S201, the control unit 20 is configured to switch the combustion mode of the diesel engine 1 from the normal lean combustion to the staged retarded combustion in accordance with this embodiment in order to desulfurize the NOx trapping catalytic converter 13.

In step S202, the control unit 20 is configured to control the exhaust gas $\lambda$ to the stoichiometric value. In other words, the target λ is set to the stoichiometric value and the exhaust gas λ is controlled accordingly. The control sequence for obtaining the target λ is discussed in more detail later. Since the retarded timing of the combustion causes the torque to decline, the control for obtaining the target λ includes steps for correcting the torque to compensate the torque decline.

In step S203, the control unit 20 is configured to determine if the catalyst temperature of the NOx trapping catalytic converter 13 has exceeded a prescribed value T4. The prescribed value T4 is preferably set to a value suitable to desulfurize the catalyst used in the NOx trapping catalytic converter 13. For example, if the NOx trapping catalytic converter 13 uses a barium-based catalyst, the prescribed value T4 is set to 600° C. or higher because it is necessary to expose the barium-based catalyst to a rich or stoichiometric air-fuel ratio at 600° C. or higher to desulfurize the NOx trapping catalytic converter 13.

If the catalyst temperature is below the prescribed value T4 in step S203, the control unit 20 is configured to proceed to step S210. In step S210, the control unit 20 is configured to retard the fuel injection timing of the main combustion to increase the exhaust gas temperature.

In step S204, the control unit 20 is configured to determine if a prescribed amount of time tdesul has elapsed since the desulfurization mode started. If the prescribed amount of time tdesul has elapsed, the control unit 20 is configured to proceed to step S205 to end the desulfurization of the NOx trapping catalytic converter 13.

In step S204, since the desulfurization of the NOx trapping catalytic converter 13 has been completed, the control unit 20 is configured to switch from the staged retarded combustion mode in accordance with the present invention to the normal combustion mode in order to terminate the heating of the NOx trapping catalytic converter 13 for desulfurization. Simultaneously, the control unit 20 is configured to cancel the stoichiometric operation.

In step S206, the control unit 20 is configured to set the desulfurization flag desul to 0 because the desulfurization of the NOx trapping catalytic converter has been completed.

In step S207, the control unit 20 is configured to set the heat damage prevention flag rec to 1 to enter the heat damage prevention mode because, although the desulfurization of the NOx trapping catalytic converter 13 is complete, there is a possibility that the high temperature conditions could cause the particulate matter accumulated in the DPF 14 to rapidly burn up and cause heating damage if the exhaust gas λ is suddenly increased.

In step S208, the rich spike request flag rq-sp is set to 0. When the desulfurization of the NOx trapping catalytic converter 13 is executed, the NOx trapping catalytic converter 13 is subjected to stoichiometric conditions for a long period of time and the NOx accumulated in the NOx trapping catalytic converter 13 is simultaneously released and cleaned. Therefore, the rich spike request flag rq-sp is set to 0 to cancel the request for release and cleaning of the NOx (i.e., request for rich spike operation) in case the rich spike request has been issued.

Figure 5:
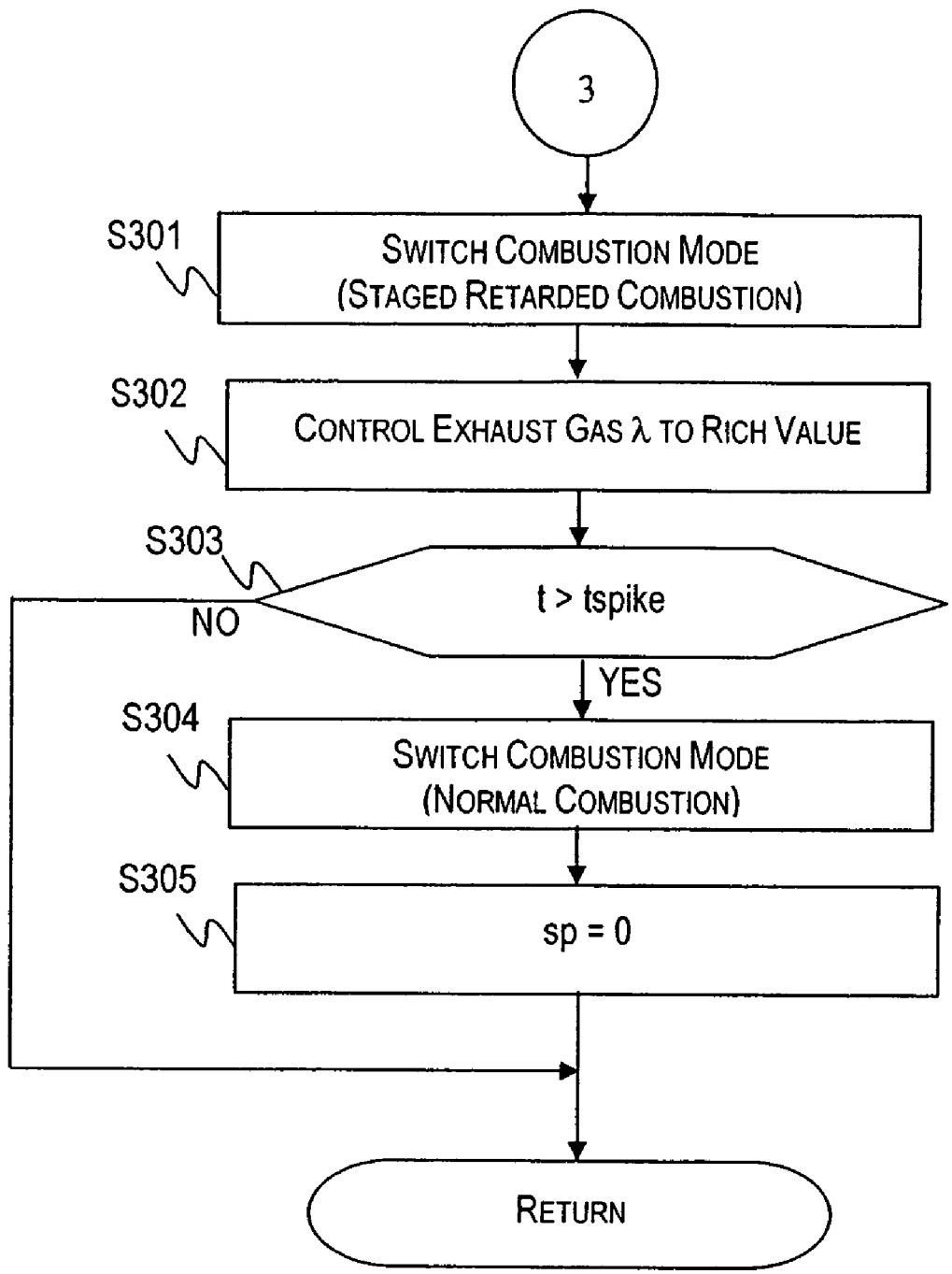
FIG. 5 is a fourth flowchart describing the exhaust gas cleaning control executed by the internal combustion engine control device in accordance with the preferred embodiment of the present invention.

Referring now to FIG. 5, the rich spike mode (NOx release/cleaning mode) control will be described. The control sequence shown in FIG. 5 starts when the rich spike flag sp is set to 1. The rich spike flag sp is set to one when the amount of NOx accumulated in the NOx trapping catalytic converter 13 reaches a prescribed value NOx1, causing the rich spike request flag rq-sp to be set to 1 in FIG. 7 or 8 (discussed later).

In step S301, the control unit 20 is configured to switch the combustion mode of the diesel engine 1 from the normal lean combustion mode to the staged retarded combustion mode in accordance with this invention in order to release and clean the NOx accumulated in the NOx trapping catalytic converter 13.

In step S302, the control unit 20 is configured to control the exhaust gas λ to a rich value. In other words, the target λ is set to a rich value and the exhaust gas λ is controlled accordingly. The control sequence for obtaining the target λ is discussed in more detail later. Since the retarded timing of the combustion causes the torque to decline, the control for obtaining the target λ includes steps for correcting the torque to compensate the torque decline.

In step S303, the control unit 20 is configured to determine if a prescribed amount of time tspike has elapsed since the rich spike mode started. If the prescribed amount of time tspike has elapsed, the control unit 20 is configured to proceed to step S304 where the control unit 20 is configured to determine that NOx release/cleaning of the NOx trapping catalytic converter 13 has been completed.

In step S304, since the NOx release/cleaning of the NOx trapping catalytic converter 13 has been completed, the control unit 20 is configured to switch from the staged retarded combustion mode in accordance with the present invention to the normal combustion mode. Simultaneously, the control unit 20 is configured to cancel the rich operation.

In step S305, the control unit 20 is configured to set the rich spike flag sp to 0 because the NOx release/cleaning of the NOx trapping catalytic converter 13 has been completed.

Figure 6:
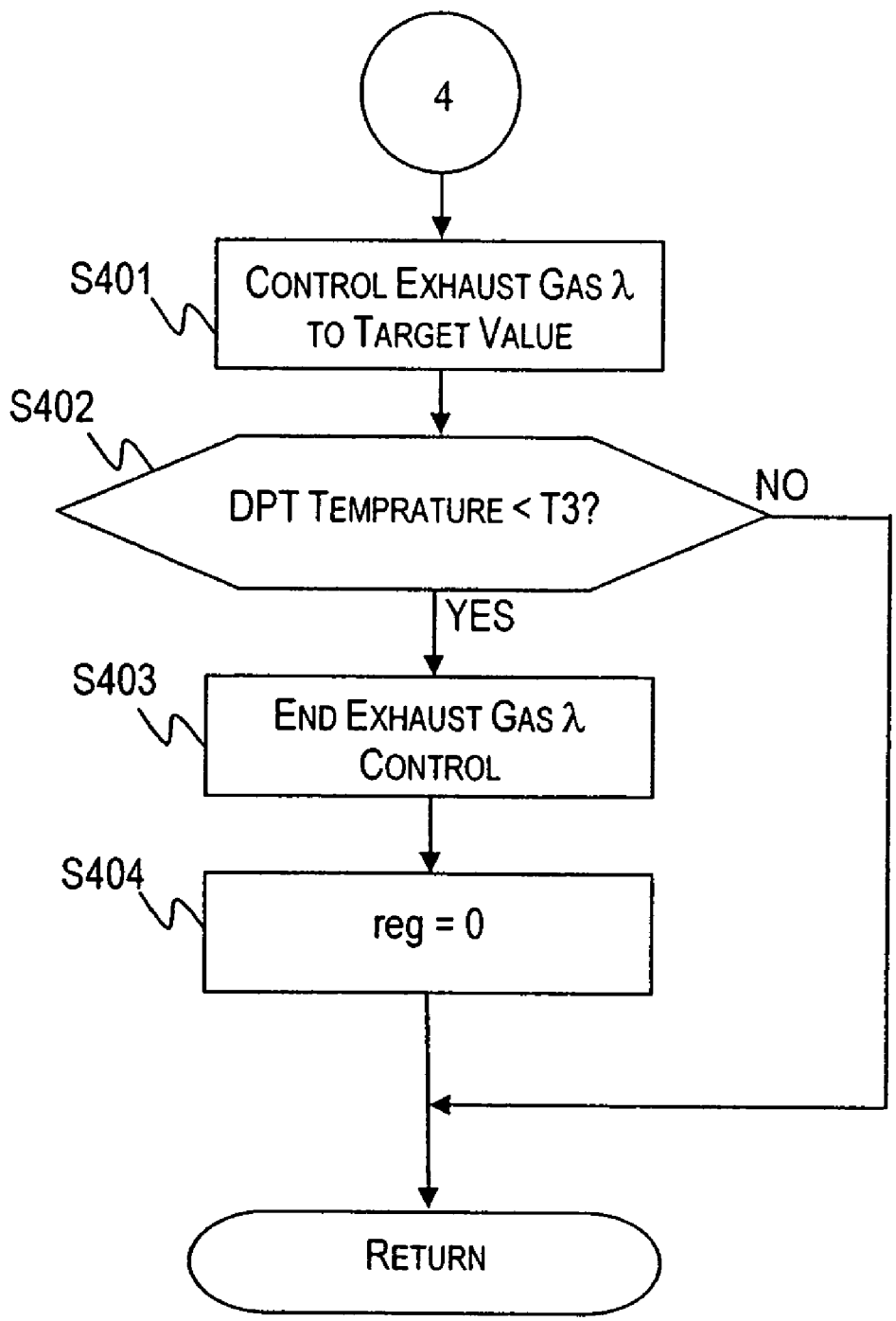
FIG. 6 is a fifth flowchart describing the exhaust gas cleaning control executed by the internal combustion engine control device in accordance with the preferred embodiment of the present invention.

Referring now to FIG. 6, the heat damage prevention control will be described. The control sequence shown in FIG. 6 starts when the regeneration of the DPF 14 or the desulfurization of the NOx trapping catalytic converter 13 ends, and the heat damage prevention flag rec is set to 1 in the control sequence shown in FIG. 3 or 4.

Since the temperature is still high immediately after the regeneration of the DPF 14 or the desulfurization of the NOx trapping catalytic converter 13, there is the possibility that particulate matter remaining in the DPF 14 could rapidly burn up and cause heating damage if the exhaust gas λ is suddenly changed to a lean value. Thus, in step S401, the control unit 20 is configured to control the exhaust gas λ to a target value, e.g., a value equal to or less than 1.4. Since a low exhaust gas temperature is desired during the heat damage prevention mode, the control unit 20 is configured to control the exhaust gas λ to the target value using the normal combustion mode instead of the staged retarded combustion mode in accordance with the present invention.

In step S402, the control unit 20 is configured to determine if the temperature of the DPF 14 is lower than a prescribed temperature T3 (e.g., 500° C.). The prescribed temperature T3 is preferably set to a temperature at which there is no risk of particulate matter starting to rapidly oxidize. If the temperature of the DPF 14 is higher than the prescribed temperature T3, the control unit 20 is configured to continue to control the exhaust gas λ according to the control sequence shown in FIG. 6. If the temperature of the DPF 14 is lower than the prescribed temperature T3, the control unit 20 is configured to proceed to step S403 because damage to the DPF 14 can be avoided even if the oxygen concentration reaches a value approximately equal to the oxygen concentration of the atmosphere.

In step S403, the control unit 20 is configured to end the exhaust gas λ control because there is no risk of damaging the DPF 14.

In step S404, the control unit 20 is configured to set the heat damage prevention flag rec to 0 because the heat damage prevention mode has ended.

Figure 7:
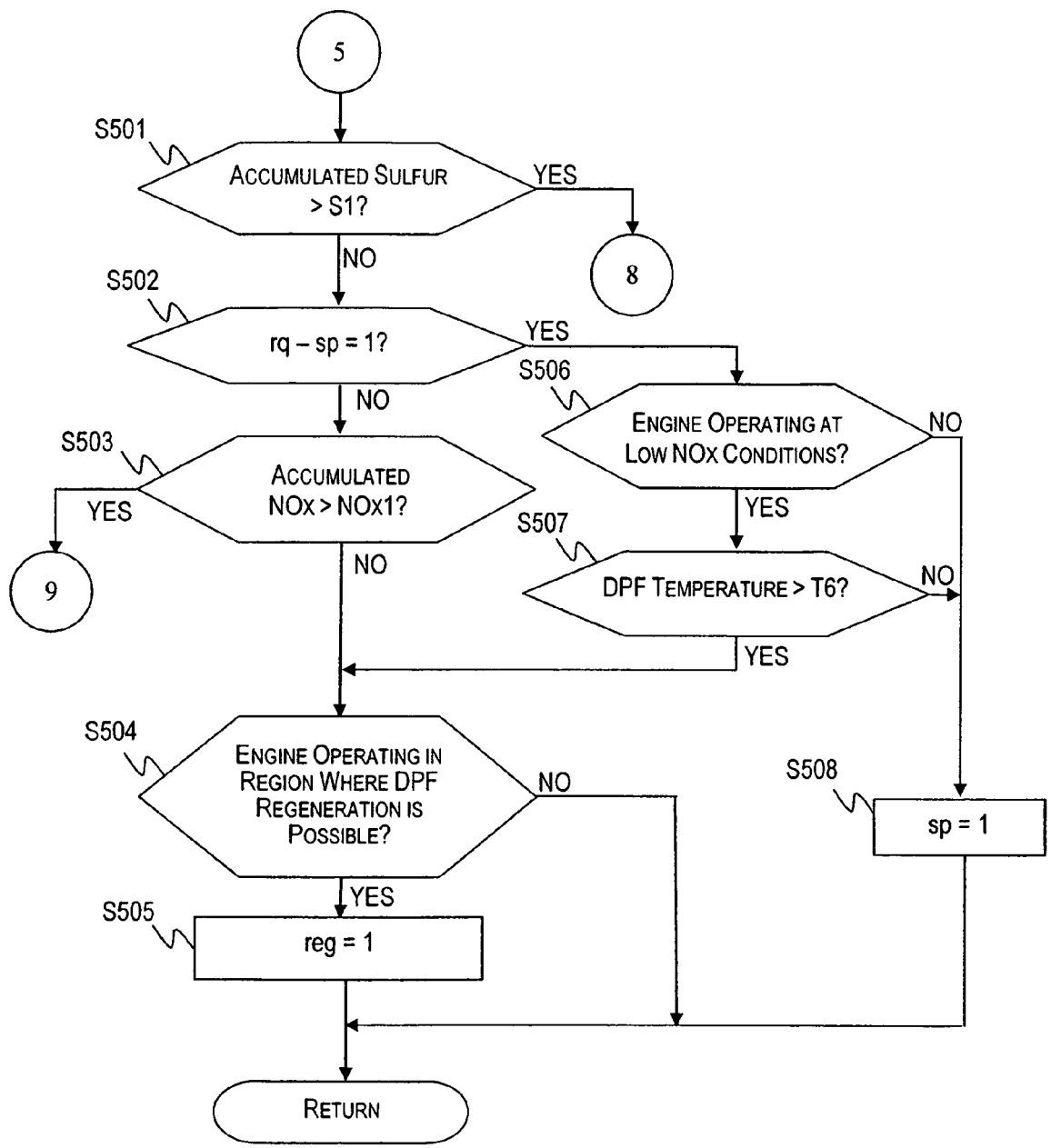
FIG. 7 is a sixth flowchart describing the exhaust gas cleaning control executed by the internal combustion engine control device in accordance with the preferred embodiment of the present invention.

Referring now to FIG. 7, the control sequence for determining a regeneration priority between the regeneration of the DPF 14 and the regeneration of the NOx trapping catalytic converter 13 will be described. The control sequence shown in FIG. 7 starts when a DPF regeneration request is issued (flag rq-DPF is set to 1). The control sequence shown in FIG. 7 is configured to determine the order of priority when a DPF regeneration request and a desulfurization or NOx release/cleaning request occur simultaneously.

Figure 2:
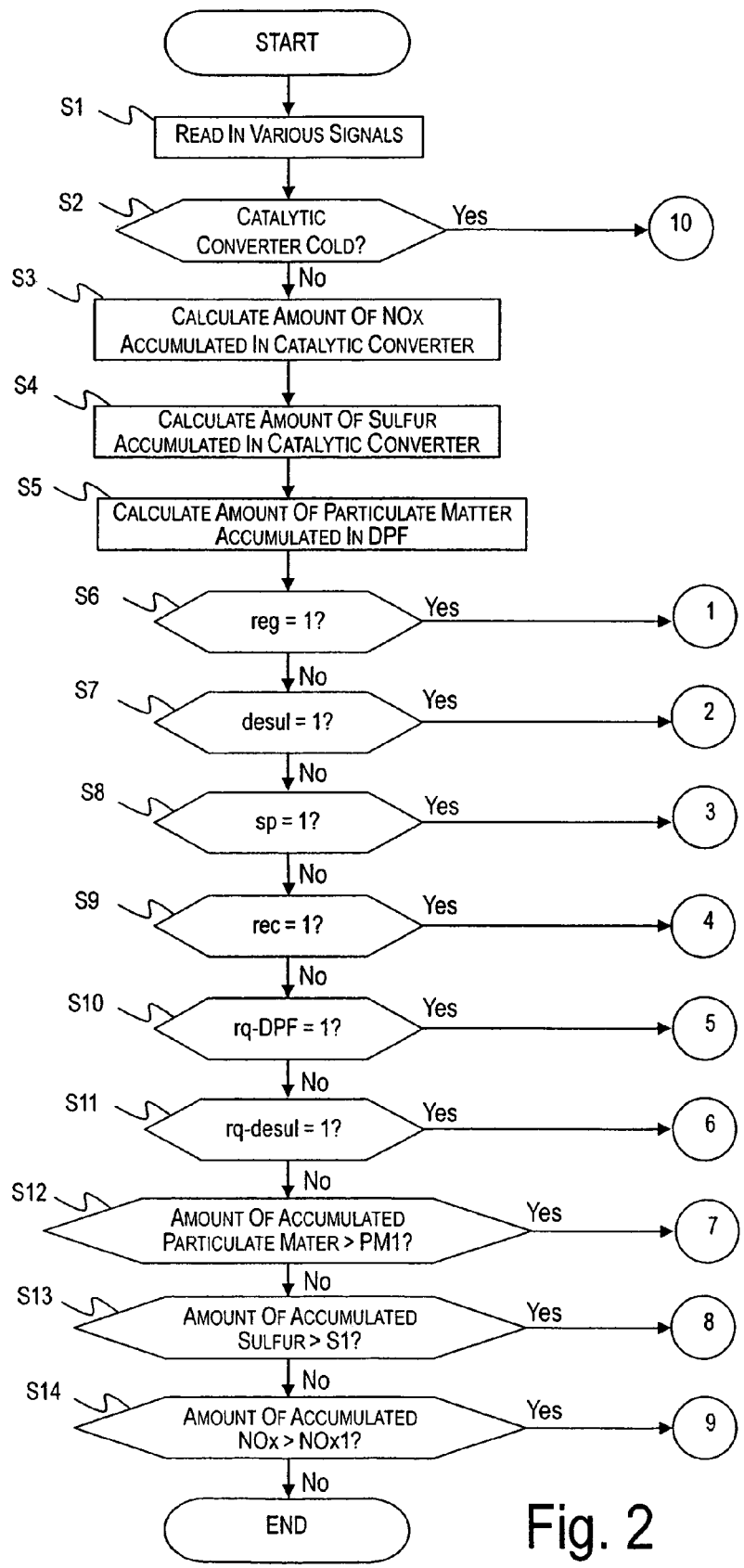
FIG. 2 is a first flowchart describing an exhaust gas cleaning control executed by the internal combustion engine control device in accordance with the preferred embodiment of the present invention.

In step S501, the control unit 20 is configured to use the same method as in step S13 in FIG. 2 to determine if the amount of accumulated sulfur in the NOx trapping catalytic converter 13 has reached the prescribed value S1 (indicating it is time to desulfurize the NOx trapping catalytic converter 13) since the request for DPF regeneration was issued.

Figure 10:
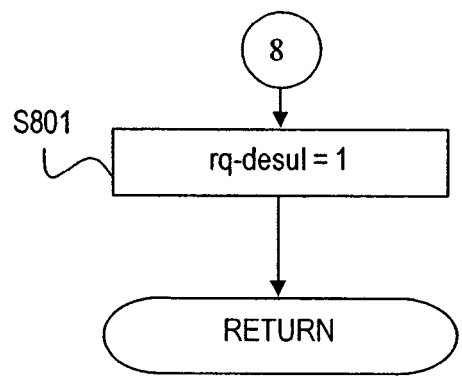
FIG. 10 is a ninth flowchart describing the exhaust gas cleaning control executed by the internal combustion engine control device in accordance with the preferred embodiment of the present invention.

If the amount of accumulated sulfur in the NOx trapping catalytic converter 13 is larger than the prescribed value S1, the control unit 20 is configured to proceed to step S801 of FIG. 10 where the control unit 20 is configured to set the value of the flag rq-desul to 1 to issue a request for desulfurization of the NOx trapping catalytic converter. In such a case, the order of priority of the regeneration is determined by the control sequence shown in FIG. 8 (discussed later).

If the amount of accumulated sulfur in the NOx trapping catalytic converter 13 is less than the prescribed value S1 in step S501, the control unit 20 is configured to proceed to step S502.

In step S502, the control unit 20 is configured to determine if the rich spike request flag rq-sp is 1, i.e., if a request for NOx release/cleaning (request for rich spike operation) has been issued. If the value of the rich spike request flag rq-sp is not 1 in step S502, the control unit 20 is configured to proceed to step S503.

In step S503, the control unit 20 is configured to use the same method as in step S14 in FIG. 2 to determine if the amount of accumulated NOx in the NOx trapping catalytic converter 13 has reached a prescribed value NOx1 (indicating it is time to release/clean the NOx) since the request for DPF regeneration was issued.

Figure 11:
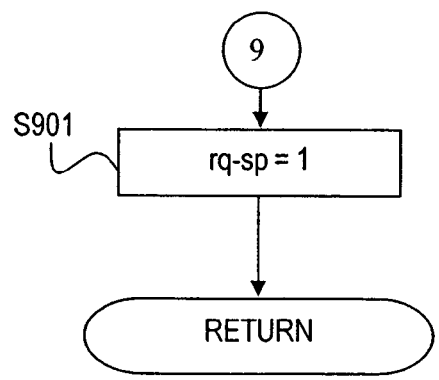
FIG. 11 is a tenth flowchart describing the exhaust gas cleaning control executed by the internal combustion engine control device in accordance with the preferred embodiment of the present invention.

If the amount of accumulated NOx in the NOx trapping catalytic converter 13 is larger than the prescribed value NOx1, the control unit 20 is configured to proceed to step S901 of the flowchart shown in FIG. 11 where the control unit 20 is configured to set the value of the rich spike request flag rq-sp to 1 to issue a request for releasing and cleaning the trapped NOx (request for rich spike operation).

If the amount of accumulated NOx in the NOx trapping catalytic converter 13 is determined to be less than the prescribed value NOx1 in-step S503, the control unit 20 is configured to determine that the only regeneration request being issued is a request for DPF regeneration, and proceed to step S504.

Figure 24:
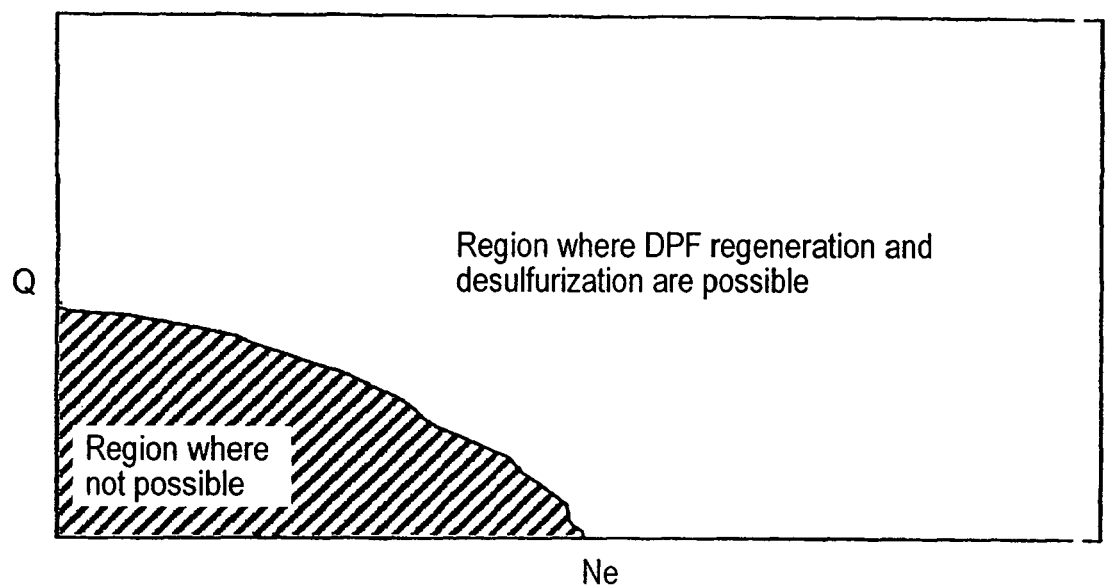
FIG. 24 is a diagram showing an operating region where the regeneration of DPF and desulfurization are possible in accordance with the preferred embodiment of the present invention.

In step S504, the control unit 20 is configured to determine if the diesel engine 1 is operating in a region (shown in FIG. 24) where the regeneration of the DPF 14 and the desulfurization of the NOx trapping catalytic converter 13 are possible (i.e., a region where the rotational speed Ne and load Q are not low, the increase in temperature will be comparatively small, and the degradation of the exhaust performance will not exceed an allowable value). If the engine is operating in a region where the DPF 14 can be regenerated as shown in FIG. 24, the control unit 20 is configured to proceed to step S505 where the control unit 20 is configured to set the value of the regeneration flag reg to 1 to shift to the DPF regeneration mode.

If the value of the rich spike request flag rq-sp is determined to be 1 in step S502, the control unit 20 is configured to proceed to step S506 because there are requests for both DPF regeneration and NOx release/cleaning have been issued simultaneously.

In step S506, the control unit 20 is configured to determine if the engine operating condition is such that amount of NOx emission is low (e.g., steady state condition). If the diesel engine 1 is operating under a condition in which the amount of NOx emission is low, the regeneration of the NOx trapping catalytic converter 13 can be delayed to a certain extent without greatly degrading the exhaust gas leaving a tailpipe of the vehicle. Therefore, the control unit 20 is configured to proceed to step S507 because the state of the DPF 14 will have a larger effect on the operating performance of the diesel engine 1 and, thus, it is preferable to prioritize the regeneration of the DPF 14 over the releasing and cleaning of the NOx accumulated in the NOx trapping catalytic converter 13.

On the other hand, if the engine operating condition is such that the amount of NOx emission is large (e.g., when the vehicle is accelerating) in step S506, it is preferable to prioritize the regeneration of the NOx trapping catalytic converter 13 over the regeneration of the DPF 14 in order to prevent degradation of the exhaust gas leaving the tailpipe of the vehicle. Therefore, the control unit 20 is configured to proceed to step S508 where the control unit 20 is configured to set the rich spike flag sp to 1 to shift to the NOx release/cleaning (rich spike) mode.

In step S507, the control unit 20 is configured to determine if the temperature of the DPF 14 is higher than a prescribed temperature T6 at which the oxidation catalyst carried by the DPF 14 becomes active. If the DPF regeneration mode is started while the temperature of the DPF 14 is lower than the prescribed temperature T6 at which the oxidation catalyst carried by the DPF 14 becomes active, it will take time for the DPF 14 to reach a temperature at which regeneration can be accomplished. In such case, there is a possibility that the NOx emissions discharged from the tailpipe of the vehicle will worsen during the ensuing waiting period until the temperature of the DPF 14 reaches a sufficient temperature for the regeneration. Therefore, if the temperature of the DPF 14 is lower than the prescribed temperature T6 in step S507, it is preferable to prioritize the regeneration of the NOx trapping catalytic converter 13. Thus, the control unit 20 is configured to proceed to step S508, where the control unit 20 is configured to set the value of the rich spike flag sp to 1 to shift to the NOx release/cleaning (rich spike) mode.

If the temperature of the DPF 14 is determined to be higher than the prescribed temperature T6 in step S507, the control unit 20 is configured to prioritize the regeneration of the DPF 14 and proceed to steps S504 and S505.

Figure 8:
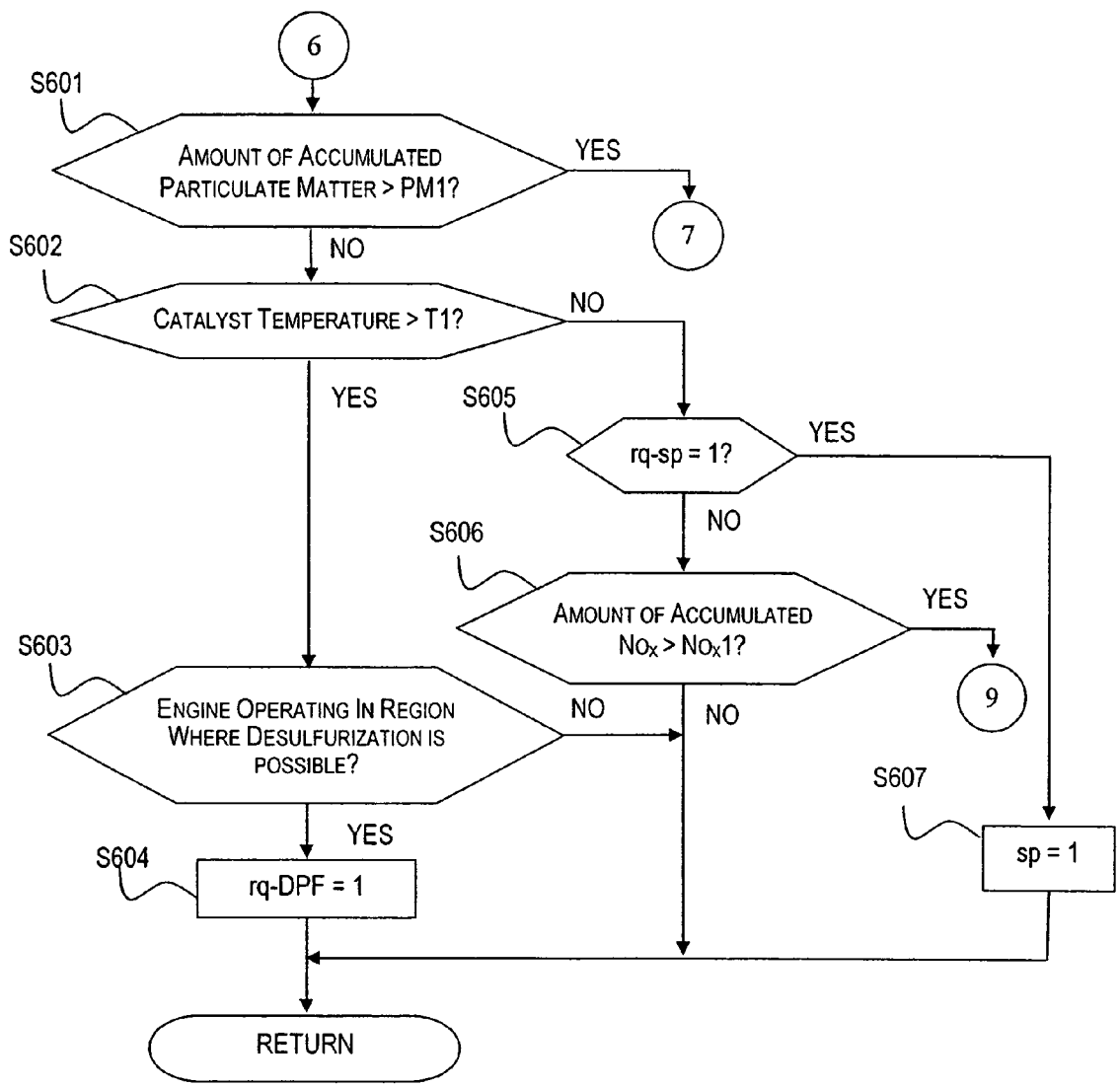
FIG. 8 is a seventh flowchart describing the exhaust gas cleaning control executed by the internal combustion engine control device in accordance with the preferred embodiment of the present invention.
Figure 9:
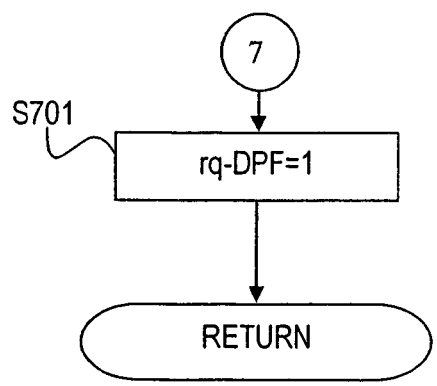
FIG. 9 is an eighth flowchart describing the exhaust gas cleaning control executed by the internal combustion engine control device in accordance with the preferred embodiment of the present invention.

Referring now to FIG. 8, the control sequence for determining a regeneration priority between the desulfurization of the NOx trapping catalytic converter 13 and the regeneration of the NOx trapping catalytic converter 13 will be described. The control sequence shown in FIG. 8 starts when a request for desulfurization is issued (i.e., when the flag rq-desul is set to 1). The control sequence described in FIG. 8 is configured to determine the order of priority when a desulfurization request and a NOx release/cleaning request occur simultaneously.

In step S601, the control unit 20 is configured to use the same method as in step S12 in FIG. 2 to determine if the amount of accumulated particulate matter in the DPF 14 has reached the prescribed value PM1 (indicating it is time to regenerate the DPF 14) since the request for the desulfurization was issued. If the amount of accumulated particulate matter is larger than the prescribed value PM1, the control unit 20 is configured to proceed to step S701 of FIG. 9 where the control unit 20 is configured to set the value of the flag rq-DPF to 1 to issue a request for DPF regeneration. In such case, the order of priority for the regeneration is determined by the control sequence shown in FIG. 7 as explained above.

If the amount of accumulated particulate matter in the DPF 14 is smaller than the prescribed value PM1, the control unit is configured to proceed to step S602.

In step S602, the control unit 20 is configured to determine if the catalyst temperature of the NOx trapping catalytic converter 13 is higher than a prescribed temperature T1. If the catalyst temperature is higher than the prescribed temperature T1, the control unit 20 is configured to proceed to step S603.

In step S603, the control unit 20 is configured to determine if the diesel engine 1 is operating in a region (shown in FIG. 24) where the regeneration of the DPF 14 and the desulfurization of the NOx trapping catalytic converter 13 are possible (i.e., a region where the rotational speed and load of the diesel engine 1 are not low, the increase in temperature will be comparatively small, and the degradation of the exhaust performance will not exceed an allowable value). If the diesel engine 1 is operating in a region where the desulfurization of the NOx trapping catalytic converter 13 can be performed, the control unit 20 is configured to proceed to step S604 where the control unit 20 is configured to set the value of the desulfurization flag desul to 1 to shift to the desulfurization mode.

If the control unit 20 determines that the catalyst temperature is less than the prescribed temperature T1 in step S602, it is preferable to prioritize releasing and cleaning of NOx accumulated in the NOx trapping catalytic converter 13 (the regeneration of the NOx trapping catalytic converter 13) over the desulfurization of the NOx trapping catalytic converter 13. Thus, the control unit 20 is configured to proceed to step S605. More specifically, if the desulfurization mode is started while the catalyst temperature is lower than the prescribed temperature T1, it will take time for the catalyst in the NOx trapping catalytic converter 13 to reach a temperature at which the desulfurization can be accomplished. In such case, there is a possibility that the NOx emissions discharged from the tailpipe of the vehicle will worsen during the ensuing waiting period for the desulfurization.

In step S605, the control unit 20 is configured to determine if the rich spike request flag rq-sp has a value of 1, i.e., if a request for releasing and cleaning the trapped NOx has been issued. If the rich spike request flag rq-sp has a value of 1, the control unit 20 is configured to proceed to step S607 where the control unit 20 is configured to set the value of the rich spike flag sp to 1 to shift to the NOx release/cleaning (rich spike) mode.

If the value of the rich spike request flag rq-sp is not 1 in step S605, the control unit 20 is configured to proceed to step S606. In step S606, the control unit 20 is configured to use the same method as in step S14 in FIG. 2 to determine if the amount of NOx accumulated in the NOx trapping catalytic converter 13 has reached the prescribed value NOx1 (indicating it is time to release/clean the NOx) since the request for desulfurization was issued.

If the amount of NOx accumulated in the NOx trapping catalytic converter 13 is larger than the prescribed value NOx1 in step S606, the control unit 20 is configured to proceed to step S901 of the flowchart shown in FIG. 11. In step S901 of FIG. 11, the control unit 20 is configured to set the value of the rich spike request flag rq-sp to 1.

Figure 12:
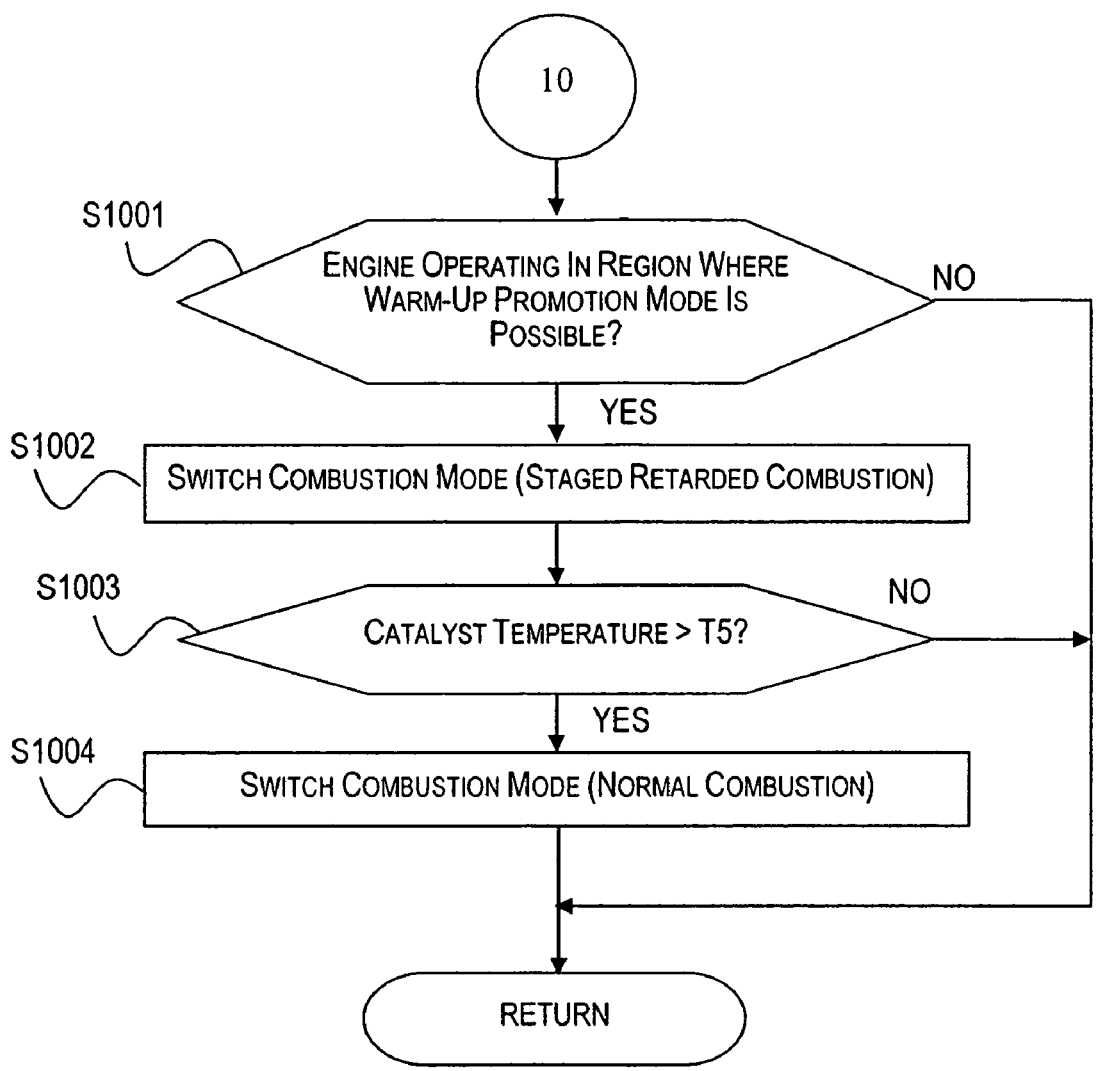
FIG. 12 is an eleventh flowchart describing the exhaust gas cleaning control executed by the internal combustion engine control device in accordance with the preferred embodiment of the present invention.

Referring now to FIG. 12, the warm-up promotion mode control will be described. The control sequence described in FIG. 12 is executed when the catalyst temperature of the NOx trapping catalytic converter 13 is equal to or below the active temperature T5.

In step S1001 of FIG. 12, the control unit 20 is configured to determine if the diesel engine 1 is operating in a region where it is possible to execute the warm-up promotion mode. Since the warm-up promotion is accomplished by executing the staged retarded combustion in accordance with the preferred embodiment of the present invention, the control unit 20 is configured to determine in step S1001 if the diesel engine 1 is operating in a region where the staged retarded combustion can be conducted. More specifically, the control unit 20 is configured to determine that the diesel engine 1 is operating in a region where it is possible to execute warm-up promotion mode if the diesel engine 1 is operating in the region shown in FIG. 24 where the regeneration of the DPF 14 and the desulfurization of the NOx trapping catalytic converter 13 are possible. If the control unit 20 determines that the diesel engine 1 is operating in the region shown in FIG. 24 where the regeneration of the DPF 14 and the desulfurization of the NOx trapping catalytic converter 13 are possible, the control unit 20 is configured to proceed to step S1002.

In step S1002, the control unit 20 is configured to switch the combustion mode of the diesel engine 1 from the normal lean combustion to the staged retarded combustion in order to raise the exhaust gas temperature and promote warming of the catalyst of the NOx trapping catalytic converter 13.

Similarly to the controls explained above, the control unit 20 is configured to control the exhaust gas temperature by setting a target $\lambda$. The control sequence for obtaining the target $\lambda$ is discussed in more detail later. Since the retarded timing of the combustion in the staged retarded combustion causes the torque to decline, the control for obtaining the target $\lambda$ includes steps for correcting the torque to compensate for the torque decline.

In step S1003, the control unit 20 is configured to determine if the catalyst temperature of the NOx trapping catalytic converter 13 is higher than the active temperature T5 at which the catalyst becomes active. If the catalyst temperature is greater than the active temperature T5, the control unit 20 is configured to proceed to step S1004 and switch from the staged retarded combustion mode in accordance with the present invention to the normal combustion mode, thereby ending the warm-up promotion mode.

The control sequence explained above shown in the flowcharts of FIGS. 2 to 12 basically corresponds to a combustion control section of the present invention.

Referring now to FIGS. 25 to 29, the control process for controlling the exhaust gas $\lambda$ to the target $\lambda$ during the staged retarded combustion mode and the control process for correcting the torque by taking into account the fuel property in accordance with the present invention will be described.

As mentioned above, since the torque declines when the combustion timing is retarded during the staged retarded combustion mode, the challenge of controlling the exhaust gas $\lambda$ lies in how to compensate for the torque decline while maintaining the target $\lambda$. The more the fuel injection timing for the main combustion in the staged retarded combustion is retarded and the exhaust gas temperature is increased, the more the torque declines. Furthermore, in the case of the warm-up promotion mode, the lower the temperatures of the various components of the engine, the more the combustion efficiency declines and the more the torque declines even if the fuel injection timing for the main combustion is constant (not retarded). Additionally, since the amount by which the torque declines varies also depending on the property of the fuel used for the combustion, the internal combustion engine control device of the present invention is configured to modify the torque correction value in accordance with the change in the fuel property with respect to reference fuel property.

Figure 25:
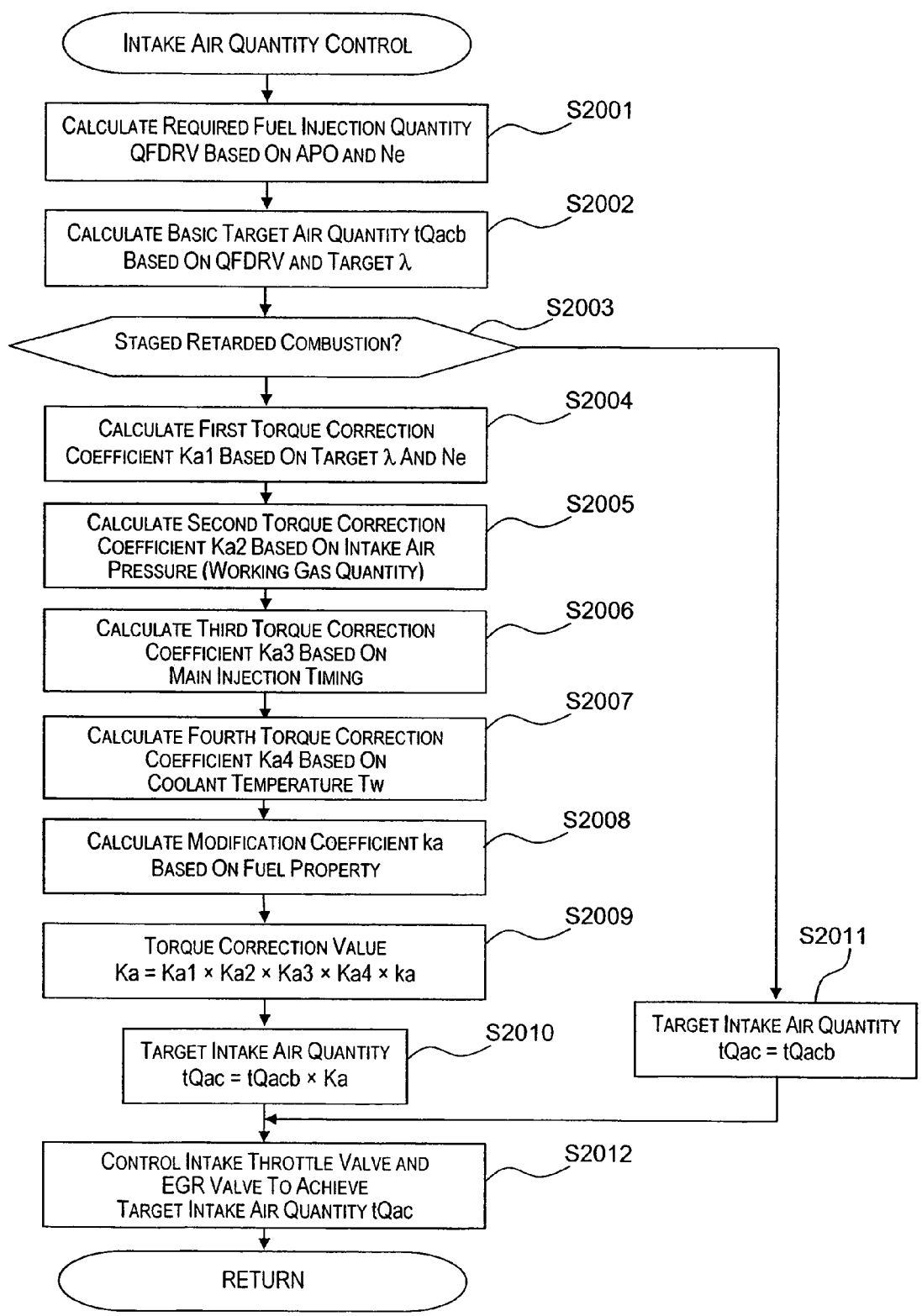
FIG. 25 is a flowchart illustrating a control process executed in the internal combustion engine control device for controlling an intake air quantity including a torque correction control in accordance with the preferred embodiment of the present invention.

FIG. 25 is a flowchart showing the control sequence executed in the control unit 20 for controlling the intake air quantity including a torque correction. Thus, the control sequence shown in FIG. 25 basically corresponds to an intake air quantity control section of the present invention.

In step S2001 of FIG. 25, the control unit 20 is configured to calculate a required fuel injection quantity QFDRV corresponding to a required engine torque determined based on the accelerator position APO and the engine rotational speed Ne.

In step S2002, the control unit 20 is configured to calculate a basic target air quantity tQacb based on the required fuel injection quantity QFDRV and the target λ. The target λ is respectively set as described previously based on whether the staged retarded combustion is to be used for the regeneration of the DPF 14, the desulfurization or the NOx release/cleaning of the NOx trapping catalytic converter 13, or the warm-up promotion.

In step S2003, the control unit 20 is configured to determine if the staged retarded combustion is in progress (i.e., if the diesel engine 1 is operating in the staged retarded combustion mode). If the staged retarded combustion is in progress, the control unit 20 is configured to proceed to step S2004.

Figure 30:
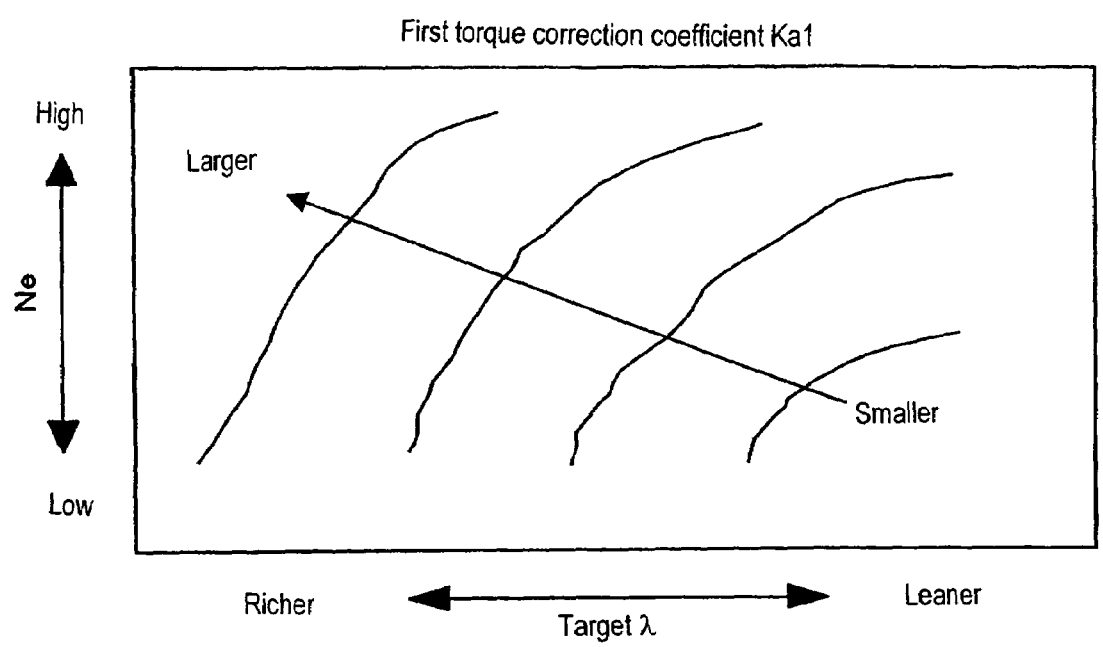
FIG. 30 is a diagram illustrating a map used for calculating a first torque correction coefficient in accordance with the preferred embodiment of the present invention.

In step S2004, the control unit 20 is configured to calculate a torque correction value (a first correction component or first torque correction coefficient ka1) corresponding to the change in the air-fuel ratio. More specifically, the control unit 20 is configured to refer to a map such as the one shown in FIG. 30 using the target λ and the engine rotational speed Ne, and calculate the first torque correction coefficient ka1. Since the torque will decline if the target λ falls below 1, the first torque correction coefficient ka1 is set such that the value of the first torque correction coefficient ka1 becomes larger as the value of the target λ falls further below 1. Furthermore, even if the target λ and the combustion time are constant, the torque will decline due to the change in crank angle if the engine rotational speed Ne increases. Therefore, the first torque correction coefficient ka1 is set such that the value of the first torque correction coefficient ka1 becomes larger as the engine rotational speed Ne increases.

Figure 31:
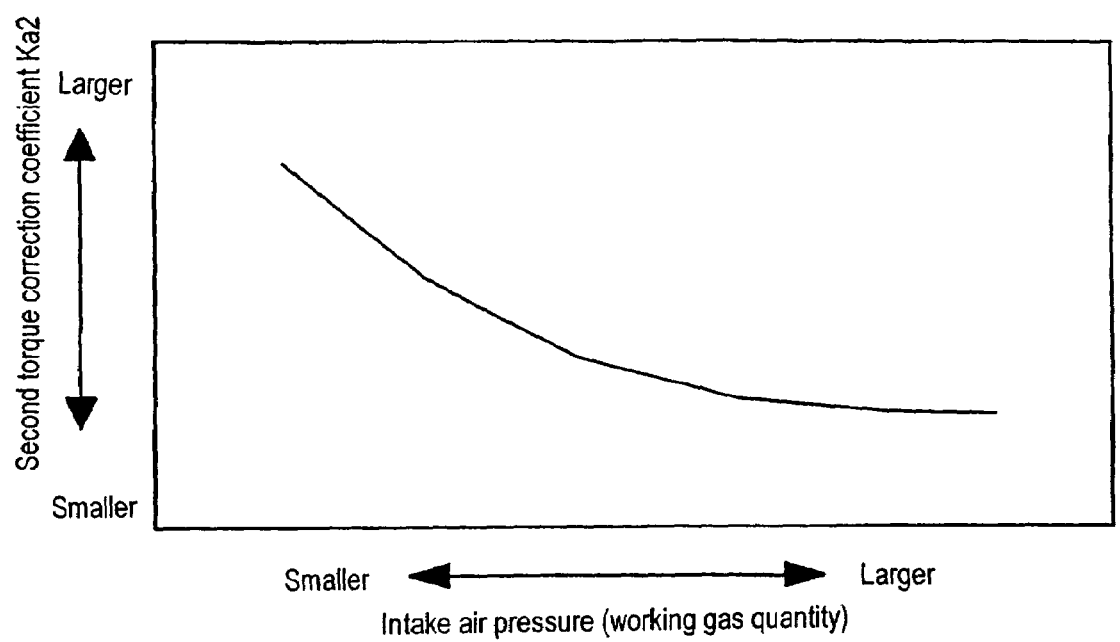
FIG. 31 is a diagram illustrating a map used for calculating a second torque correction coefficient in accordance with the preferred embodiment of the present invention.

In step S2005, the control unit 20 is configured to calculate a second correction component or second torque correction coefficient ka2 as a torque correction value that compensates for the quantity of working gas (i.e., fresh air plus EGR gas). More specifically, the control unit 20 is configured to refer to a table as the one shown in FIG. 31 to determine the value of the second torque correction coefficient ka2. The table shown in FIG. 31 is configured such that the value of the second torque correction coefficient ka2 becomes larger as the intake air pressure decreases (vacuum pressure or negative pressure increases). The intake air pressure corresponds to the working gas quantity. The second torque correction coefficient ka2 is set based on the table shown in FIG. 31 because the smaller the working gas quantity becomes, the more the compression pressure decreases and the more torque declines.

Figure 32:
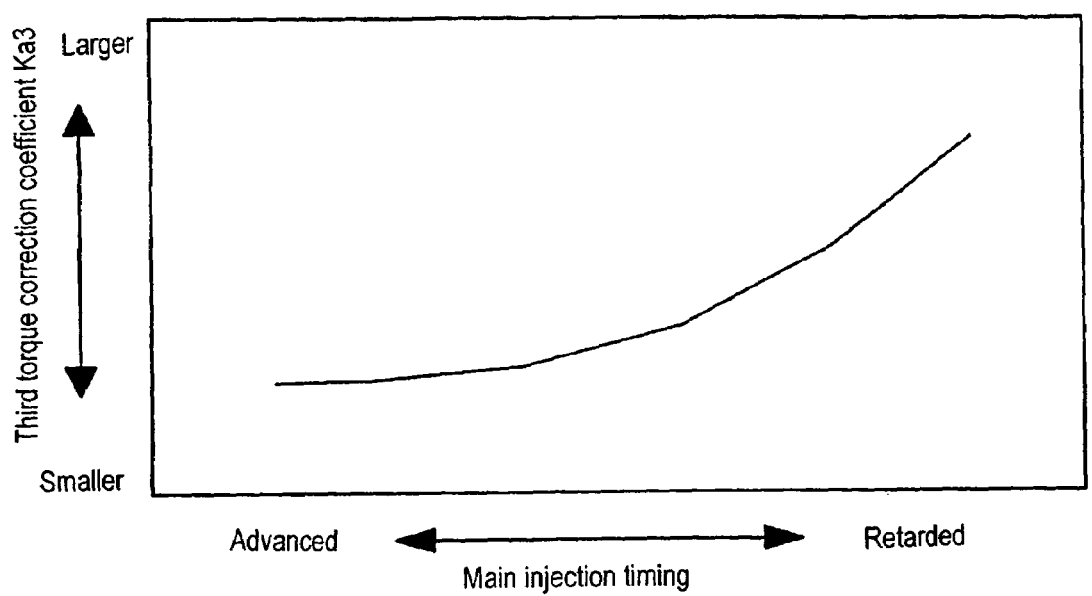
FIG. 32 is a diagram illustrating a map used for calculating a third torque correction coefficient in accordance with the preferred embodiment of the present invention.

In step S2006, the control unit 20 is configured to calculate a third correction component or third torque correction coefficient ka3 based on the fuel injection timing for the main combustion (i.e., main injection timing) during the staged retarded combustion. More specifically, the control unit 20 is configured to refer to a table such as the one shown in FIG. 32 to determine the value of the third torque correction coefficient ka3. The table shown in FIG. 32 is configured such that the more the main injection timing is retarded, the more the value of the third torque correction coefficient ka3 increases. The control unit 20 is configured to determine the third torque correction coefficient ka3 based on the table in FIG. 32 because the more the main injection timing is retarded, the more the torque declines.

Figure 33:
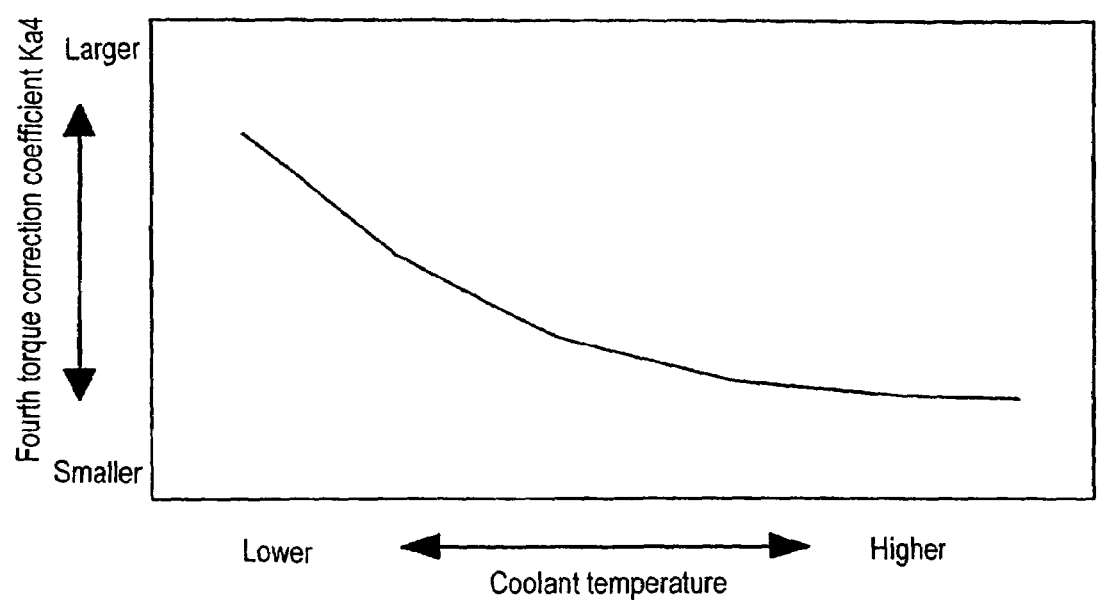
FIG. 33 is a diagram illustrating a map used for calculating a fourth torque correction coefficient in accordance with the preferred embodiment of the present invention.

In step S2007, the control unit 20 is configured to calculate a fourth torque correction coefficient ka4 as a torque correction value that compensates for a coolant temperature Tw. The coolant temperature Tw is referred as a parameter representing the engine temperature. More specifically, the control unit 20 is configured to refer to a table such as the one shown in FIG. 33 to determine the value of the fourth torque correction coefficient ka4. The table shown in FIG. 33 is configured such that the lower the coolant temperature Tw becomes, the more the value of the fourth torque correction coefficient ka4 increases. The control unit 20 is configured to determine the fourth torque correction coefficient ka4 based on the table shown in FIG. 33 because the lower the coolant temperature Tw (the engine temperature) becomes, the more the combustion efficiency degrades and the more the torque declines. The correction of the torque based on the coolant temperature Tw is particularly effective during the warm-up promotion mode.

In step S2008, the control unit 20 is configured to calculate a modification coefficient ka for modifying the first, second and third torque correction coefficients ka1, ka2, and ka3 in accordance with the parameters of the fuel property. When the fuel property change with respect to a reference fuel property, the amount by which the torque declines due to changes in the air-fuel ratio, the working gas quantity, and the fuel injection timing changes. Therefore, the modification coefficient ka is configured to modify the first to third torque correction coefficients ka1, ka2, ka3 to counterbalance the change in the amount of torque decline due to the change in the fuel property. The control process for calculating the modification coefficient ka is described later referring to FIGS. 27 to 29.

In step S2009, the control unit 20 is configured to use the first to fourth torque correction coefficients ka1 to ka4 and the modification coefficient ka to calculate a final torque correction value Ka (=ka1×ka2×ka3×ka4×ka).

In step S2010, in order to adjust the torque, the control unit 20 is configured to multiply the basic target air quantity tQacb by the torque correction value Ka to obtain a final target air quantity tQac (=tQacb×Ka).

The control process described in steps S2004 to S2007 and S2010 basically corresponds to an intake air quantity correcting section of the present invention.

Meanwhile, if the diesel engine 1 is not operating in the staged retarded combustion mode in step S2003, the control unit 20 is configured to proceeds to step S2011 where the control unit 20 is configured to set the basic target air quantity tQacb as the final target air quantity tQac without the correction or modification of the torque. Thus, in such case, the basic target air quantity tQacb equals to the final target air quantity tQac (i.e., tQac=tQacb).

After the control unit 20 executes either step S2010 or S2011, the control unit 20 is configured to proceed to step S2012 where the control unit is configured to control the intake air throttle valve and the EGR valve so as to obtain the final target intake air quantity tQac. More specifically, the control unit 20 is configured to control the intake air throttle valve to achieve the final target air quantity tQac, and feedback control the EGR valve based on the actual air quantity Qac detected by the air flow meter 23 to fine adjust the actual air quantity Qac to the target air quantity tQac (i.e., Qac=tQac). The control unit 20 can also be configured to execute control to increase the EGR quantity in order to compensate for the decline in EGR ratio resulting from the increase in air quantity. Although this kind of control causes the torque to increase because the working gas quantity increases due to the increase in EGR quantity, the increase in torque can be suppressed with high precision by setting the target air quantity slightly smaller. However, regarding the increase in working gas quantity resulting from the increase in intake air quantity is not required because the torque correction value Ka is set so that the increase in fuel injection quantity associated with the increase in working gas quantity is taken into account.

Figure 26:
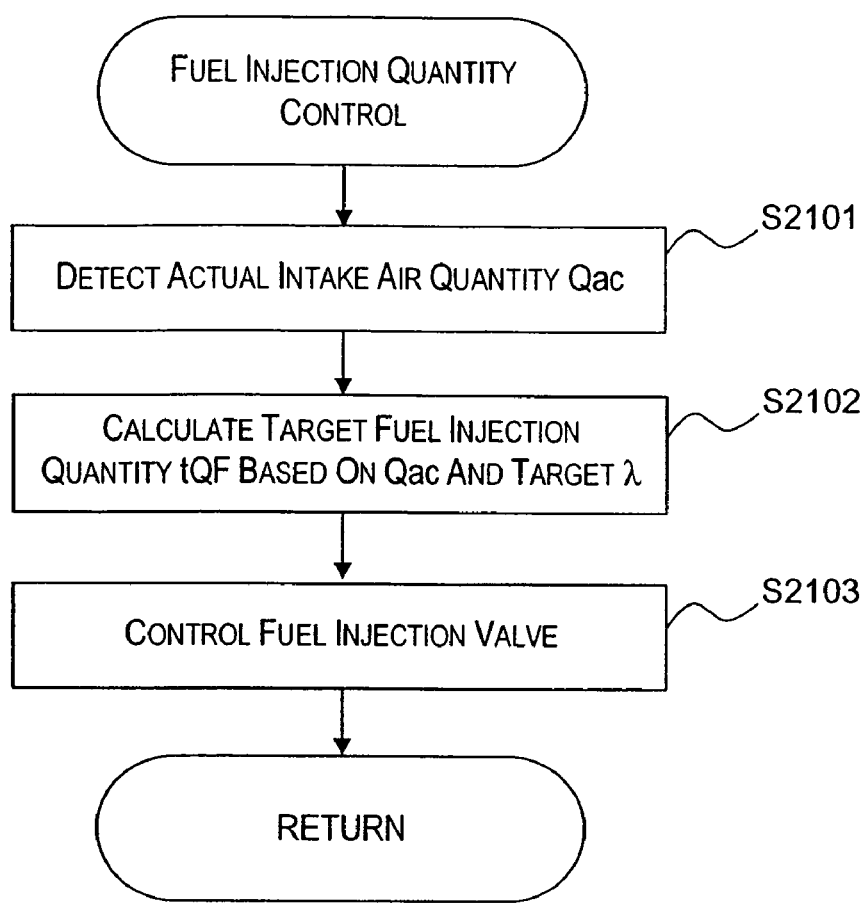
FIG. 26 is a flowchart illustrating a control process executed in the internal combustion engine control device for controlling a fuel injection quantity in accordance with the preferred embodiment of the present invention.

Referring now to FIG. 26, the control process executed in the control unit 20 for controlling the fuel injection quantity will be described. Thus, the control process shown in FIG. 26 basically corresponds to a fuel injection quantity control section of the present invention.

In step S2101, the control unit 20 is configured to read in the actual air quantity Qac detected by the air flow meter 23.

In step S2102, the control unit 20 is configured to calculate the target fuel quantity tQF based on the actual air quantity Qac and the target λ.

In step S2103, the control unit 20 is configured to control the fuel injection valve 9 so as to obtain the target fuel injection quantity tQF.

Figure 27:
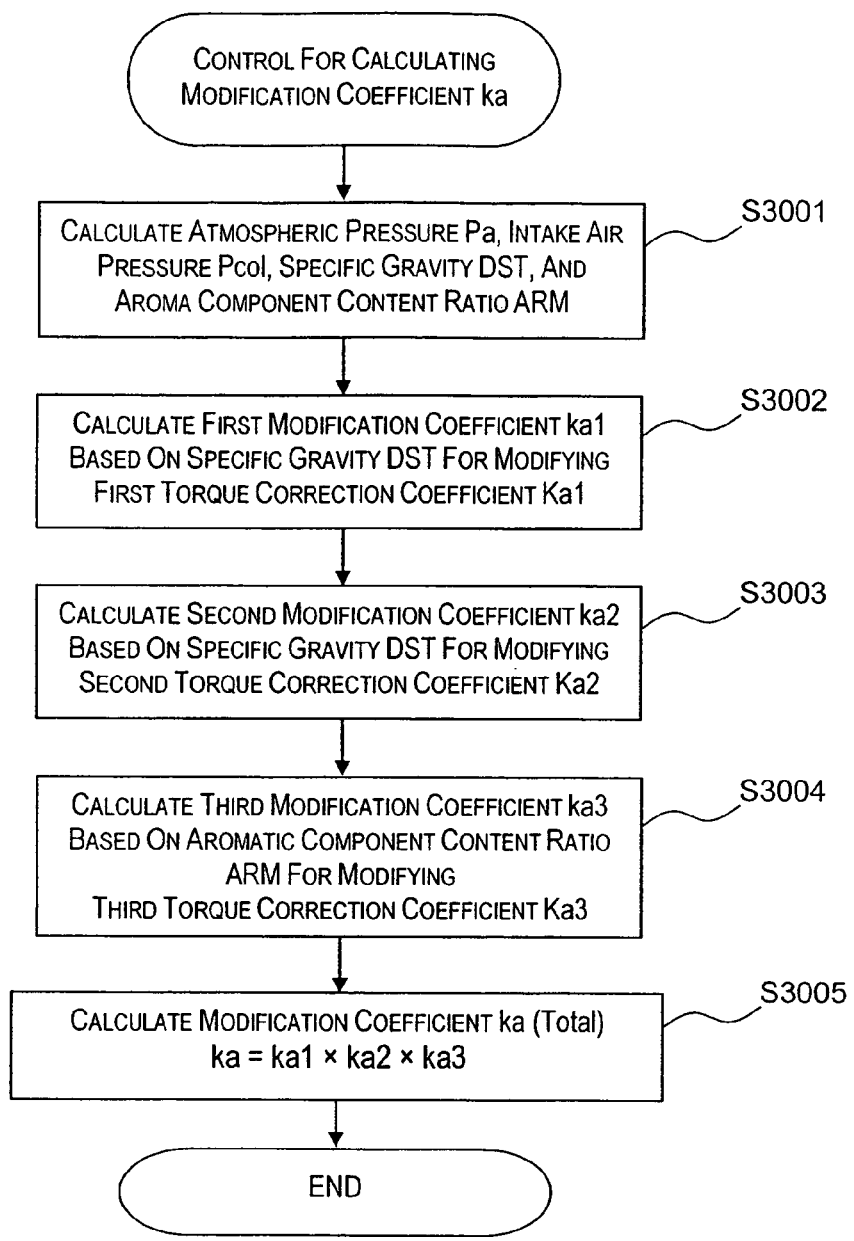
FIG. 27 is a flowchart illustrating a first example of a control process executed in the internal combustion engine control device for calculating a modification coefficient for modifying a torque correction value based on the fuel property in accordance with the preferred embodiment of the present invention.
Figure 28:
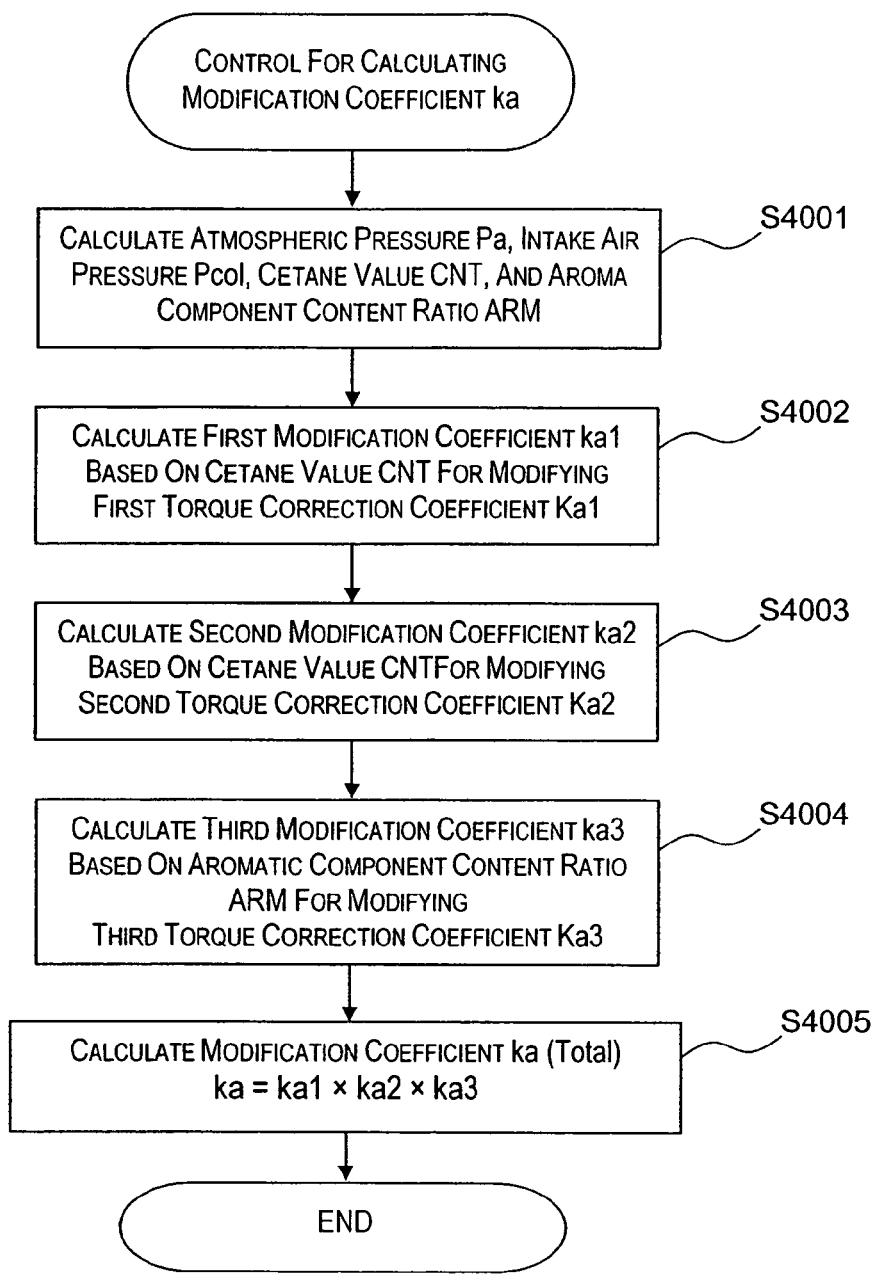
FIG. 28 is a flowchart illustrating a second example of a control process executed in the internal combustion engine control device for calculating a modification coefficient for modifying a torque correction value based on the fuel property in accordance with the preferred embodiment of the present invention.
Figure 29:
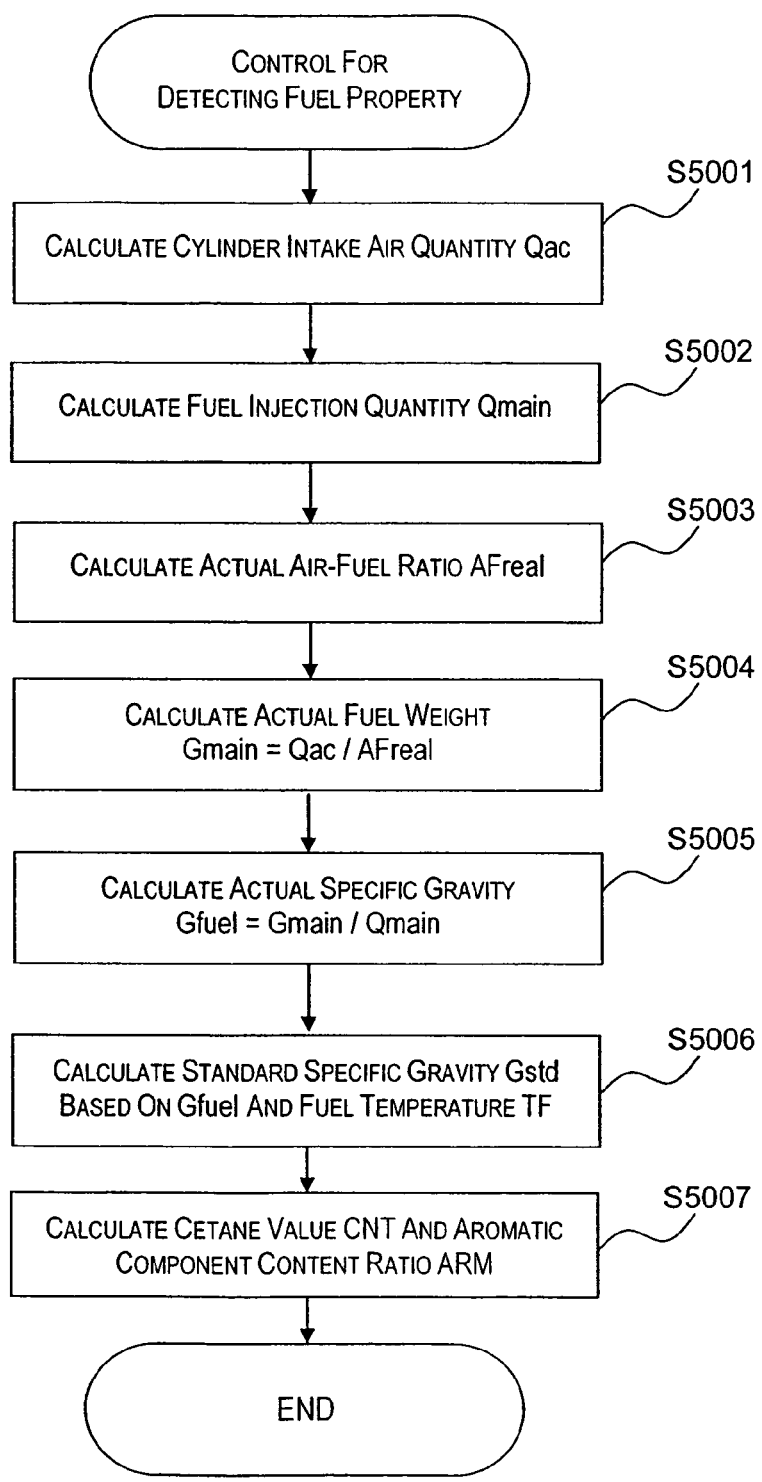
FIG. 29 is a flowchart illustrating a control process executed in the internal combustion engine control device for detecting the fuel property in accordance with the preferred embodiment of the present invention.

Referring now to FIGS. 27 to 29, the control process executed in the control unit 20 for calculating the modification coefficient ka corresponding to the fuel property will be described.

First, the difference in the amount of torque decline resulting from a difference in fuel property is explained. If the fuel property (e.g., a cetane value and content of components that do not combust readily) change, the ignitability and the combustion sustainability change. As a result, the combustion becomes unstable and the amount of torque decline becomes large. Moreover, as seen the diagram shown in FIG. 34, the influence of the fuel property to the torque increases when the amount of torque decline (torque correction value) increases such as when the air-fuel ratio decreases, the working gas quantity decreases, and the injection timing is retarded.

More specifically, the torque decline is influenced by the changes in one of or both of the ignitability and the combustion sustainability due to the change in the fuel property. The ignitability of the fuel is determined chiefly by the specific gravity of the fuel and the cetane value of the fuel of the fuel property, and the combustion sustainability is determined chiefly by the specific gravity of the fuel and the ratio of aromatic components (aromatic hydrocarbons) in the fuel of the fuel property. Thus, in the preferred embodiment of the present invention, these parameters of the fuel property (specific gravity, cetane value, and aromatic component content of the fuel) are detected and used to calculate a first, second and third modification coefficient ka1, ka2, ka3 that correspond to the first, second and third torque correction coefficient (torque correction value) ka1, ka2 and ka3, respectively, in order to counterbalance the change in the amount of torque decline related to each respective combustion control parameter (air-fuel ratio, working gas quantity, injection timing). The ignitability and combustion sustainability are taken into consideration separately in these calculations corresponding to each respective combustion control parameter. The modification coefficients ka1 to ka3 are then multiplied together to obtain the modification coefficient ka based on the overall state of the fuel property.

FIG. 27 is a flowchart of a first example of a subroutine executed in the control unit 20 for calculating the modification coefficient ka used in step S3005 of the previously described control sequence (FIG. 27) based on the fuel property.

In step S3001, the control unit 20 is configured to detect the atmospheric pressure Pa, the intake air pressure Pcol downstream of the throttle valve 5, the specific gravity DST of the fuel, and the aromatic components content ratio ARM in the fuel. The atmospheric pressure Pa can be detected by providing a separate atmospheric pressure sensor. Alternatively, a value detected by the intake air pressure sensor 31 when the diesel engine 1 is stopped (immediately before starting) can be substituted as the atmospheric pressure Pa. The control process for detecting the specific weight DST and the aromatic components content ratio ARM in the fuel will be described later.

In step S3002, the control unit 20 is configured to calculate the first modification coefficient ka1 based on the specific gravity DST of the fuel. The first modification coefficient ka1 is configured to modify the first torque correction coefficient ka1, which is used to compensate for changes in the air-fuel ratio, as discussed previously. The change that a difference in the fuel property imposes on the amount of torque decline resulting from the change in the air-fuel ratio is caused by the changes in both the ignitability and the combustion sustainability. In other words, the first modification coefficient ka1 is configured to compensate for the change in the amount of torque decline that results from the change in the ignitability and the combustion sustainability due to the change in the fuel property with respect to the reference fuel property.

Figure 35:
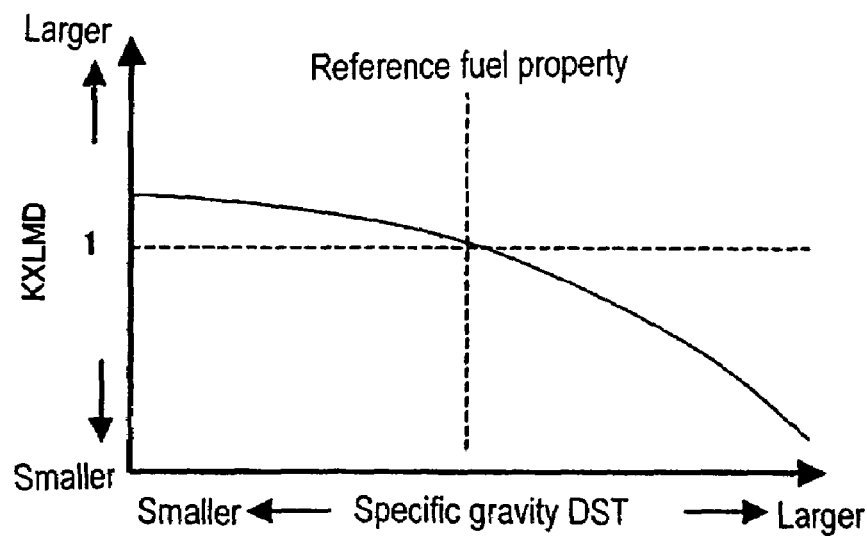
FIG. 35 is a diagram illustrating a table used for calculating a search parameter KXLMD based on a specific gravity of the fuel in accordance with the preferred embodiment of the present invention.
Figure 36:
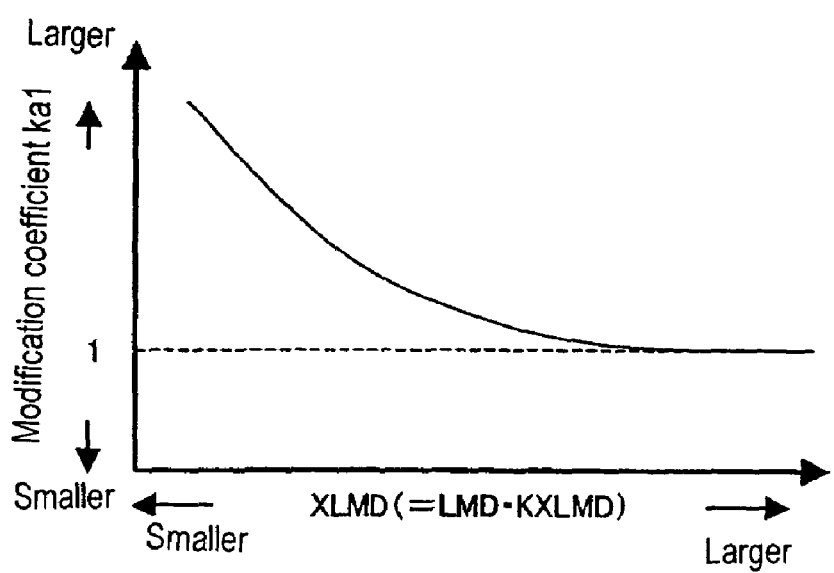
FIG. 36 is a diagram illustrating a table used for calculating a modification coefficient ka1 based on a search-purpose air-fuel ratio XLMD in accordance with the preferred embodiment of the present invention.
Figure 37:
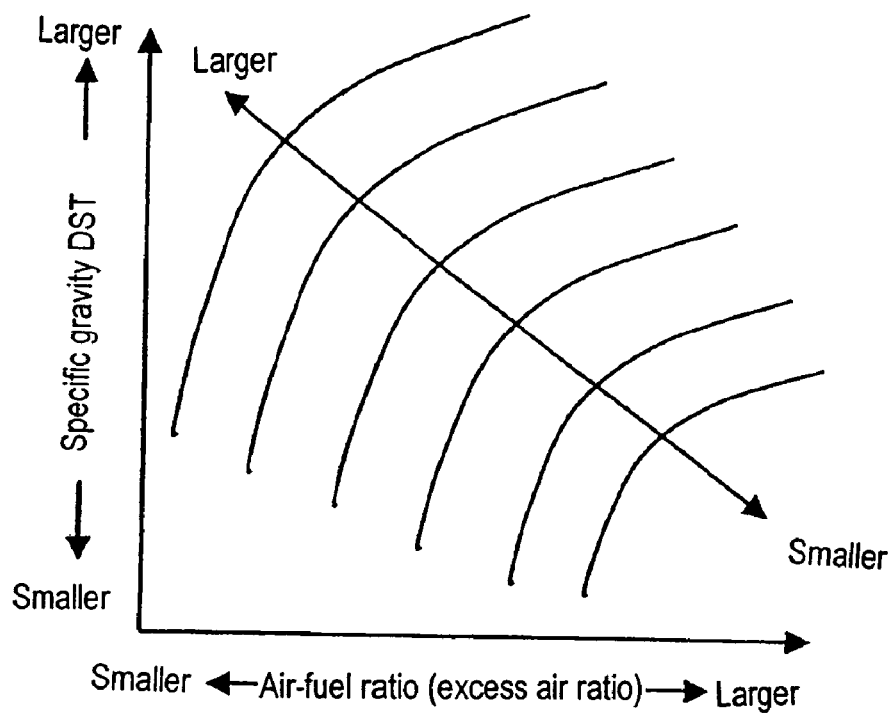
FIG. 37 is a diagram illustrating a map used for calculating the modification coefficient ka1 based on the specific gravity of the fuel and the air-fuel ratio in accordance with the preferred embodiment of the present invention.

More specifically, the control unit 20 is configured to search a map shown in FIG. 35 to find a value of a search parameter KXLMD, which indicates a unit change in the air-fuel ratio (excess air ratio), corresponding to the specific gravity DST. The search parameter KXLMD is then multiplied by the air-fuel ratio (the target λ) to calculate a search-purpose air-fuel ratio XLMD. The control unit 20 is then configured to use the search-purpose air-fuel ratio XLMD to search a map shown in FIG. 36 and determine the first modification coefficient ka1. When the specific gravity DST of the fuel is high (heavy), the calculated first modification coefficient ka1 is larger because the ignitability and the combustion sustainability both decrease and cause the amount of the torque decline to be larger. The calculation of the first modification coefficient ka1 is performed in two stages because, as described previously, the influence of the change in the fuel property to the torque decline becomes larger when the air-fuel ratio (the target λ) becomes smaller. In such calculation, only two two-dimensional tables are utilized, and thus, the amount of data needed to be stored for the calculation of the first modification coefficient ka1 is relatively small. Alternatively, it is also acceptable to use a three-dimensional map such as the one shown in FIG. 37 to search for the first modification coefficient ka1 based on the specific gravity DST and the air-fuel ratio (the target λ) simultaneously. When such three-dimensional map shown in FIG. 37 is used, the amount of computer processing for the calculation of the first modification coefficient ka1 can be reduced because the calculation only requires a single search.

In step S3003, the control unit 20 is configured to calculate the second modification coefficient ka2 based on the specific gravity DST of the fuel. The second modification coefficient ka2 is configured to modify the second torque correction coefficient ka2, which is used to compensate for changes in the working gas quantity, as discussed previously. The change that a difference in fuel property imposes on the amount of torque decline resulting from a change in the working gas quantity is caused chiefly by a change in the ignitability. In other words, the second modification coefficient ka2 is configured to compensate for the change in the amount of torque decline that results from the change in ignitability due to the change in the fuel property with respect to the reference fuel property.

Figure 38:
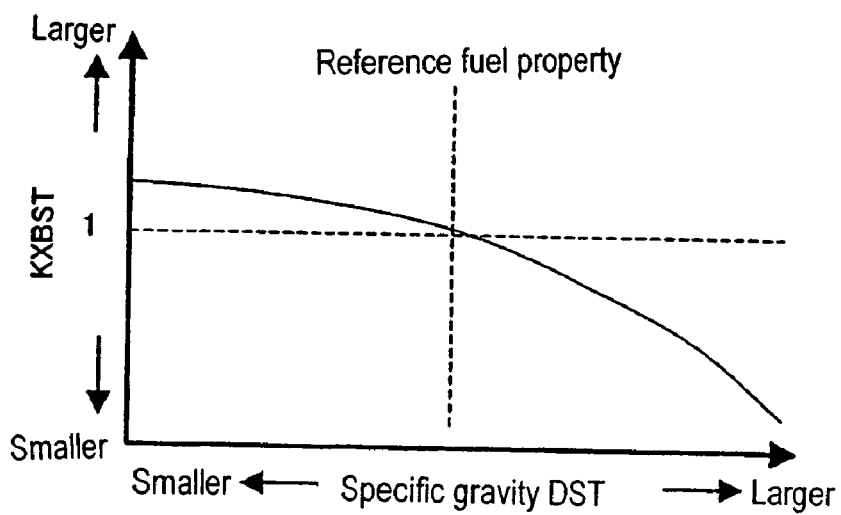
FIG. 38 is a diagram illustrating a table used for calculating a search parameter KXBST based on the specific gravity of the fuel in accordance with the preferred embodiment of the present invention.
Figure 39:
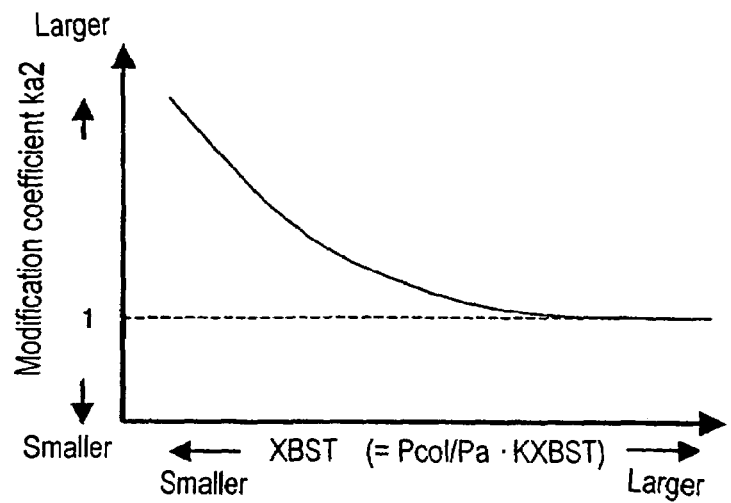
FIG. 39 is a diagram illustrating a table used for calculating a modification coefficient ka2 based on a search-purpose pressure ratio XBST in accordance with the preferred embodiment of the present invention.
Figure 40:
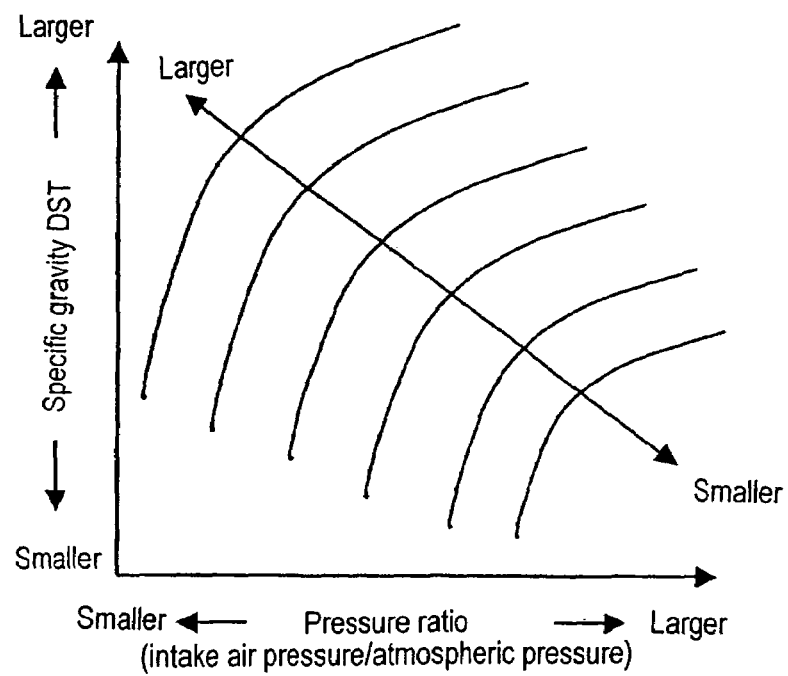
FIG. 40 is a diagram illustrating a map used for calculating the modification coefficient ka2 based on the specific gravity of the fuel and the pressure ratio (working gas quantity)

More specifically, the control unit 20 is configured to use the ratio of the intake air pressure Pcol to the atmospheric pressure Pa (Pcol/Pa) as a parameter representing the working gas quantity. It is also acceptable to simplify the process by using an intake air pressure BST as a fixed atmospheric pressure value. Then, the control unit 20 is configured to search a map shown in FIG. 38 to find a value of a search parameter KXBST, which indicates a unit change in the pressure ratio Pcol/Pa, corresponding to the specific gravity DST. The search parameter KXBST is then multiplied by the pressure ratio Pcol/Pa to calculate a search-purpose pressure ratio XBST. The control unit 20 is then configured to use the search-purpose air-fuel ratio XBST to search a map shown in FIG. 39 and find the second modification coefficient ka2. Similarly to the first modification coefficient ka1, when the specific gravity DST of the fuel is higher than that of the reference fuel property, the calculated second modification coefficient ka2 is larger because the ignitability decreases and causes the amount of torque decline to be larger. Conversely, when the specific gravity DST of the fuel is lower than that of the reference fuel property, the calculated second modification coefficient ka2 is smaller because the ignitability increases and causes the amount of torque decline to be smaller. It is also acceptable, for the same reasons as discussed above regarding the first modification coefficient ka1, to use a three-dimensional map such as the one shown in FIG. 40 to search for the second modification coefficient ka2 based on the specific gravity DST and the intake air pressure Pcol simultaneously.

In step S3004, the control unit 20 is configured to calculate the third modification coefficient ka3 based on the aromatic component content ratio ARM of the fuel. The third modification coefficient ka3 is configured to modify the third torque correction coefficient ka3, which is used to compensate for changes in the injection timing, as discussed previously. The change that a difference in fuel property imposes on the amount of torque decline resulting from a change in the injection timing is caused chiefly by a change in the combustion sustainability. In other words, the modification coefficient ka3 is configured to compensate for the change in the amount of torque decline that results from the change in combustion sustainability due to the change in the fuel property with respect to the reference fuel property.

Figure 41:
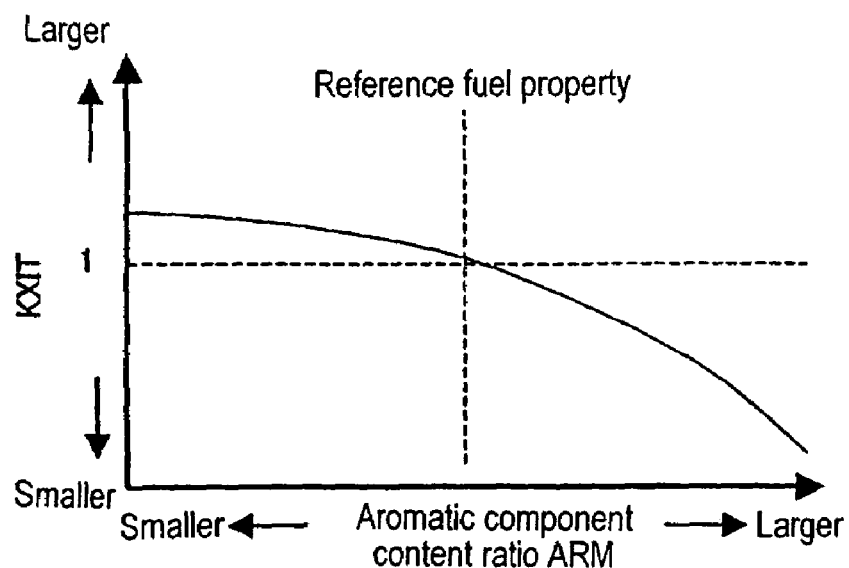
FIG. 41 is a diagram illustrating a table used for calculating a search parameter KXIT based on an aromatic component content ratio of the fuel in accordance with the preferred embodiment of the present invention.
Figure 42:
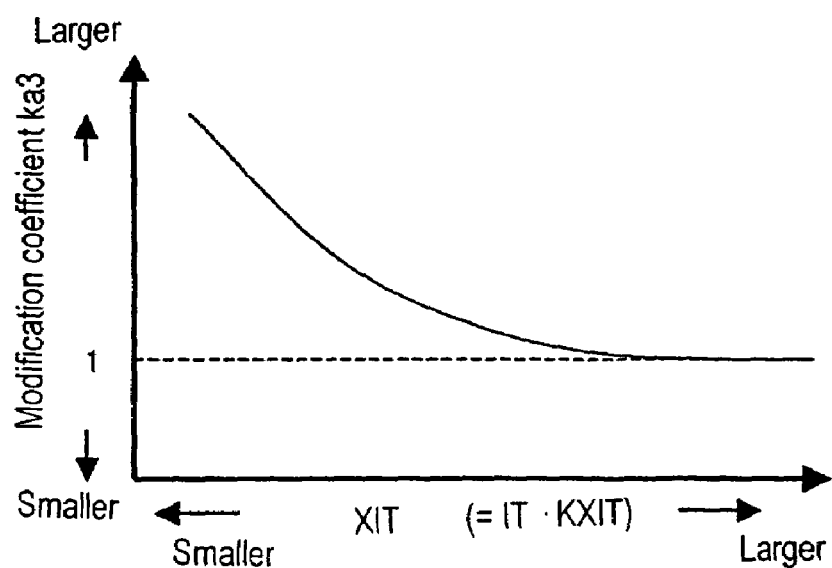
FIG. 42 is a diagram illustrating a table used for calculating a modification coefficient ka3 based on a search-purpose injection timing XIT in accordance with the preferred embodiment of the present invention.

More specifically, the control unit 20 is configured to search a map shown in FIG. 41 to find a value of a search parameter KXIT, which indicates a unit change in the injection timing, corresponding to the aromatic component content ratio ARM. The search parameter KXIT is then multiplied by the injection timing IT (degrees BTDC) to calculate a search-purpose injection timing XIT. The control unit 20 is then configured to use the search-purpose injection timing XIT to search a map shown in FIG. 42 and find the third modification coefficient ka3. When the aromatic component content ratio ARM of the fuel is higher than the aromatic component content ratio of the reference fuel property, the calculated third modification coefficient ka3 is larger because the combustion sustainability decreases and causes the amount of torque decline to be larger. Conversely, when the aromatic component content ratio ARM of the fuel is lower than the aromatic component content ratio of the reference fuel property, the calculated modification coefficient ka3 is smaller because the combustion sustainability increases and causes the amount of torque decline to be smaller. As in the calculations of the first and second modification coefficient ka1 and ka2, it is also acceptable to use a three-dimensional map such as the one shown in FIG. 43 to search for the third modification coefficient ka3 based on the aromatic component content ratio ARM and the fuel injection timing IT simultaneously. As mentioned above, this approach reduces the amount of computer processing for the calculation of the third modification coefficient ka3 because the calculation only requires a single search.

In step S3005, the control unit 20 is configured to multiply the first, second and third modification coefficients ka1, ka2 and ka3 together to obtain the modification coefficient ka (i.e., ka=ka1×ka2×ka3). Thus, the modification coefficient ka is calculated based on the overall state of the fuel property.

FIG. 28 shows a flowchart of an alternative example of a subroutine for calculating the modification coefficient ka. In the alternative example, the cetane value CST of the fuel is used to calculate the first and second modification coefficients ka1 and ka2 instead of the specific gravity DST. As mentioned above, the first and second modification coefficients ka1 and ka2 are for modifying the first torque correction coefficient ka1 (which is used to compensate for changes in the air-fuel ratio) and the second torque correction coefficient ka2 (which is used to compensate for changes in the working gas quantity), respectively. The control processing for detecting the cetane value CNT will be discussed later. Aside from the use of the cetane value CNT instead of the specific gravity DST, the subroutine described in FIG. 28 is basically the same as the subroutine described in FIG. 27.

Figure 44:
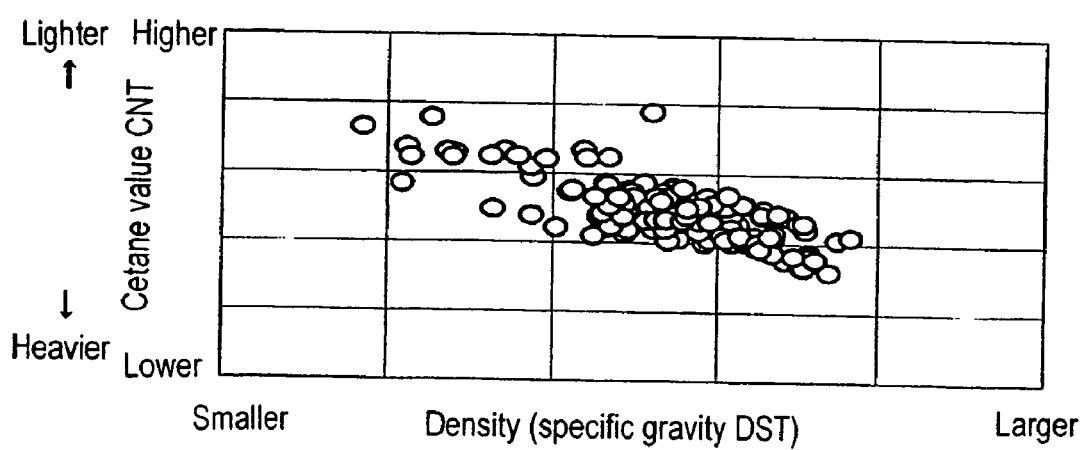
FIG. 44 is a diagram showing the characteristics of a cetane value with respect to the specific gravity of the fuel in accordance with the preferred embodiment of the present invention.
Figure 45:
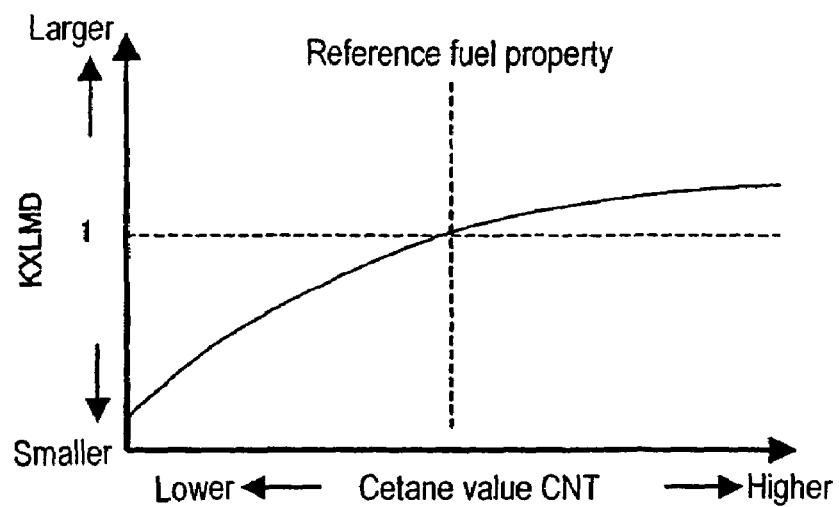
FIG. 45 is a diagram illustrating a table used for calculating a search parameter KXLMD based on the cetane value of the fuel in accordance with the preferred embodiment of the present invention.
Figure 46:
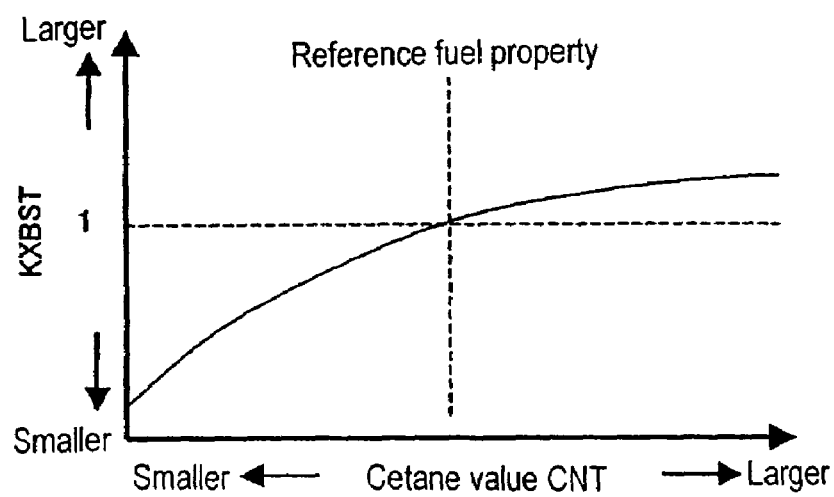
FIG. 46 is a diagram illustrating a table used for calculating a search parameter KXBST based on the cetane value of the fuel in accordance with the preferred embodiment of the present invention.
Figure 47:
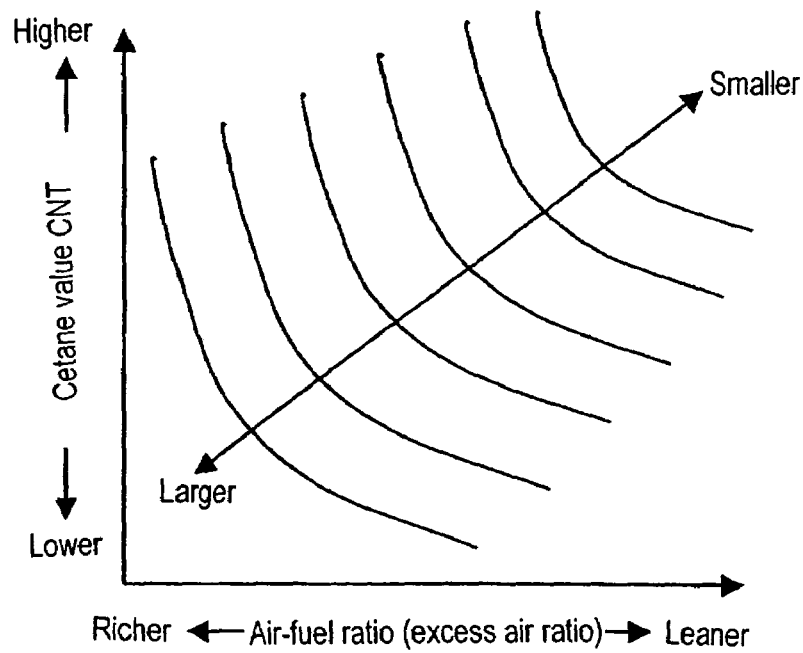
FIG. 47 is a diagram illustrating a map used for calculating the modification coefficient ka1 based on the cetane value of the fuel and the air-fuel ratio in accordance with the preferred embodiment of the present invention.
Figure 48:
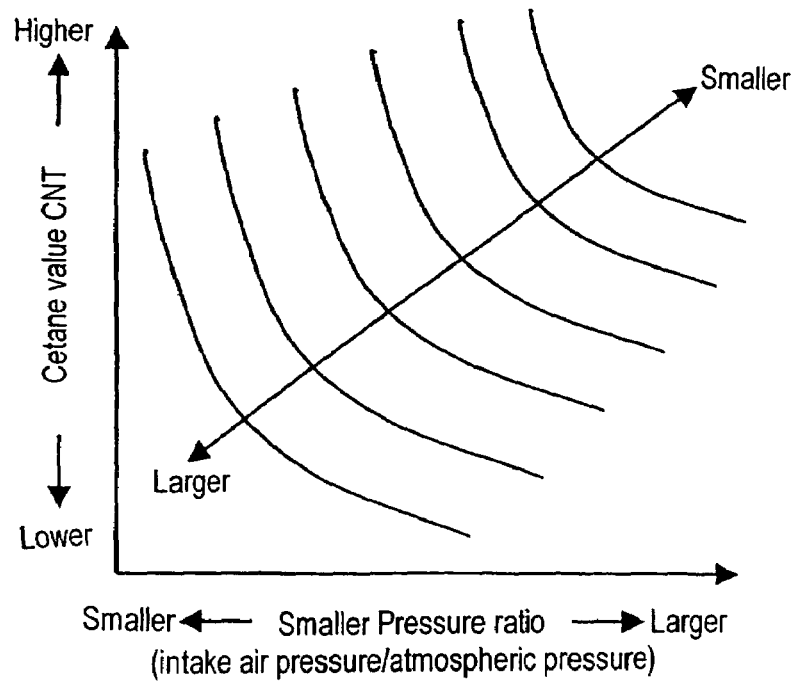
FIG. 48 is a diagram illustrating a map used for calculating the modification coefficient ka2 based on the cetane value and the pressure ratio (working gas quantity) in accordance with the preferred embodiment of the present invention.

FIG. 44 shows a plot of the cetane value CNT of the fuel versus the specific gravity of the fuel DST. As shown in FIG. 44, when the cetane value CNT is higher and the fuel is lighter, the specific gravity DST of the fuel is smaller, and thus, the ignitability is good. On the other hand, when the cetane value CNT is lower and the fuel is heavier, the specific gravity DST of the fuel is larger and the ignitability is poor. Thus, the cetane value CNT has an opposite correlation with respect to the ignitability as the specific gravity DST. Consequently, the tables used in steps S4002 and S4003 in FIG. 28 to obtain the first and second modification coefficients ka1 and ka2 have different characteristics from the tables used in steps S3002 and S3003 in FIG. 7. More specifically, a table shown FIG. 45 plotting the search-purpose parameter KXLMD, which indicates a unit change in the air-fuel ratio (excess air ratio), versus the cetane value CNT, and a table shown FIG. 46 plotting the search-purpose parameter KXBST, which indicates the unit change in the intake air pressure (working gas quantity), versus the cetane value CNT are configured to have characteristic curves whose orientations are reversed with respect to the characteristic curves shown in FIGS. 35 and 38. Once the search-purpose parameters KXLMD and KXBST are obtained using the maps shown in FIGS. 45 and 46, the maps shown in FIGS. 36 and 39 can be used to find values of the first and second modification coefficients ka1 and ka2. Similarly, a three-dimensional map shown in FIG. 47 for obtaining the first modification coefficient ka1 based on the cetane value CNT and the air fuel ratio (the target $\lambda$) and a three-dimensional map shown in FIG. 48 for obtaining the second modification coefficient ka2 based on the cetane value CNT and the intake air pressure Pcol are reversed with respect to the three-dimensional maps shown in FIGS. 37 and 40.

Figure 49:
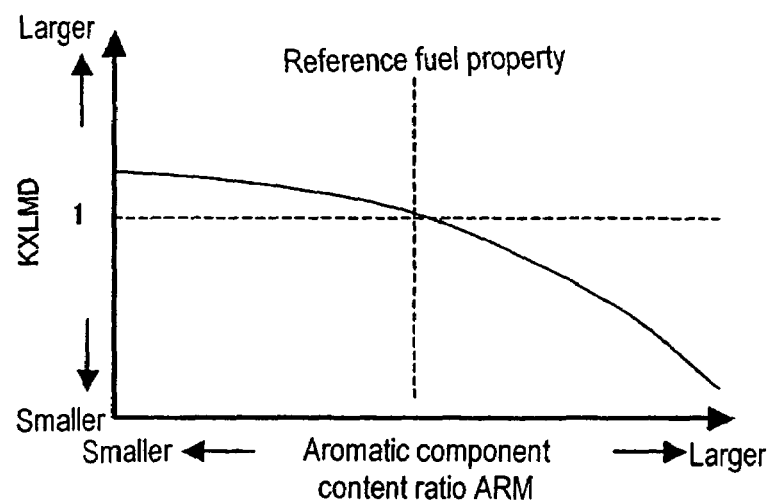
FIG. 49 is a diagram illustrating a table used for calculating the search parameter KXLMD based on the aromatic component content ratio of the fuel in accordance with the preferred embodiment of the present invention.
Figure 50:
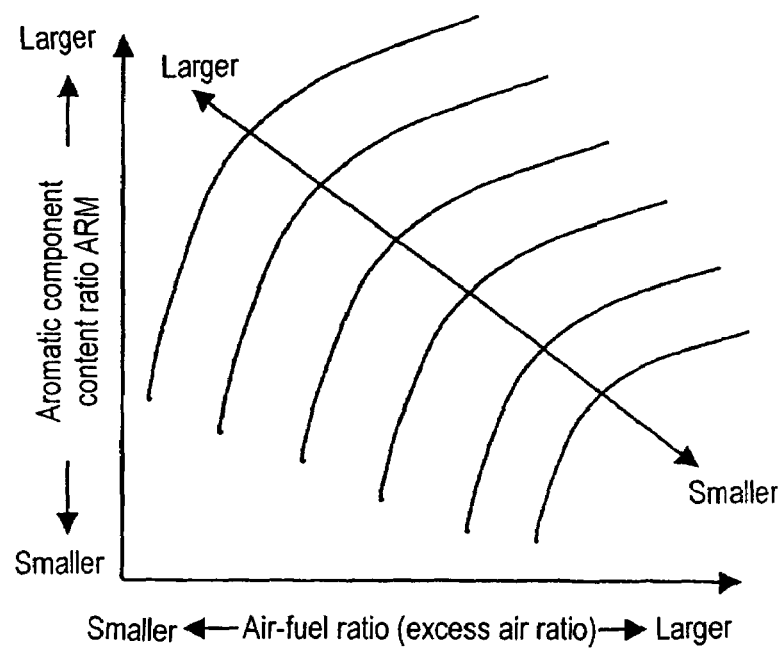
FIG. 50 is a diagram illustrating a map used for calculating the modification coefficient ka1 based on the aromatic component content ratio of the fuel and the air-fuel ratio in accordance with the preferred embodiment of the present invention.

Moreover, similarly to the cetane value CNT, the aromatic component content ratio ARM also has the opposite correlation with respect to the ignitability as the specific gravity DST. Consequently, the first modification coefficient ka1 can be obtained by obtaining a the search-purpose parameter KXLMD using a table shown in FIG. 49, or simply using a three-dimensional table shown in FIG. 50. The table shown in FIG. 49 plots the search-purpose parameter KXLMD, which indicates a unit change in the air-fuel ratio (excess air ratio), versus the aromatic component content ratio ARM. Once the search-purpose parameter KXLMD is obtained using the table shown in FIG. 49, the table shown in FIG. 36 can be used to obtain a value of the first modification coefficient ka1. Alternatively, the first modification coefficient ka1 can be obtained by using the three-dimensional map shown FIG. 50 using the aromatic component content ratio ARM and the air fuel ratio as parameters.

Figure 43:
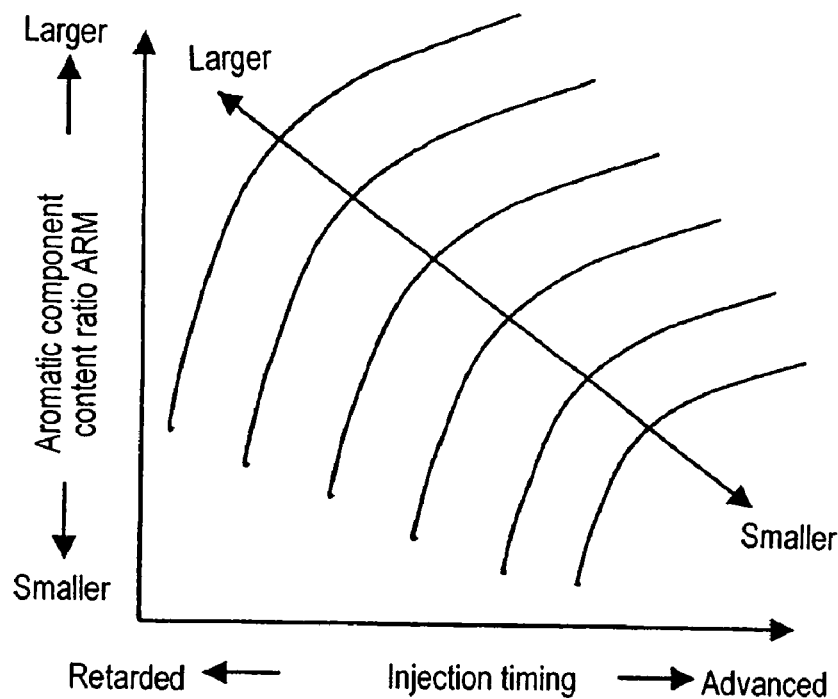
FIG. 43 is a diagram illustrating a map used for calculating the modification coefficient ka3 based on the aromatic component content ratio of the fuel and a pressure ratio in accordance with the preferred embodiment of the present invention.

Similarly, a table plotting the search-purpose parameter KXIT, which indicates a unit change in the injection timing, versus the specific gravity DST or a three-dimensional map for obtaining the third modification coefficient ka3 by using the specific gravity DST and the air fuel ratio as parameters can be replaced with the tables based on the aromatic component content ratio ARM shown in FIGS. 41 and 43, respectively, in which the orientation of the characteristic curves are reversed.

The control process described in steps S2008 and S2009 in FIG. 25 and the control process described in the flowchart of FIG. 27 or 28 basically correspond to a torque correction value modifying section of the present invention.

Referring now to FIG. 29, the control processing executed in the control unit 20 for detecting the fuel property will be explained.

In step S5001, the control unit 20 is configured to calculate a cylinder intake air quantity Qac based on a signal inputted from the air flow meter 23 configured and arranged to detect the intake air quantity Qa.

In step S5002, the control unit 20 is configured to calculate a fuel injection quantity Qmain based on the engine rotational speed Ne and the load (e.g., determined based on the accelerator position APO) by, for example, searching a prescribed map.

In step S5003, the control unit 20 is configured to calculate an actual air-fuel ratio AFreal based on a signal inputted from the air-fuel ratio sensor 28 by, for example, searching a prescribed data table.

In step S5004, the control unit 20 is configured to calculate an actual fuel weight Gmain (=Qac/AFreal) based on the cylinder intake air quantity Qac calculated in step S5001 and the actual air fuel ratio AFreal calculated in step S5003.

In step S5005, the control unit 20 is configured to calculate an actual specific gravity Gfuel (=Gmain/Qmain) based on the actual fuel weight Gmain calculated in step S5004 and the fuel injection quantity Qmain calculated in step S5002.

In step S5006, the control unit 20 is configured to calculate a standard specific gravity Gstd corresponding to a standard temperature (e.g., 20° C.) based on the fuel temperature TF and the actual specific gravity Gfuel calculated in step S5005. More specifically, the standard specific gravity Gstd can be determined by, for example, preparing a map plotting the standard specific gravity Gstd versus the actual specific gravity Gfuel and the fuel temperature TF in advance, and configuring the control unit 20 to search the map. The fuel temperature TF can be detected by providing a fuel temperature sensor or estimated based on the coolant temperature Tw. The standard specific gravity Gstd is used as the specific gravity DST in the control process shown in FIG. 27.

In step S5007, the control unit 20 is configured calculate the cetane value CNT and the aromatic component content ratio ARM based on the standard specific gravity Gstd calculated in step S5006 by, for example, searching a prescribed data table. The larger the standard specific gravity Gstd is, the higher the density (heavier the fuel), the smaller the cetane value CNT, and the larger the aromatic component content ratio ARM become. When the modification coefficient ka is calculated using the specific gravity DST and the aromatic component content ratio ARM as in the control process shown in FIG. 27, it is not necessary to calculate the cetane value CNT.

The method of detecting the fuel property is not limited to the processing illustrated in FIG. 29, and various other methods can also be adopted. For example, it is also acceptable to configure the control unit 20 to read the engine rotational speed Ne for several cycles when the diesel engine 1 is started, calculate a rotational speed fluctuation $\Delta$Ne (deviation between maximum rotational speed and minimum rotational speed), and compare the rotational speed fluctuation $\Delta$Ne to a reference value $\Delta$Ne0. If the rotational speed fluctuation $\Delta$Ne is larger than the reference value $\Delta$Ne0, the control unit 20 is configured to determine that the fuel is heavy (large specific gravity, low cetane value, high aromatic component content ratio). On the other hand, if the rotational speed fluctuation $\Delta$Ne is smaller than the reference value $\Delta$Ne0, the control unit 20 is configured to determine that the fuel is light (small specific gravity, high cetane value, low aromatic component content ratio).

In summary, with the internal combustion engine control device of the present invention, the decline in torque that occurs during the staged retarded combustion can be suppressed while continuing to achieve the target $\lambda$ by using a torque correction value to increase the target air quantity to be delivered to the diesel engine 1 and calculating the target fuel injection quantity based on the actual air quantity and the target $\lambda$. Since the present invention is further configured to compensate for differences in the amount by which the torque declines resulting from differences in the fuel property, the amount of torque decline can be suppressed while continuing to achieve the target $\lambda$ even if the fuel property of the fuel used change. Furthermore, the present invention is not limited to engines configured to perform the staged retarded combustion. Rather, the internal combustion engine control device of the present invention can be applied to any engine (including the engine presented in Japanese Laid-Open Patent Publication 2000-320386) configured to operate in a mode that changes the target $\lambda$, the fuel injection timing, or the like, and thereby causes the torque to decline.

By utilizing the preferred embodiment as explained above in cases where the target air-fuel ratio and the fuel injection timing are changed to a large degree as part of a prescribed control routine (e.g., the NOx release/cleaning mode, the desulfurization mode or the DPF regeneration mode) that is executed based on the state of the NOx trapping catalytic converter 13, the DPF 14, or other exhaust gas cleaning device installed in the exhaust passage 10 of the diesel engine 1, the torque decline that occurs during the prescribe control routine can be suppressed in a satisfactory manner without being affected by the fuel property.

Additionally, the internal combustion engine control device in accordance with the preferred embodiment explained above enables the diesel engine 1 to be controlled with an even higher degree of precision because the internal combustion engine control device is configured to take the ignitability and the combustion sustainability into account separately when calculating and compensating for the influence that the fuel property have on the amount of torque decline.

More specifically, the preferred embodiment explained above can achieve a high degree of precision by using an index value, typically the specific gravity or the cetane value of the fuel, as a value representing the ignitability and using an index value, typically the specific gravity or the aromatic component content ratio of the fuel, as a value representing the combustion sustainability.

With the preferred embodiment, the torque correction value is calculated based on the air-fuel ratio and at least one of the working gas quantity of the diesel engine 1 and fuel injection timing of the diesel engine 1. As a result, the torque correction value set with respect to a factor that causes a large torque decline is modified based on the fuel property, enabling the effects of modification to be sufficiently exhibited.

With the preferred embodiment, when the detected fuel property indicate that the ignitability has declined, the second torque correction value ka2 (by the second torque correction coefficient ka2) computed based on the working gas quantity of the engine and the first torque correction value ka1 (by the first torque correction coefficient ka1) based on the air-fuel ratio of the diesel engine 1, both of which are related to the ignitability, are revised accordingly. As a result, an accurate modification based on the change in the fuel property can be accomplished.

With the preferred embodiment, the ratio of the intake air pressure Pcol to the atmospheric pressure Pa is used as the working gas quantity. As a result, the working gas quantity can be obtained easily and excellent torque correction and correction modification based on the fuel property can be accomplished.

With the preferred embodiment, when the detected fuel property indicate that the combustion sustainability has declined, the third torque correction value ka3 (by the third torque correction coefficient ka3) calculated based on the fuel injection timing of the diesel engine 1 and the first torque correction value ka1 (by the first torque correction coefficient ka1) based on the air-fuel ratio of the engine, both of which are related to combustion sustainability, are revised accordingly. As a result, an accurate modification of the torque based on the change in the fuel property can be accomplished.

Accordingly, in the present invention, a prescribed combustion control is executed based on the state of exhaust gas cleaning devices (i.e., the NOx trapping catalytic converter 13 and the DPF 14). For example, the air-fuel ratio and fuel injection timing are controlled in a certain manner in order to release and clean NOx accumulated in the NOx trapping catalytic converter 13, to remove (desulfurize) sulfur accumulated in the NOx trapping catalytic converter 13, or to remove exhaust particulates matter collected in the DPF 14. Execution of the prescribed combustion control sometimes causes the torque to decline and the amount of the torque decline varies depending also on the fuel property. The internal combustion engine control device of the present invention is configured to calculate a torque correction value in order to compensate for the torque decline resulting from such prescribed combustion controls. Moreover, the present invention provides the additional feature of modifying the torque correction value when the amount of torque decline changes due to a change in the fuel property and increasing the target intake air quantity using the modified torque correction value. The intake air quantity is then controlled based on the increased target intake air quantity, and the target fuel injection quantity is calculated based on the actual air intake quantity resulting from the intake air quantity control and a target air-fuel ratio.

As a result, the prescribed combustion controls can be executed while correcting the torque in a satisfactory manner with little influence from changes in the fuel property. Thus, stable operating performance can be ensured.

As used herein to describe the above embodiment, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An internal combustion engine control device comprising:
    an intake air quantity control section configured to control an intake air quantity drawn into an engine based on a target intake air quantity;
    a fuel injection quantity control section configured to control a fuel injection quantity of the engine based on a target fuel injection quantity calculated based on an actual air quantity and a target air-fuel ratio;

a combustion mode control section configured to selectively control a combustion mode of the engine so that the engine operates in at least a prescribed combustion control mode;

an intake air quantity correcting section configured to correct the target intake air quantity to a larger value by using a torque correction value in order to compensate for a torque decline resulting from operating the engine according to the prescribed combustion control mode; and a torque correction value modifying section configured to modify the torque correction value in accordance with a change in a fuel property with respect to a reference fuel property.

2. The internal combustion engine control device as recited in claim 1, wherein the combustion mode control section is configured to select the prescribed combustion control mode based on a state of an exhaust gas cleaning device provided in an exhaust passage of the engine.

3. The internal combustion engine control device as recited in claim 1, wherein the torque correction value modifying section is configured to use at least a parameter that affects an ignitability of the fuel as the fuel property.

4. The internal combustion engine control device as recited in claim 3, wherein the torque correction value modifying section is further configured to use one of a specific gravity of the fuel and a cetane value of the fuel as the parameter that affects the ignitability of the fuel.

5. The internal combustion engine control device as recited in claim 1, wherein the torque correction value modifying section is configured to use at least a parameter that affects a combustion sustainability as the fuel property.

6. The internal combustion engine control device as recited in claim 5, wherein the torque correction value modifying section is further configured to use one of a specific gravity of the fuel and a content ratio of aromatic components in the fuel as the parameter that affects the combustion sustainability.

7. The internal combustion engine control device as recited in claim 1, wherein the intake air quantity correcting section is further configured to calculate the torque correction value based on the air-fuel ratio and at least one of a working gas quantity of the engine and a fuel injection timing of the engine.

8. The internal combustion engine control device as recited in claim 1, wherein the intake air quantity correcting section is further configured to calculate the torque correction value based on the air-fuel ratio and a working gas quantity of the engine, and the torque correction value modifying section is further configured to modify the torque correction value when the fuel property indicates that the ignitability of the fuel has declined.

9. The internal combustion engine control device as recited in claim 7, wherein the intake air quantity correcting section is further configured to determine the working gas quantity based on a ratio of an intake air pressure to an atmospheric pressure.

10. The internal combustion engine control device as recited in claim 1, wherein the intake air quantity correcting section is further configured to calculate the torque correction value based on the air-fuel ratio and a fuel injection timing of the engine, and the torque correction value modifying section is further configured to modify the torque correction when the fuel property indicates that a combustion sustainability of the fuel has declined.

11. The internal combustion engine control device as recited in claim 1, wherein the intake air quantity correcting section is further configured to calculate the torque correction value based on a first correction component corresponding to a change in the air-fuel ratio, a second correction component corresponding to a change in a working gas quantity of the engine, and a third correction component corresponding to a change in a fuel injection timing of the engine.

12. The internal combustion engine control device as recited in claim 11, wherein the torque correction value modifying section is further configured to modify the first correction component and the second correction component of the torque correction value when the fuel property indicates that the ignitability of the fuel has declined.

13. The internal combustion engine control device as recited in claim 11, wherein the torque correction value modifying section is further configured to modify the first correction component and the third correction component of the torque correction value when the fuel property indicates that a combustion sustainability of the fuel has declined.

14. The internal combustion engine control device as recited in claim 1, wherein the combustion mode control section is configured select a staged retarded combustion mode as the prescribed combustion control mode in which a fuel injection is controlled to execute a main combustion for generating a main torque and at least one preliminary combustion prior to the main combustion such that the preliminary combustion occurs near top dead center of a compression stroke and the main combustion is executed after the preliminary combustion is completed.

15. A method of controlling an internal combustion engine comprising:

controlling an intake air quantity drawn into an engine based on the target intake air quantity;

calculating a target fuel injection quantity based on an actual air quantity and a target air-fuel ratio;

controlling a fuel injection quantity of the engine based on the target fuel injection quantity;

selectively controlling a combustion mode of the engine so that the engine operates in at least a prescribed combustion control mode;

correcting the target intake air quantity to a larger value by using a torque correction value in order to compensate for a torque decline resulting from operating the engine according to the prescribed combustion control mode; and modifying the torque correction value in accordance with a change in a fuel property with respect to a reference fuel property.

16. An internal combustion engine control device comprising:

intake air quantity controlling means for controlling an intake air quantity drawn into an engine based on the target intake air quantity;

target fuel injection quantity calculating means for calculating a target fuel injection quantity based on an actual air quantity and a target air-fuel ratio;

fuel injection quantity controlling means for controlling a fuel injection quantity of the engine based on the target fuel injection quantity;

combustion mode controlling means for selectively controlling a combustion mode of the engine so that the engine operates in at least a prescribed combustion control mode;

target intake air quantity correcting means for correcting the target intake air quantity to a larger value by using a torque correction value in order to compensate for a torque decline resulting from operating the engine according to the prescribed combustion control mode; and torque correction value modifying means for modifying the torque correction value in accordance with a change in a fuel property with respect to a reference fuel property.

* * * * *